PAPER ADVANCE CONTROL CIRCUIT IN HIGH SPEED PRINTER

Filed Sept. 25, 1961 24 Sheets-Sheet 1

INVENTORS
MERLIN D. SPITSBERGEN
FRANK G. PENSAVECCHIA
BY Whittemore,
Hulbert & Belknap
ATTORNEY

PAPER ADVANCE CONTROL CIRCUIT IN HIGH SPEED PRINTER

PAPER ADVANCE CONTROL CIRCUIT IN HIGH SPEED PRINTER

May 25, 1965 M. D. SPITSBERGEN ETAL 3,185,283

PAPER ADVANCE CONTROL CIRCUIT IN HIGH SPEED PRINTER

Filed Sept. 25, 1961 24 Sheets-Sheet 15

May 25, 1965 M. D. SPITSBERGEN ETAL 3,185,283

PAPER ADVANCE CONTROL CIRCUIT IN HIGH SPEED PRINTER

Filed Sept. 25, 1961 24 Sheets-Sheet 21

May 25, 1965 M. D. SPITSBERGEN ETAL 3,185,283

PAPER ADVANCE CONTROL CIRCUIT IN HIGH SPEED PRINTER

Filed Sept. 25, 1961 24 Sheets-Sheet 24

3,185,283
PAPER ADVANCE CONTROL CIRCUIT IN HIGH SPEED PRINTERS

Merlin D. Spitsbergen, Rochester, and Frank G. Pensavecchia, Orchard Lake, Mich., assignors, by mesne assignments, to Control Data Corporation, Minneapolis, Minn., a corporation of Minnesota Filed Sept. 25, 1961, Ser. No. 140,614
11 Claims. (Cl. 197—133)

This invention relates to printers for use with electronic computers, and particularly to a novel electro-mechanical, so-called "on-the-fly" type printer. More specifically, this application relates to the Paper Motion Spring Clutch Control System of the printer.

Very briefly, a printer embodying the invention includes a continuously rotated print drum having characters spaced radially around the drum in horizontal rows of identical characters to be printed. Printing takes place by causing hammers to drive the paper into the characters on the drum.

The printer disclosed herein may be used in conjunction with a computer-buffer combination as a medium and/or high speed data processing system. For example, the particular embodiment of the printer disclosed herein is capable of printing 120 character lines at a rate of 150 lines per minute, and under special circumstances at a rate of 600 lines per minute for all numeric characters. The computer derives the necessary information and places it on its output terminals in such a way that it is fed into the printer one line at a time. After the computer has completed the derivation of one line of information, it then derives the vertical format or number of lines which the computer desires to skip on a printed sheet before it prints the next line. This information is also fed out onto the computer output lines and used by the printer.

Before stating some of the specific objects of the invention and describing the construction and operation of the printer in detail, it seems desirable to present a general discussion thereof for purposes of orientation. In this connection, the assumption will be made that the computer with which this printer is employed sorts its information in terms of character bins. In other words, as the computer looks at information in its arithmetic register system, it determines two things about a particular character of information. First, it determines what character it wishes to print; second, it determines at what address or hammer number from 1 to 120 it wishes to print this character. A portion of the memory in this printer has been designated for the addresses of each character. Since this particular embodiment of the printer is designed to print no more than 120 characters on any given line, 120 positions in memory have been assigned for addresses of each character, either alphanumeric or numeric, which it is desired to print.

After the computer has processed the information which it wishes to print and has placed all addresses in their appropriate character bins, the computer is then prepared to output this information to the printer-buffer combination. When the computer is in its print mode of operation, it receives information from the printer telling it which character the printer is capable of printing. The computer then sorts through the appropriate bin, locating the addresses of all positions which the computer desires to print. These addresses are fed in sequence through the buffer, amplified and impedance matched by the buffer and then fed to the input register of the printer. The printer input register decodes the computer signals and pulses appropriate hammer magnets, causing the selected hammers in the printer to be triggered and dropped into a print cam so as to print the character.

After the computer has determined that one complete line of information has been sent to the printer, it then determines the vertical format or number of lines to be skipped on the printed form before the next line is printed. This skip information is then placed on the output lines of the computer, reduced by the buffer, and subsequently fed into the input register of the printer. At the end of the paper skip period, the printer feeds an input request signal back to the computer telling the computer that it is ready to print the next line of information. The computer then reduces the next line of information, repeats the previous sequence of accepting characters to be printed from the printer, and places the addresses of these characters on the output lines of the computer to be fed into the input register of the printer.

In most instances, a computer such as that presently under discussion for orientation purposes will be connected through its input-output lines to several pieces of equipment in addition to the printer. This other equipment may be tape readers, card readers, tape punches, or perhaps another computer. As the computer attempts to communicate with any one of the several units of such peripheral equipment attached to it, there is the possibility of causing malfunction in one of the other pieces of equipment. Steps must therefore be taken to insure that only the selected piece of equipment is able to send or receive information. Thus, th: buffer referred to above is placed between the computer and the printer to insure that no information is received from the printer and that no information is fed into the printer input register, except at times when the printer has been selected by the computer as an output device. The buffer accomplishes this function by controlling the gating of both the computer input to the address register and the printer output from the character generator. The buffer detects the printer select code from the computer and uses this code to enable or inhibit the gates in the buffer system. In addition to accomplishing the gating function, the buffer also serves as an impedance matching device between the output of the computer and the input to the printer, and between the output of the printer and the input of the computer.

The printer is designed to be a general purpose device that can adapt itself to most types of computers. However, cases occur where the printer cannot directly use either the wave shapes or the voltage levels which may be placed on the computer output line. In these cases, pulse forming and gating networks in the buffer are used to re-shape the pulses. Specific illustrations are the strobe line, which must be delayed from the computer information ready line, and the paper advance command, which is derived from the computer paper advance command but is re-shaped. The printer input register reset command is also derived in the buffer from computer output.

As will be seen from the subsequent detailed description, the specific printer disclosed herein involves the use of certain magnets associated with each print hammer, and a basic objective in the design of this printer is to energize the correct print magnets at the proper time to enable the selected hammers to fall into a print cam and be driven against the proper character on the print drum. The selection of one of the 120 print magnets is accomplished by the computer input decoding system, which uses the address placed on the input lines by the computer to set a group of input flip-flops, seven in this particular printer design. These seven printer input flip-flops are used in conjunction with a double level gating system to define one of 120 unique print positions. When the seven computer input lines define one print magnet, this input signal causes a circuit called a print magnet thyristor to be turned on through a resistor. Turning on the thyristor allows selection of the proper print magnet.

Synchronization between release time of the print hammer associated with the triggered print magnet and a mechanical print cam is accomplished through use of a variable reluctance magnetic pickup. This magnetic pickup senses the position of the lobes formed on the print cam and is used to trigger the printer control timer. The printer control timer is an interrelated group of one-shot multivibrators that determines the length of each portion of one print cycle. A print cycle is defined as the time required for succeeding rows of identical characters on the print drum to pass a fixed line, such as the line of print hammers; in the particular printer disclosed, it covers a period of 6.25 milliseconds.

The above print cycle is itself divided into three different times referred to herein as the reset time, the read time, and the type command time. More specifically, the reset time is a period of one-half millisecond following detection of a lobe on the print cam; during this period, the thyristors, which control the 120 print magnets and have been previously energized, are simultaneously turned off or put at zero position.

During the next two milliseconds, the read time, a printer input request signal is generated by the control timer. This printer input request signal is processed through the buffer and fed into the computer, telling the computer, so to speak, that during these two milliseconds time is available to feed the addresses of particular characters into the printer. The computer then scans the printer character generator for the character on the print drum approaching the print hammer positions and places the addresses of all positions for this character in storage on the computer output lines. During this two millisecond printer input request or read time, all thyristors at hammer positions called for by the computer are thus energized.

The following 3.75 milliseconds of the print cycle, the type command time, are taken up by the print magnet power period or type command. During this time, a high current pulse is gated to all hammer magnets whose thyristors have previously been selected. At the end of the 3.75 milliseconds type command period, all hammers requested by the computer will have been positioned in the path of the print cam. The next cam lobe is then sensed by the magnetic pickup, and a new reset signal is generated to turn off all thyristors in the unit.

The paper moving means employed in this printer includes a solenoid controlled spring clutch. Thus, in addition to energizing the proper print magnet at the proper time, another basic objective of this printer design is to energize the spring clutch solenoid at the proper time and for the proper length of time. In this case, the length of time is critical. A 10 millisecond input signal to the spring clutch solenoid will result in paper motion on one line; energizing the clutch for multiples of 10 milliseconds will result in multiple line skip. In the present system configuration, the spring clutch solenoid is fed with two levels of signal, a first high power system and a second low power system. The first level of signal is a high current 10 millisecond signal insuring that the solenoid, and thus the spring clutch, is energized rapidly and positively and resulting in paper motion of one line; the second input is a paper vertical format control of lower level which may be sustained for continuous duty and which will cause the spring clutch to continue to be energized, although it may not insure actuation of the spring clutch. When single line skip mode is required, the vertical format control system will not be energized; where multiple line skip is required, the computer will feed a paper skip signal into the input decoding system, the skip signal being subsequently decoded and used to energize one of eight printer OR gates.

The vertical format control is a photodiode system comprising an eight channel photodiode paper tape read mechanism, the paper tape motion being mechanically synchronized with the motion of the paper drive spring clutch. Actually, there are nine photodiode channels, but one is used for strobe. Each of the other eight channels of the paper tape may comprise a commonly used print format. By gating together one of the eight printer AND gates elected by the input decoding system and the eight channels of output from the vertical format control photodiode system, it is possible to select one of eight commonly used paper formats with the computer. The selected channel is then fed into the paper vertical format control system and is used to stop paper motion at the appropriate time.

The printer includes a print drum character generator comprising a code disk photodiode system. The code disk is mechanically fastened to the print drum mechanism, and it generates a parallel character synchronized with the character on the print drum. The output of these photodiodes are amplified and impedance matched in the buffer and gated to the computer at all times when the buffer is in the printer select mode.

It has already been stated that the printer under consideration is designed to print a maximum of 120 characters per line and that it involves the use of magnets associated with the print hammers. Actually, the printer contains 120 polarized magnets, called hammer electromagnets, associated with print positions 1 through 120. Each electro-magnet has two windings, a holding coil winding and a pulse coil winding. The holding coil winding is continuously energized during operation of the printer and has sufficient strength to hold a print hammer interposer system, which includes an actuator lever having an armature, clear of the print cam. The pulse coil is wound on the same bobbin with the holding coil. The ampere turns of the pulse coil exceed those of the holding coil, and they are so sensed when energized that they oppose the force of the holding coil, thus freeing the print hammer armature and enabling the print hammer to be operated by the print cam each time a pulse coil is energized. All of the 120 pulse coils are driven in parallel by a type command power amplifier, but only hammers selected by the hammer magnet trigger gate system will be printed.

As already explained, the synchronizing magnetic pickup referred to above senses the time at which a particular character is beginning to appear beneath the hammer and resets all pulse coil thyristors, reset occupying 0.5 millisecond. During the next two milliseconds of the print cycle, the printer is prepared to receive the address of all hammers which the computer desires to print on the particular character beneath the hammers. It is during the remaining 3.75 milliseconds of the print cycle, that power is applied to all of the pulse coils in parallel, and any hammers which have been thus selected during the input request period will be released into the print cam.

While type command power is applied to all pulse coils, only selected pulse coils will be energized. The electrical circuit is completed from a type command power amplifier buss, through the selected pulse coil and then through the thyristor of the selected units to ground. The thyristor is a semiconductor device having characteristics similar to those of a vacuum tube thyratron. The thyristor may be turned on with a low level short duration signal on the base, but it must be turned off by reducing thyristor circuit current to a level which is less than the device sustaining current. Turn off of all thyristors is accomplished in parallel by driving both the reset buss and the type command power amplifier buss to 0 volts simultaneously for a period of 0.5 milliseconds. Each thyristor may be selected and turned on in less than 7 microseconds, and all 120 thyristors may thus be serially selected in appreciably less than the 2 milliseconds of input request time. The reset power amplifier buss is driven by a transistorized emitter follower system; the emitter follower, in turn, is driven by a 0.5 millisecond reset buss control one-shot multivibrator, the multivibrator being triggered by the synchronizing magnetic pick-up. The type command power amplifier buss is driven by a transistorized emitter follower system which in turn is driven by a type command control flip-flop. The type command control flip-flop is set by the trailing edge of the signal from the printer input request one-shot multivibrator, and it is reset by the leading edge of the signal from the reset buss one-shot multivibrator. The printer input request one-shot multivibrator is triggered by the trailing edge of the reset signal and switches for 2 milliseconds, feeding a signal back to the computer-buffer system which may or may not be differentiated.

All thyristors are reset or turned off at the beginning of a print cycle by causing the printer reset command and the printer type command busses to simultaneously go to 0 volts, reducing the current through the thyristors below the sustaining current level. During the following 2 milliseconds, voltage will be applied to the thyristor collector through the printer reset command and buss, but no voltage will be applied to the hammer magnet pulse coils through the printer type command buss. This allows the thyristors to be selected and turned on into a non-inductive load in serial order, and it insures that all hammer magnet pulses are of equal length. Turn off or leakage current is supplied to the base of the thyristor through a resistor to the power supply. Turn on current is supplied through an isolated diode by a resistor-capacitor network connected to the computer input decoding system.

Referring again to the computer input decoding system consisting of seven printer input flip-flops which receive and store the address of the particular character that the computer wishes to print, the state of the seven input flip-flops is used to define one of the 120 unique hammer positions through the two level gating system. The true and prima sides of the first three flip-flops are used to drive eight diode AND gates; the outputs of the other four flip-flops are used to drive fifteen OR gates. The product of the fifteen OR gates and the eight AND gates are used to drive the resistor-capacitor input networks to 120 hammer magnet thyristors.

It is possible that the switching speeds of the seven input flip-flops are not identical. If the transient signals during the set and reset time of these flip-flops is allowed to propagate through the gates, a hammer may be erroneously selected. The gate system is therefore inhibited by a strobe signal during input flip-flop set and reset times. This strobe is derived by the buffer and fed through the strobe or matrix trigger input amplifier to a fourth input on each of the eight AND gates. The thyristor requires a negative going base current of 5 milliamperes for a period of 150 microseconds to ensure turn on. This base current is derived by charging the input capacitor at a slow rate for a minimum of 6 microseconds, and discharging the input capacitor through the thyristor base for a minimum of 150 millimicroseconds. Gate current requirement during the capacitor charge cycle is low due to the large input network series resistor. Gate current requirement is also low during the capacitor discharge cycle, due to the fact that only one of the 120 input capacitors has been charged, and must therefore be discharged. The outputs of both the AND and the OR gates are either 0 or plus 10 volts. The combination which produces triggering of the thyristor is a 0 voltage out of the OR gate and plus 10 volts out of the AND gate; this causes the thyristor input capacitor to be charged to 10 volts, with the minus polarity facing the thyristor input diode. When the AND gate potential switches from plus 10 to 0 volts, the capacitor discharges through the base of the thyristor, causing the device to turn on.

When the computer-buffer system determines that all required information has been printed on one particular line of the data sheet, the start paper advance input signal will be generated and fed into the printer. Since the start paper advance signal is a 1.2 milliampere signal of 8 microsecond minimum duration with maximum rise time of 0.3 microseconds, it is possible, in the case of some computer-buffer systems, for this start paper advance signal to be derived and sent to the printer before the mechanical operation of completing printing has been finished. When the printer receives a start paper advance signal and the spring clutch causes the paper motion mechanism to start while print hammers are still striking the paper, the paper feed holes may be elongated or torn. To prevent this, a start paper advance delay one-shot multivibrator is inserted between the start paper advance input and the start paper advance control multivibrator; this delay insures that print hammer motion will have been completed before paper motion begins.

The inertia in the paper drive mechanism is sufficient so that a damped oscillation takes place at completion of paper advance; if hammers are allowed to fall on the paper during this oscillation time, "haloing" or deterioration of print quality may occur. Accordingly, a printer input request inhibit signal is sent to the computer-buffer system to prevent input to the printer until paper motion has been damped out. The printer input request inhibit signal is derived by monitoring the high power and low power paper drive system and using the end of the paper drive signal to trigger a printer input request inhibit one shot multivibrator. The delay inherent in this multivibrator insures that no print signals are received until paper motion has been mechanically damped out.

The high power paper drive amplifier is a conventional, common-emitter power amplifier driven by an emitter follower power amplifier which in turn is driven by a ten millisecond start paper advance one-shot multivibrator. The start paper advance input causes a ten millisecond power pulse to appear across the spring clutch control solenoid. This pulse is long enough to insure actuation of the spring clutch system long enough to insure one line of paper advance, but not long enough to allow two lines of paper advance. When the printer is in the multiple line skip mode and the clutch control solenoid is being energized by the low power paper drive amplifier, the time at which the solenoid is de-energized to stop paper advance is very critical. For a given number of lines of paper skip, if the electrical signal to de-energize the solenoid is given too soon, one line too few of paper advance will result; if the electrical signal is given too late, one more line of skip than is requested by the computer will result.

To insure that the control solenoid energization is properly synchronized, the electrical signal to the low power paper drive amplifier system is derived from the vertical format control photodiode system. The vertical format control photodiode system comprises an eight channel photodiode block, a punched paper tape transport mechanism mechanically connected to the printer paper motion mechanism and a light-lens system to illuminate the photodiodes.

The low power paper drive system, which is used to maintain the spring clutch control solenoid energized during multiple line skip, is driven by a paper drive format control flip-flop. This flip-flop is set by the same start paper advance input signal which energizes the high power paper drive one-shot multivibrator. When the printer is in the single line skip mode, both the start paper advance one-shot multivibrator and the paper drive format control flip-flop are energized, giving both high power and low power paper drive signals to the spring clutch solenoid. However, the paper drive format control flip-flop is reset by the stop paper advance signal before completion of one line of paper advance. In the multiple skip mode, both high power and low power paper drive systems are energized by the start paper advance input. The stop paper advance signal, which resets the paper drive format control flip-flop, is derived from a selected channel of the vertical format control photodiode system. Selection of this channel may be accomplished in one of two ways: A manual switch may be used, or one of the eight photodiode channels may be selected by the computer-buffer system and gated to the stop paper advance AND gate. In this way, the signal which controls the number of lines of paper skip is derived from a system that is mechanically coupled to the paper drive mechanism, which insures that the paper stop signal arrives at the printer electronics in proper time sequence. A change of paper tape in the reader allows a maximum of flexibility in selection of paper format.

It will be understood, of course, that the specific voltage and current values and the times stated in the above general discussion are given mainly for the purpose of indicating the mode of operation; that is, they are not in any way intended to be limiting, it being apparent that the printer design could be varied in this respect.

Inasmuch as the print drum is continuously rotated at a relatively high speed and a line of print is completed on a single revolution of the print drum, it is apparent that the print hammer mechanism must necessarily be capable of extremely rapid operation. At the same time, however, the hammer mechanism must give printing of uniform intensity and spacing, be relatively easy to assemble and repair and be dependable in operation.

From the above general discussion of the printer it is apparent that one of the objects of the invention is to provide a printer for use with electronic computers or the like having an improved paper motion system.

Another object is to provide a paper motion system for a printer or similar device including a solenoid operated spring clutch actuating device and electronic means for selectively energizing the solenoid to produce paper motion.

Another object is to provide a paper motion system for a printer or similar device as set forth above including a high power circuit for energizing the clutch solenoid to start paper motion and a low power circuit to maintain the solenoid of the spring clutch energized to provide multiple line skipping.

Another object is to provide a paper motion system as set forth above wherein the high power circuit is energized to initiate paper motion a predetermined time after the reception of a paper advance signal.

Another object is to provide a paper motion system as set forth above wherein means are provided in conjunction with the low power circuit for controlling the duration of energization of the spring clutch solenoid to determine the exact number of lines skipped.

Another object is to provide a paper motion system as set forth above for use with a line printer including means for producing a printer input request inhibit signal a predetermined time before the spring clutch solenoid is energized.

Another object is to provide a paper motion system as set forth above for use with a line printer including means for producing a printer input request inhibit signal for a predetermined time after the spring clutch solenoid is de-energized.

Another object is to provide a paper motion system which is simple in construction, economical to manufacture, and efficient in use.

These and other objects and advantages of the invention will become apparent by reference to the following specification and the accompanying drawings, wherein.

Figure 1:
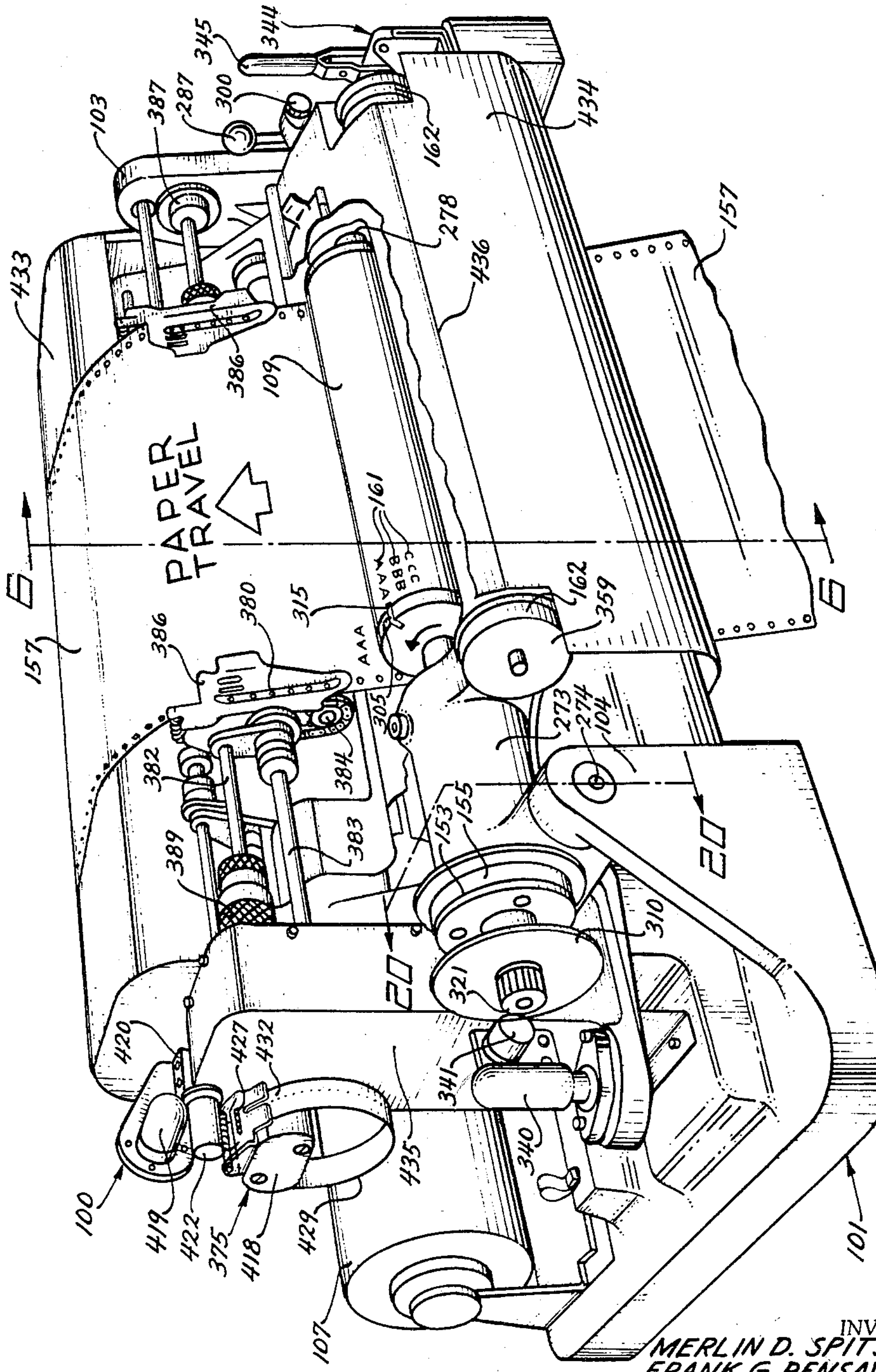
FIGURE 1 is a perspective view of a printer embodying the invention.
Figure 2:
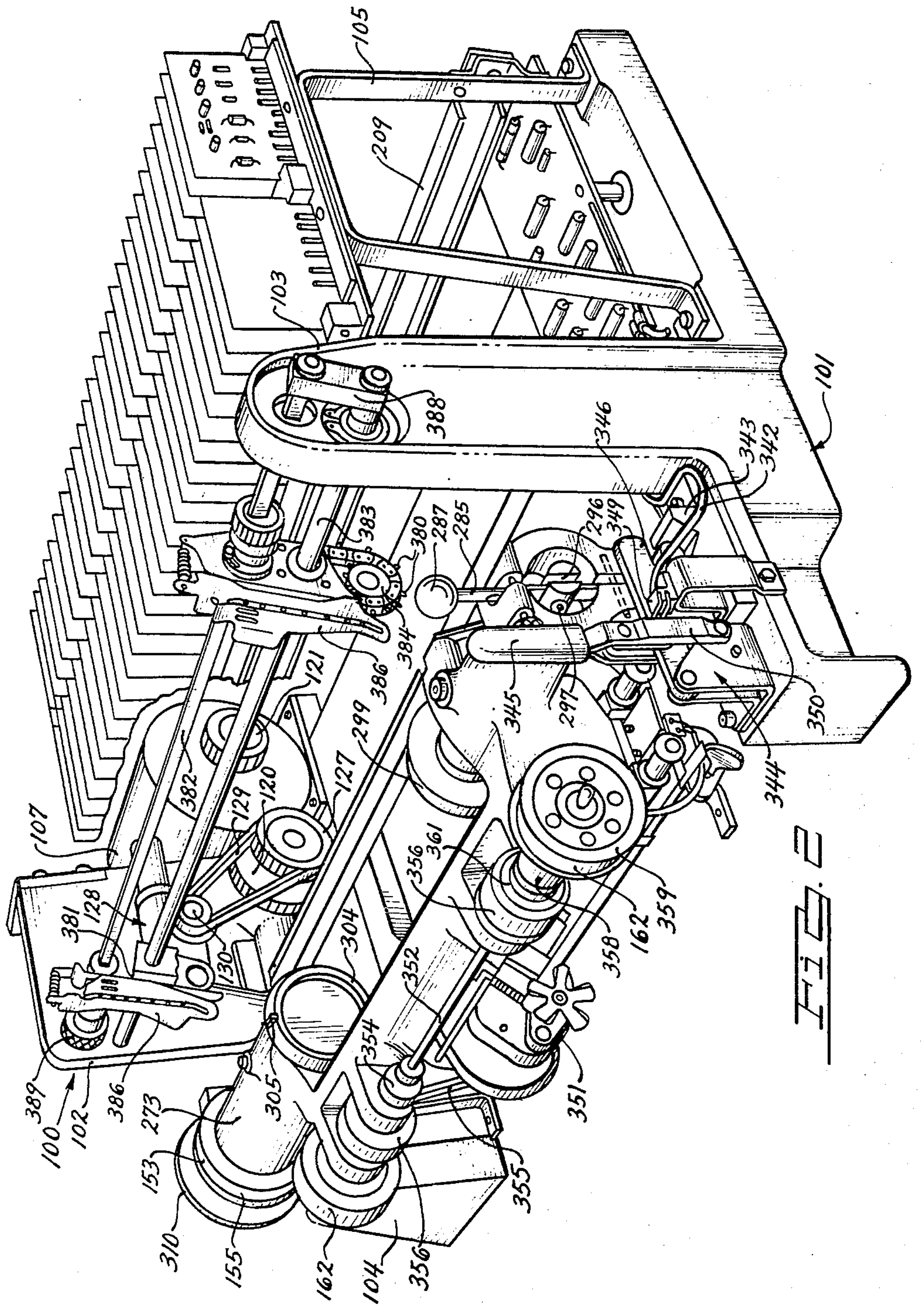
FIGURE 2 is a perspective view similar to FIGURE 1, except that it is taken from the opposite side of the printer and with some of the elements and subassemblies thereof removed.
Figures 3, 22:
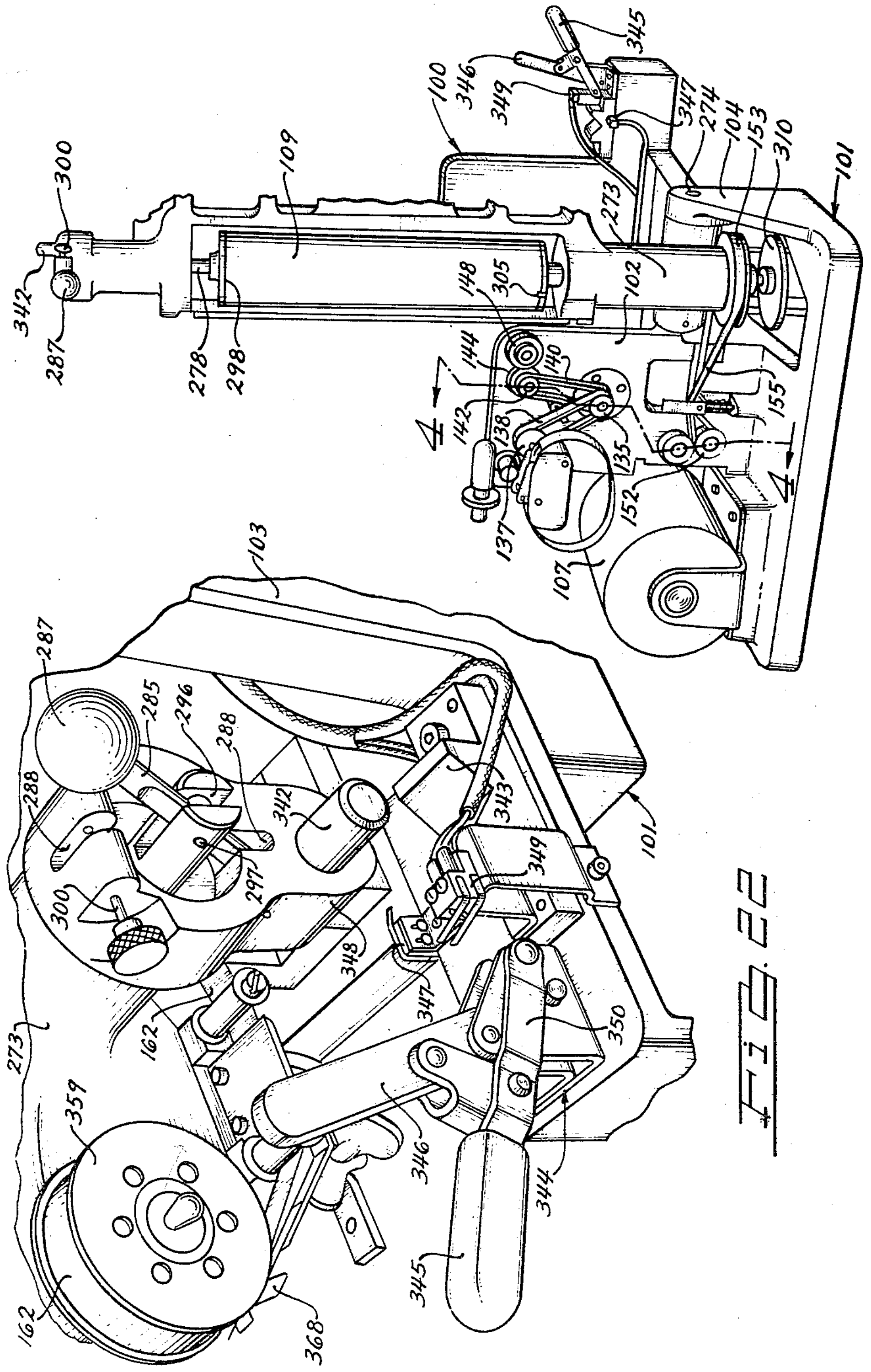
FIGURE 3 is a perspective view of the printer taken from an angle similar to that of FIGURE 1, but on a smaller scale and with the print drum raised to the non-print position.
Figure 4:
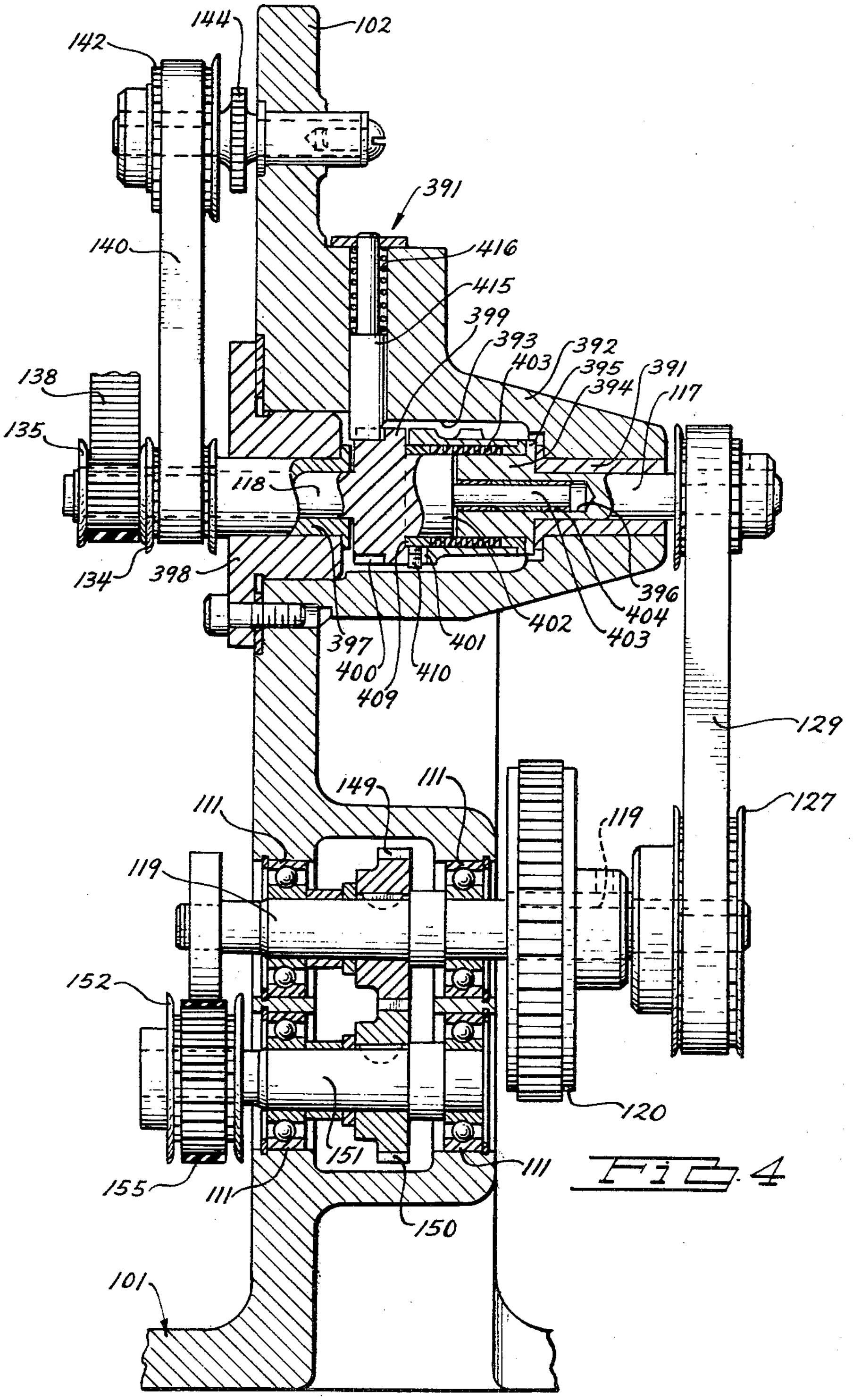
FIGURE 4 is an enlarged cross-sectional view taken on the plane of line 4—4 of FIGURE 3 and looking in the direction of the arrows.
Figure 20:
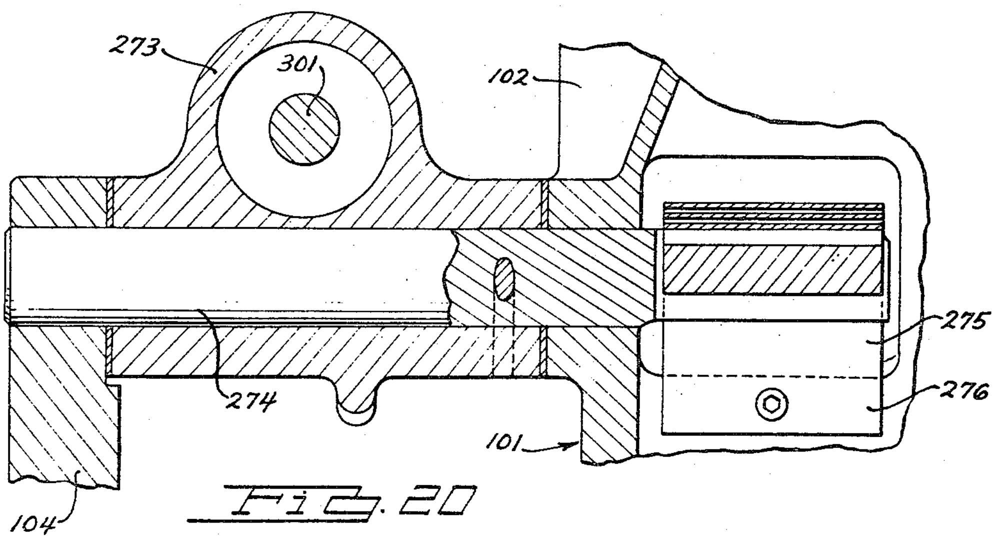
Figure 6:
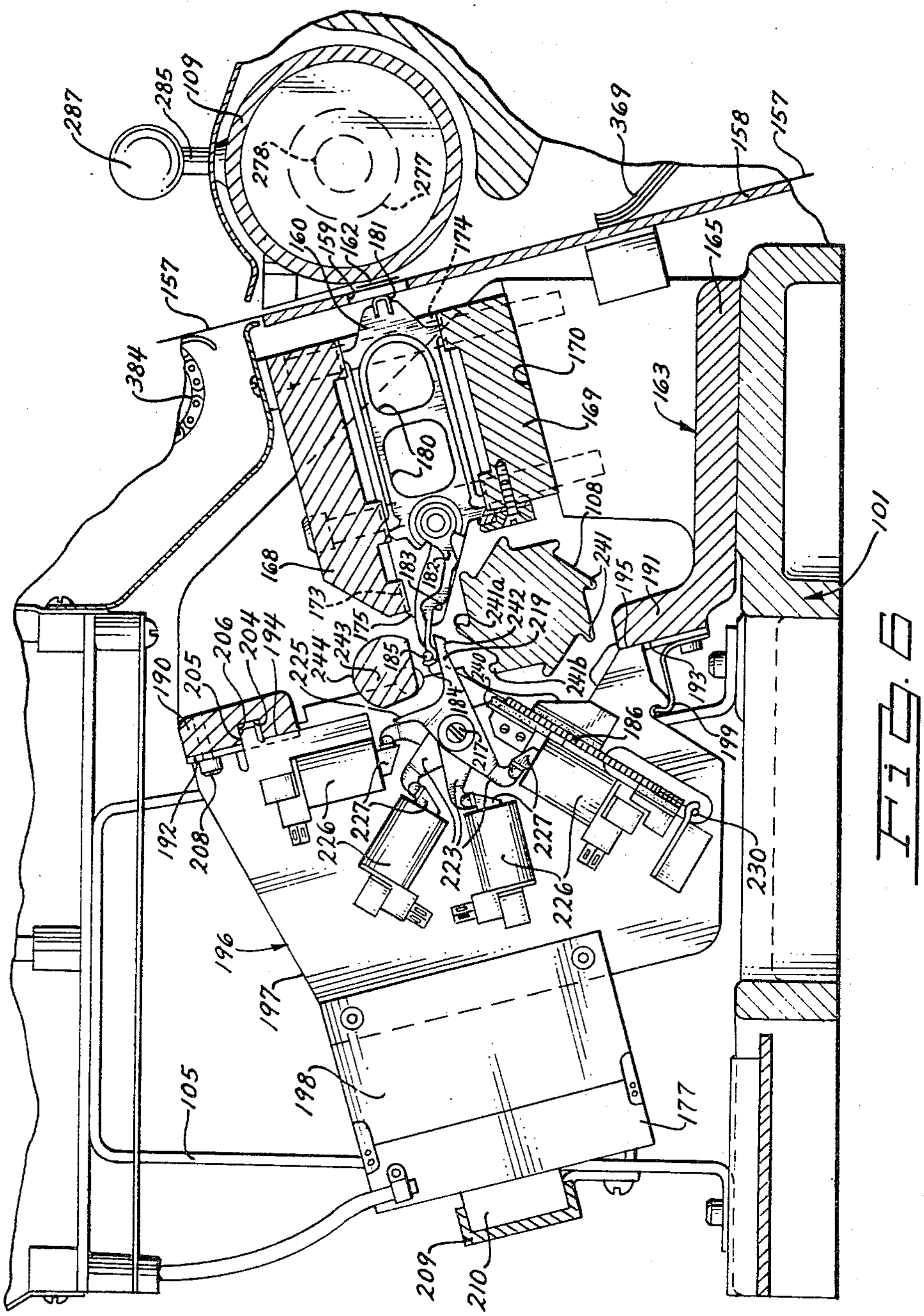
FIGURE 6 is a cross-sectional view, with portions thereof cut away, taken on the plane of line 6—6 of FIGURE 1 and looking in the direction of the arrows.
Figure 15A:
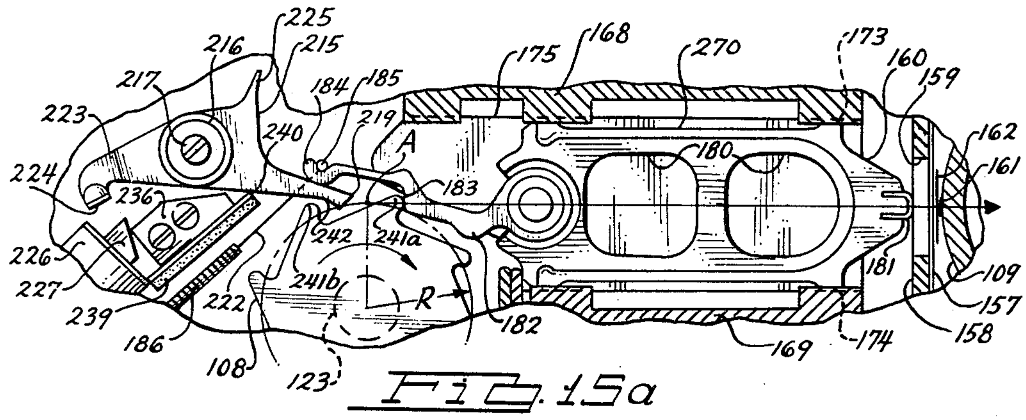
Figures 16, 29:
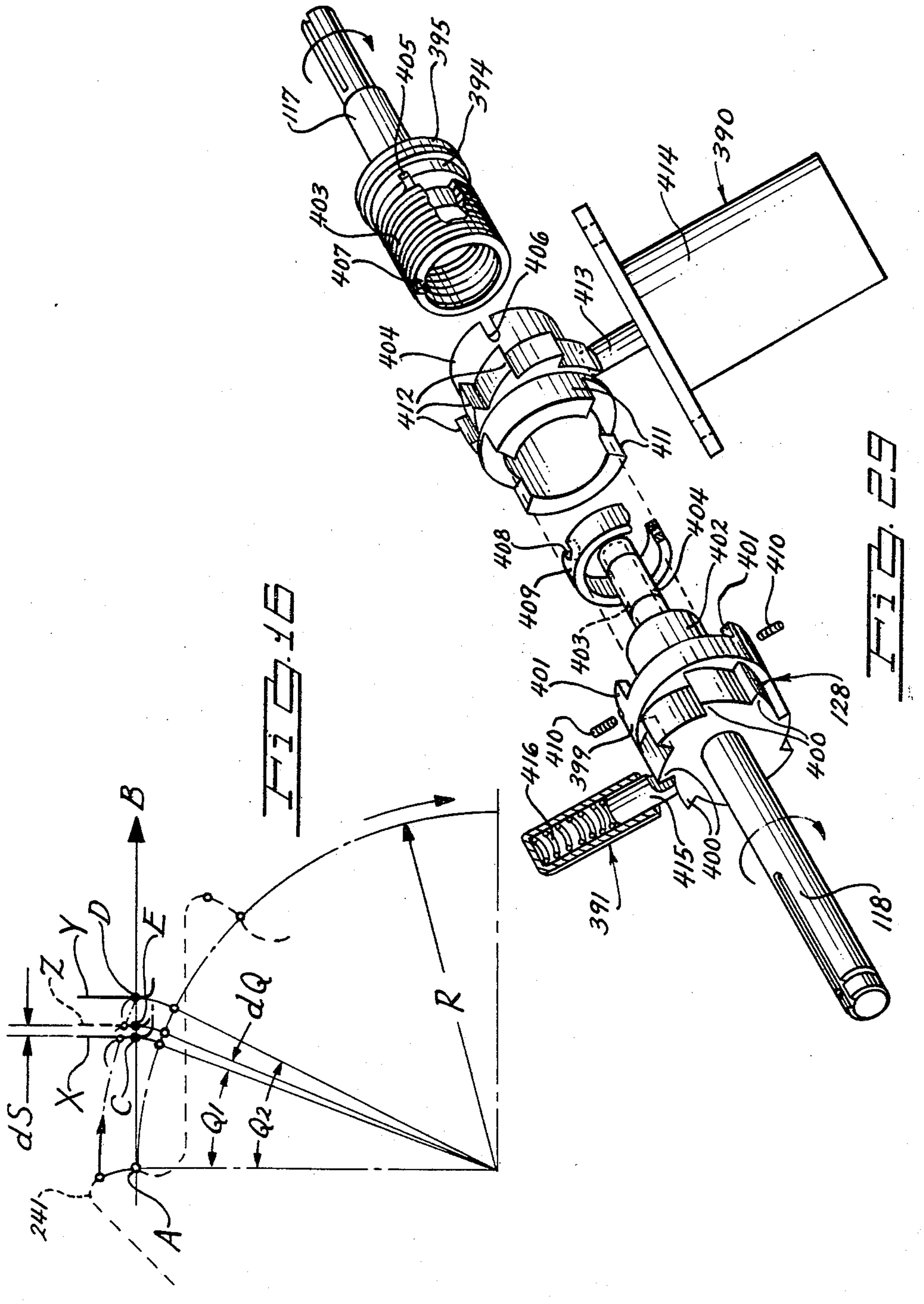
Figure 17:
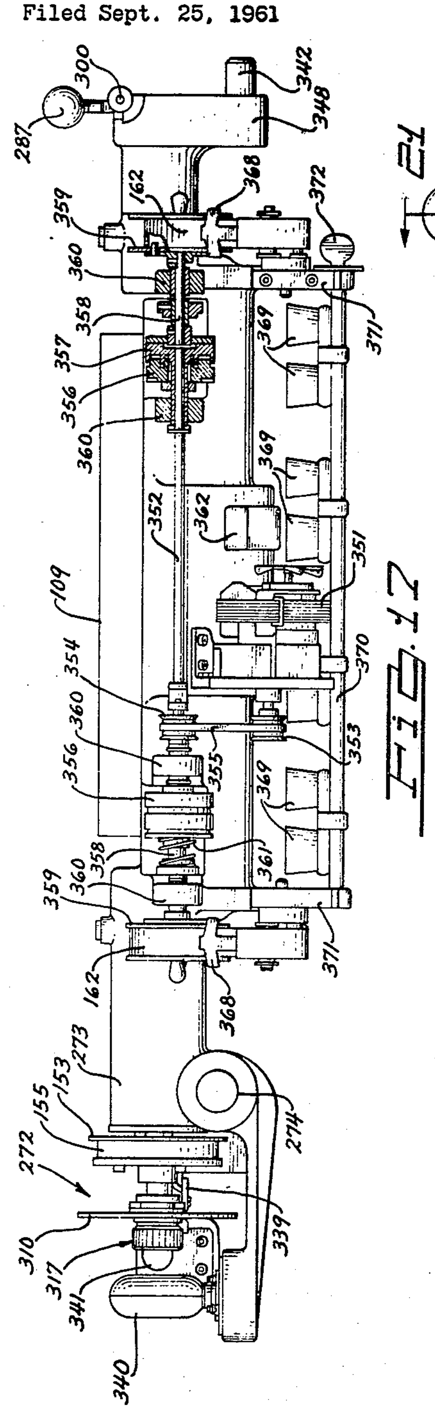
Figure 19:
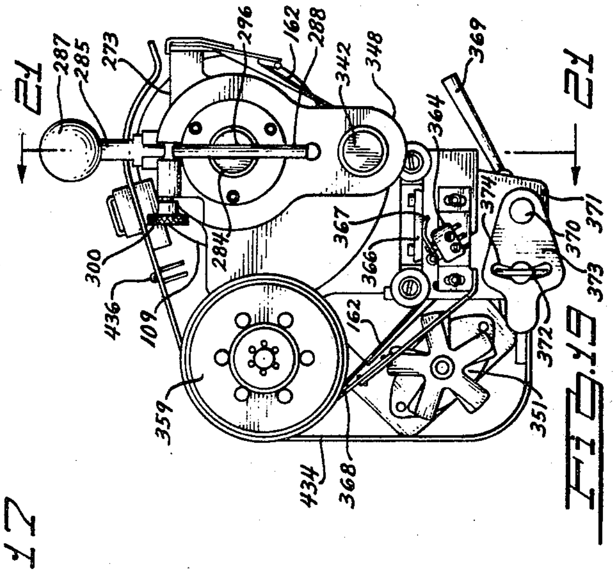
Figure 18:
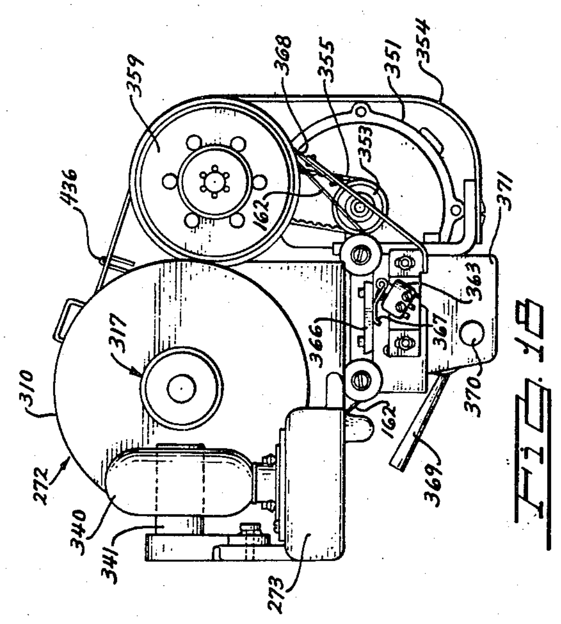
Figure 21:
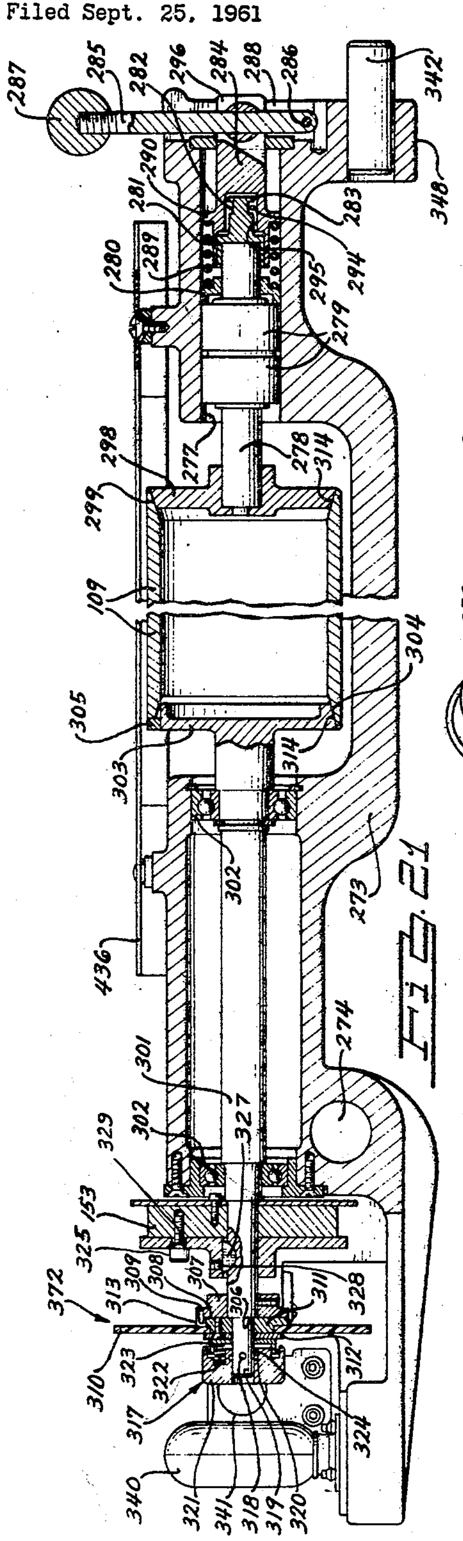
Figure 26:
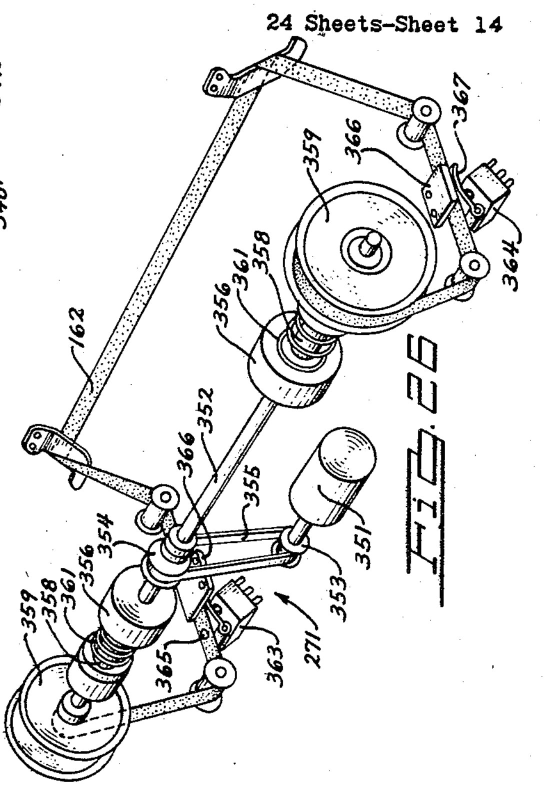
Figure 23:
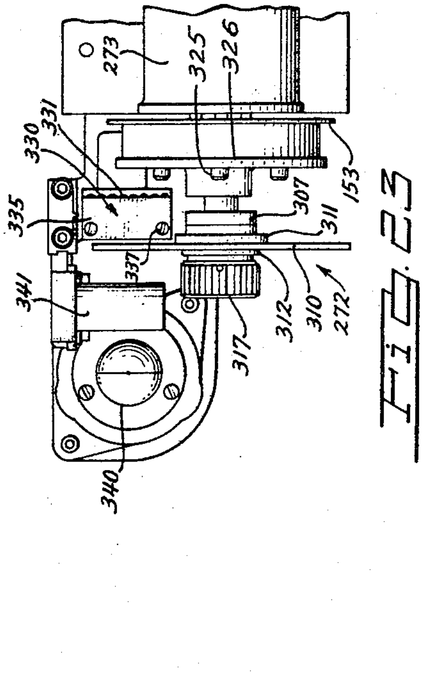
Figures 24, 25, 27, 28:
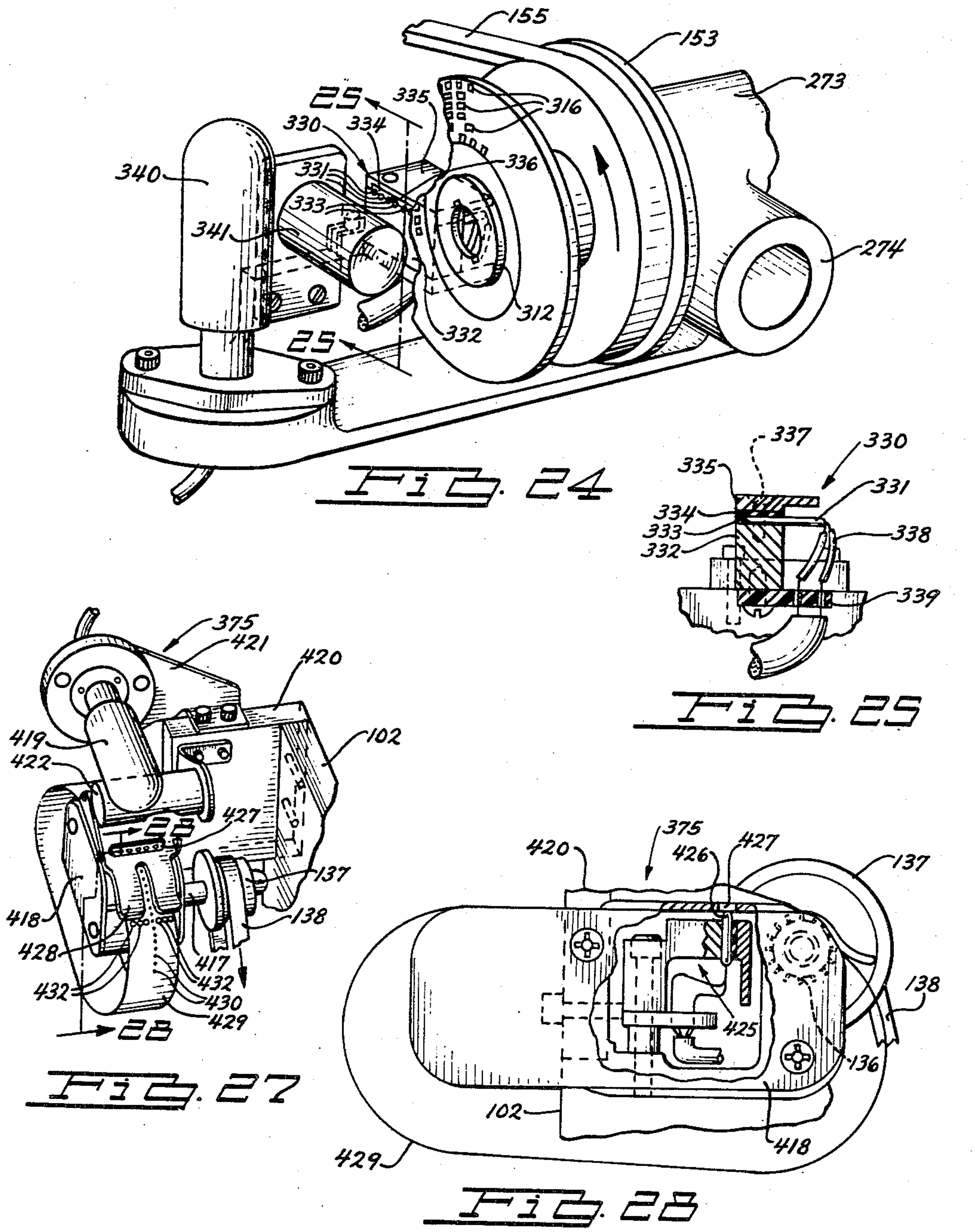
Figure 30:
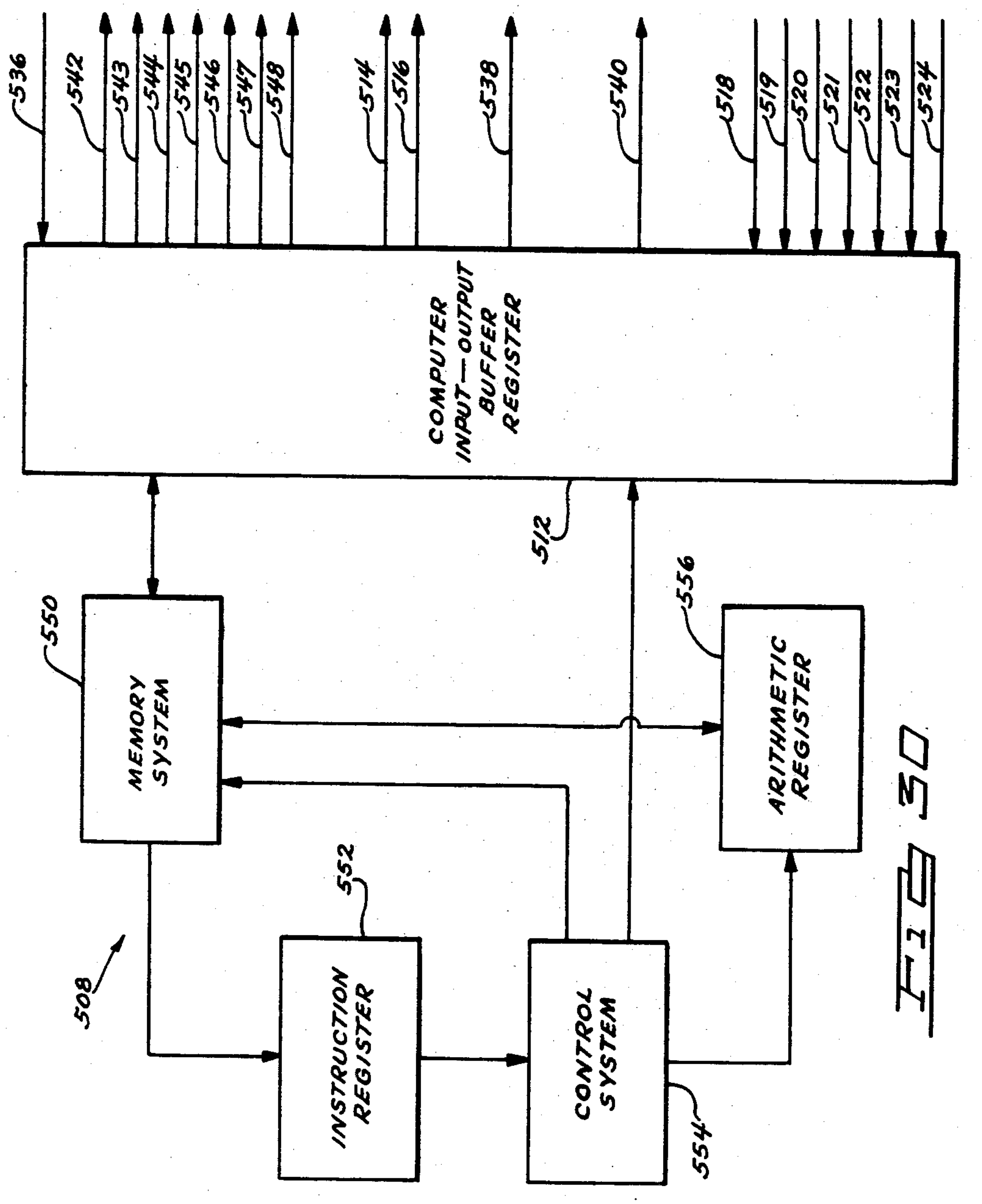
Figure 31:
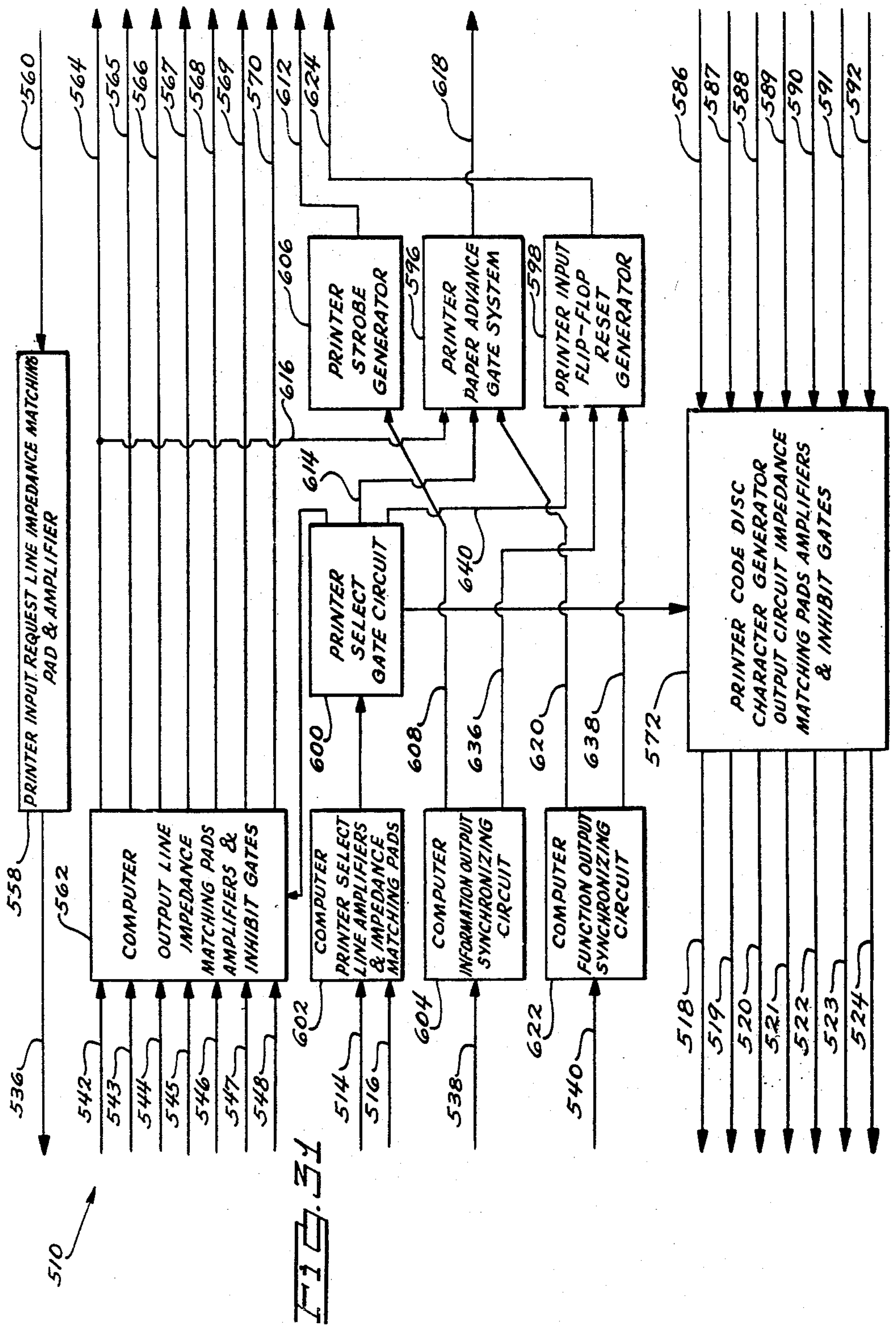
Figure 32:
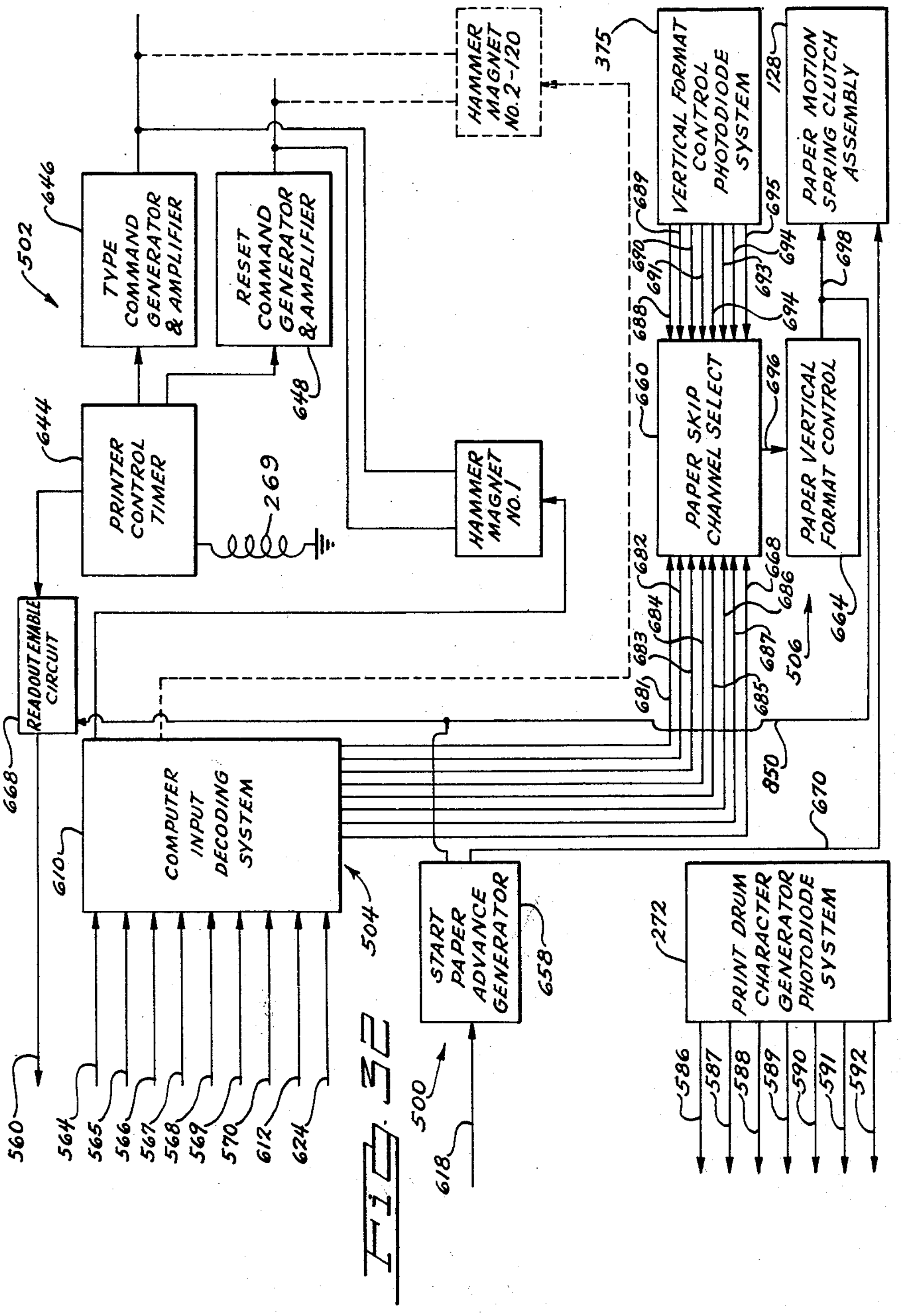
Figure 33:
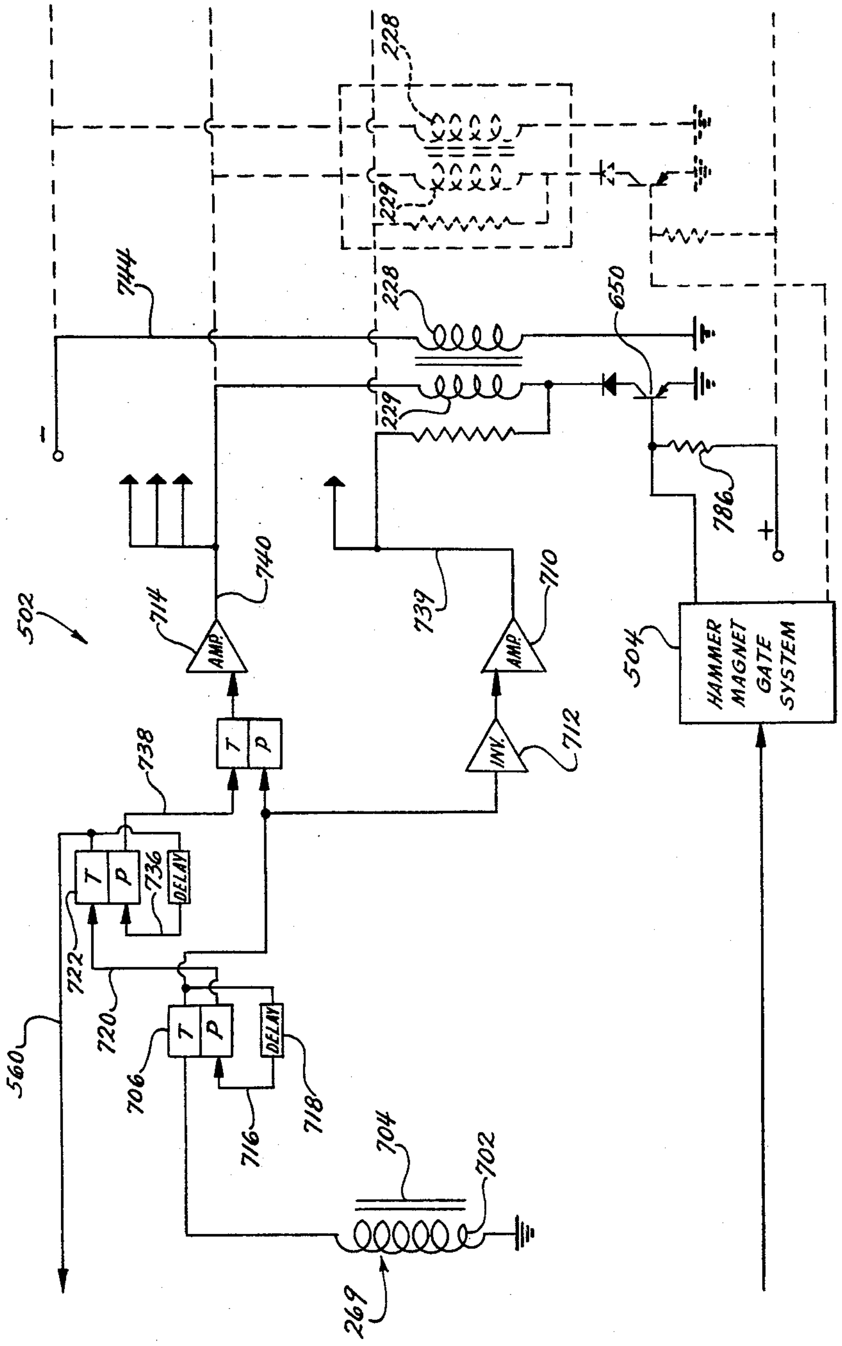
Figure 34:
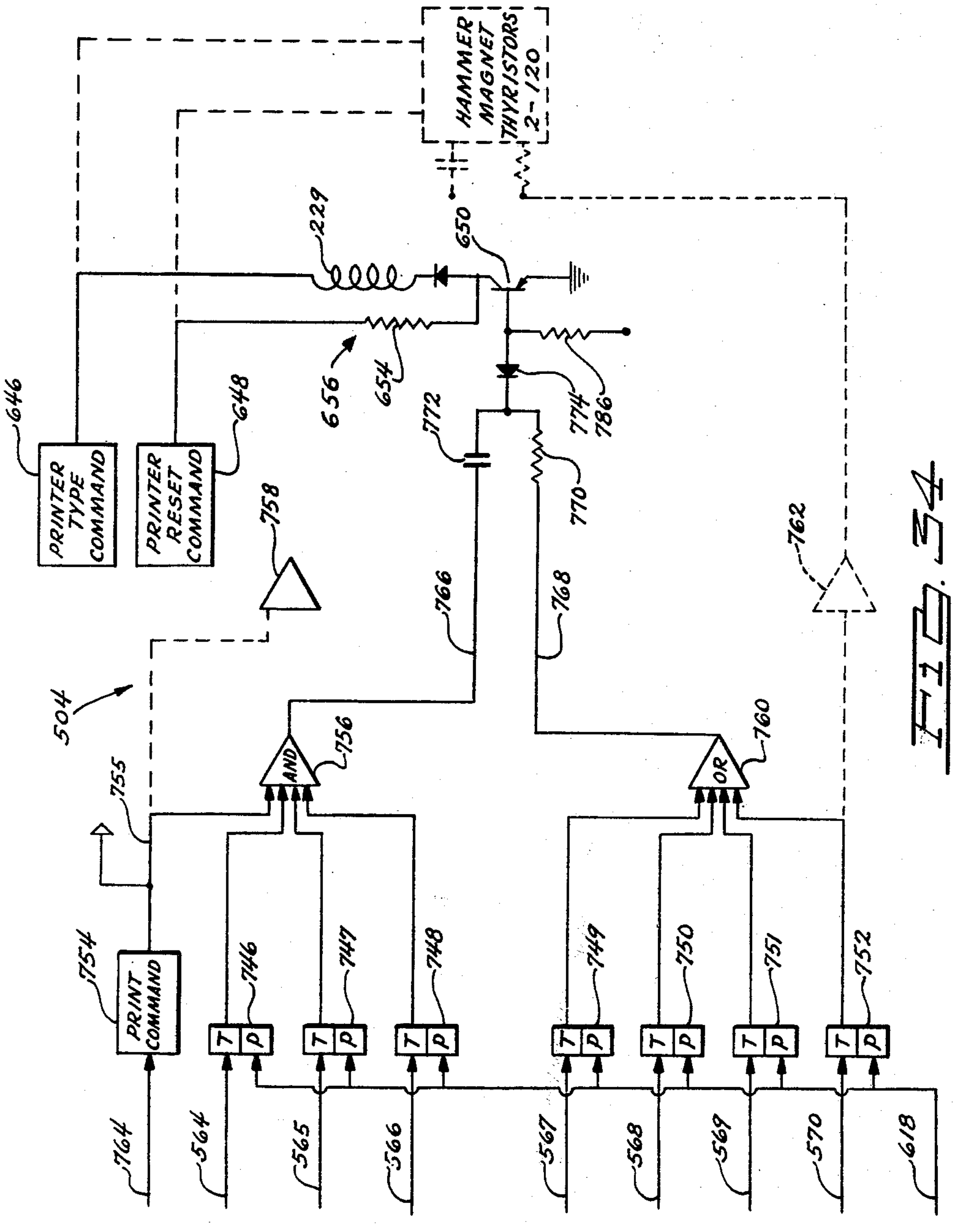
Figure 35:
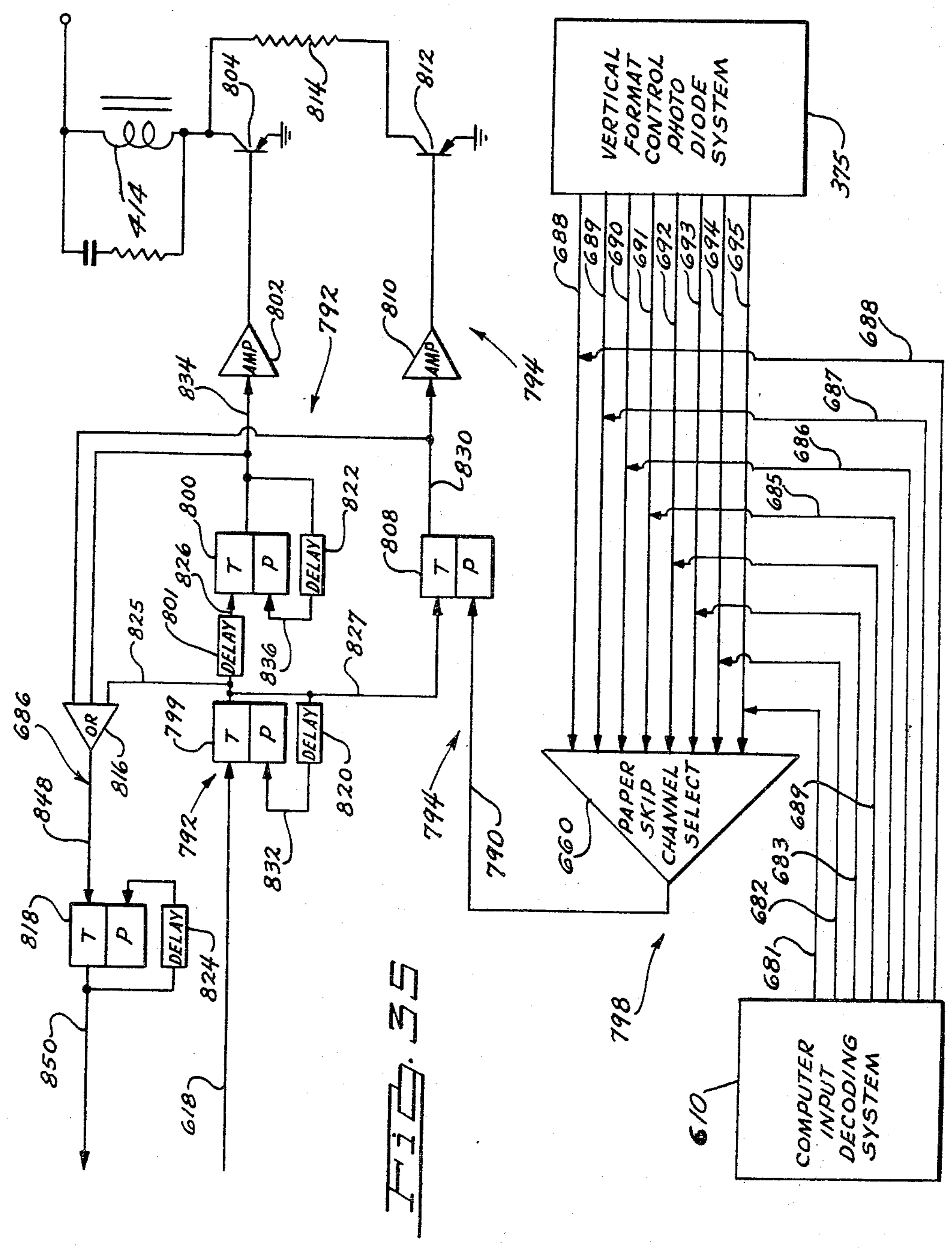
Figures 38A, 40A, 40B:
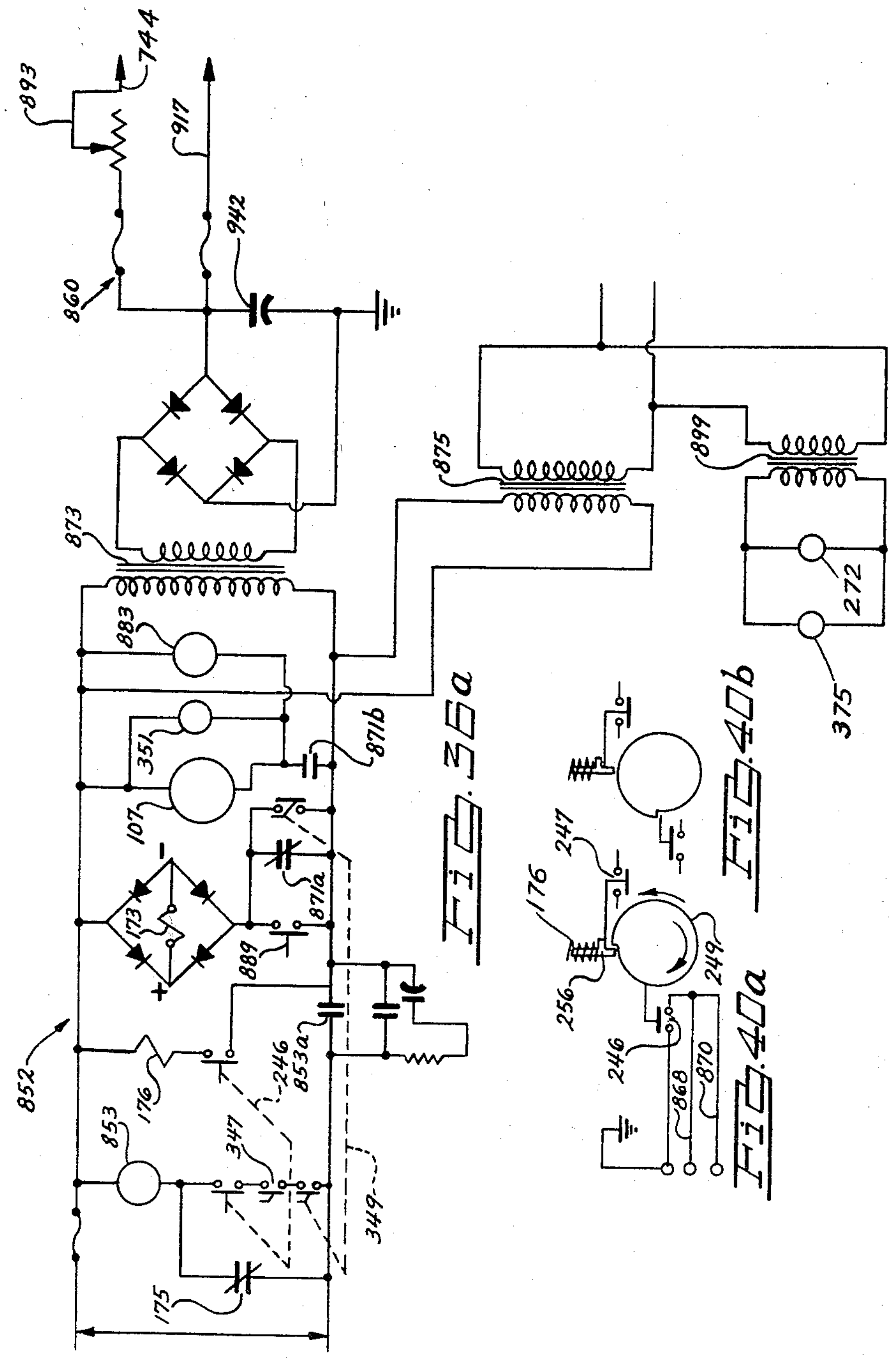
Figure 35B:
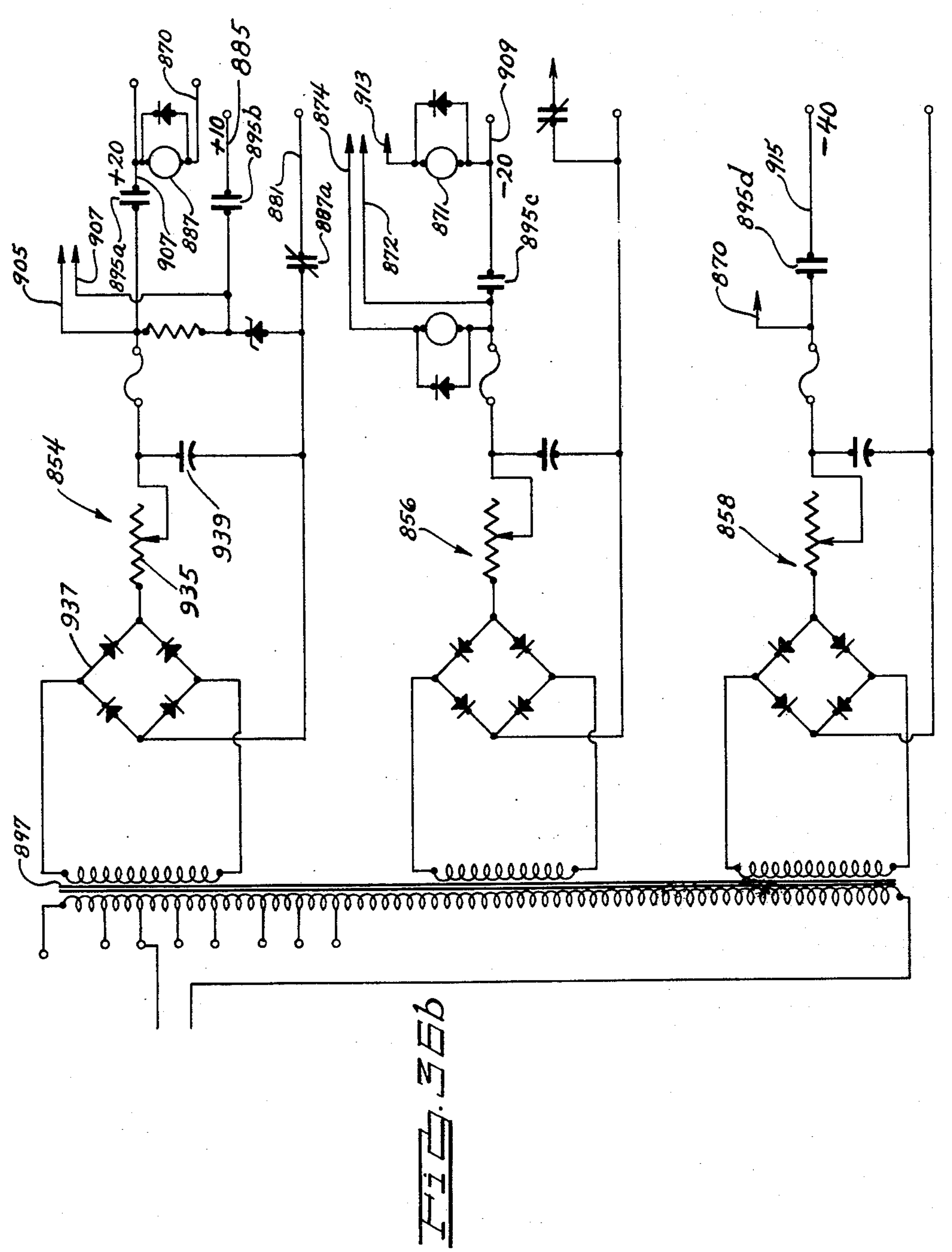
Figure 38:
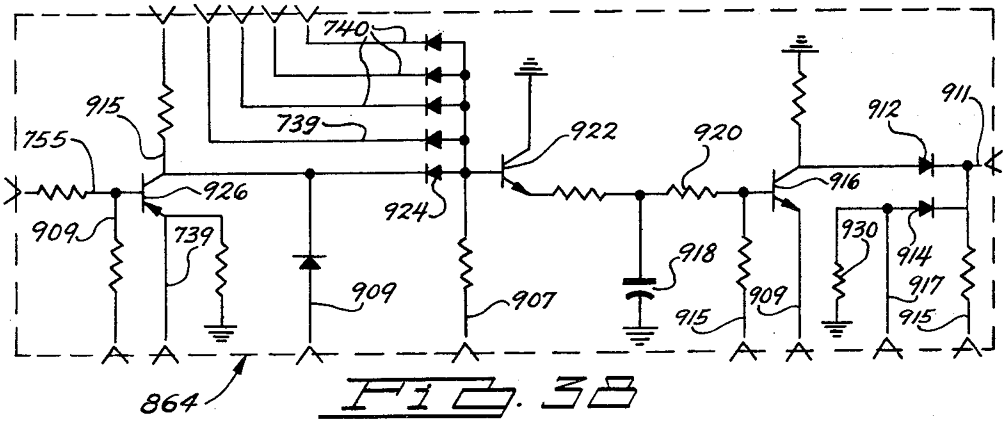
Figures 37, 39:
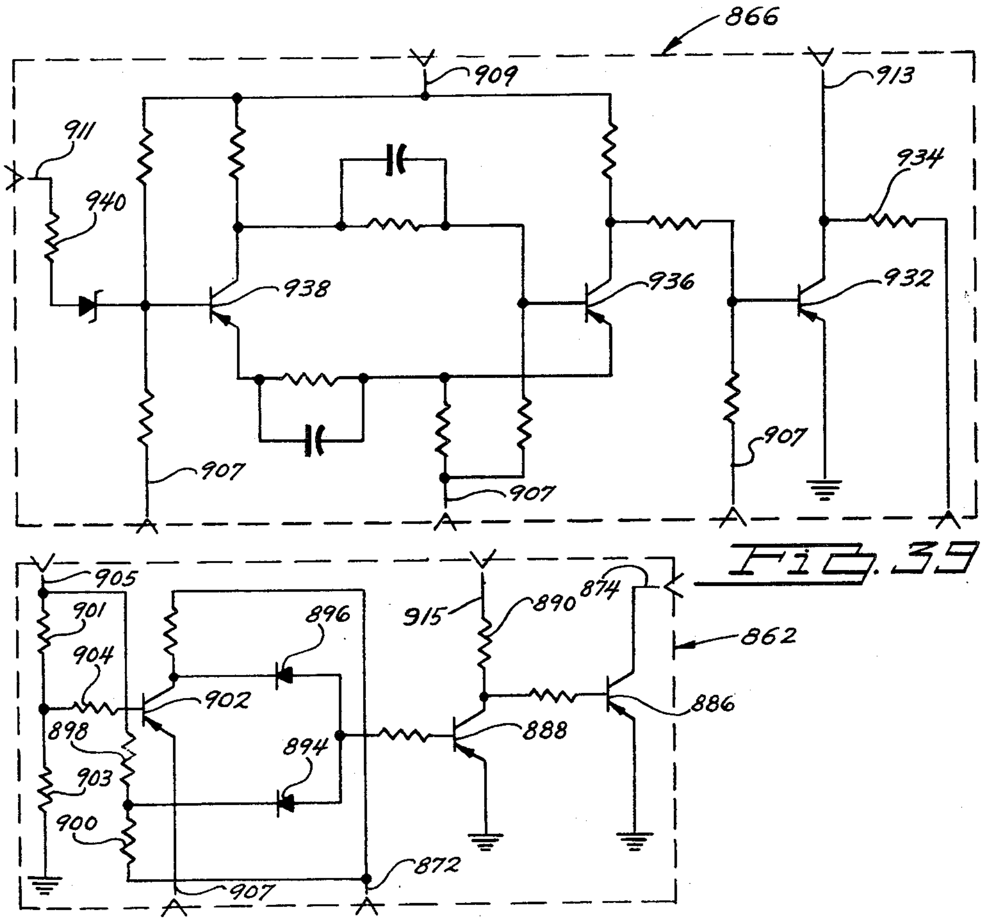

FIGURES 15*a*, *b*, and *c* are fragmentary views taken on the same plane as the plane of FIGURE 6 and which, together with FIGURE 6, illustrate the relative positions of the elements of a single hammer assembly during various intervals of a single printing cycle;

FIGURE 16 is a geometric illustration of the involute profile shape of each hammer impacting cam lobe provided to insure uniform velocity and directiton of impact of all addressed hammers, regardless of any variation in the alignment of the hammers just prior to impact;

FIGURE 17 is a front elevational view of that portion of the printer on which the print drum mechanism and the ribbon drive mechanism are mounted;

FIGURE 18 is a slightly enlarged elevation view taken from the left-hand end of FIGURE 17;

FIGURE 19 is a view similar to FIGURE 18, but taken from the right-hand end of FIGURE 17;

FIGURE 20 is a fragmentary enlarged cross-sectional view taken on the plane of line 20—20 of FIGURE 1 and looking in the direction of the arrows;

FIGURE 21 is a cross-sectional view taken on the plane of line 21—21 of FIGURE 19 and looking in the direction of the arrows;

FIGURE 22 is a fragmentary portion of FIGURE 2, enlarged to show the elements thereof in greater detail and with the print drum in the unlocked position;

FIGURE 23 is a fragmentary top plan view of the left-hand portion of FIGURE 21;

FIGURE 24 is a slightly enlarged perspective view, with portions thereof cut away, of the left-hand portion of FIGURE 17;

FIGURE 25 is a fragmentary cross-sectional view taken on the plane of line 25—25 of FIGURE 24 and looking in the direction of the arrows;

FIGURE 26 is a perspective view of the ribbon drive mechanism when separated from the structure of FIGURES 17–19;

FIGURE 27 is a slightly enlarged and more detailed perspective view of the upper left-hand portion of FIGURES 1 and 3 illustrating the format control mechanism;

FIGURE 28 is a side elevational view, with portions thereof broken away and in cross-section, taken on the plane of line 28—28 of FIGURE 27 and looking in the direction of the arrows;

FIGURE 29 is an exploded perspective view of the spring clutch mechanism shown in the upper portion of FIGURE 4;

FIGURE 30 is a block diagram illustrating a representative computer with which the printer may be used;

FIGURE 31 is a block diagram illustrating a representative buffer which may be used between the computer illustrated in FIGURE 30 and the printer;

FIGURE 32 is a block diagram illustrating the electronic portion of the printer;

FIGURE 33 is a partly block and partly schematic diagram illustrating the hammer magnet control system of the electronic portion of the printer;

FIGURE 34 is a partly block and partly schematic diagram illustrating the hammer magnet gate system of the electronic portion of the printer;

FIGURE 35 is a partly block and partly schematic diagram illustrating the paper motion spring clutch control system of the electronic portion of the printer;

FIGURES 36*a* and 36*b* are schematic diagrams which in conjunction with the voltage sensing circuit illustrated schematically in FIGURE 37, the cycle check circuit illustrated schematically in FIGURE 38, and the low voltage checking circuit illustrated schematically in FIGURE 39, illustrate the control circuit of the printer;

FIGURES 40*a* and 40*b* illustrate diagrammatically the bail bar of the printer and the associated latch portion of the printer control circuit in the two static positions of the bail bar.

Referring now to the drawings in greater detail, a complete printer 100 embodying the invention is generally comprised of three main portions: a mechanical portion, a power supply portion and an electronic portion, the latter portion cooperating with a computer-buffer combination in supplying the various electronic control signals briefly referred to above and necessary for proper operation of the printer.

While the above portions of the printer will now be described separately, it is obvious that these portions are closely inter-related and that reference must at times be made from one potrion to the other portions.

*Mechanical portion*

The mechanical portion of the printer can, in turn, be broken down for purposes of the following detailed description into groups, as follows: A main support group, a drive train group, a print hammer group, a drum arm group, a paper drive and format group and other miscellaneous constructions such as the physical arrangement of the printer electronics components. This mechanical portion of the printer is for the most part shown in FIGURES 1–29.

*Main support group*

The main support group of the printer 100 disclosed herein comprises primarily a cast or other suitably formed main frame 101 having various mounting pads and other supporting elements formed thereon or secured thereto. For example, the frame 101 is formed with substantially vertical end supports 102 and 103 through which the various bearings and shafts of the drive train group, the format group and the paper drive group are supported and/or journaled. The frame is also formed with a front support 104 on which the drum arm group is pivotally mounted. The main support group also includes miscellaneous brackets and other elements, such as bracket 105 and another similar bracket at the other end of the frame 101 provided to position and support some of the elements 106 of the electronics portion of the printer.

Where necessary, the individual miscellaneous elements of the main support group will be discussed more fully in connection with the various mechanical groups to which they pertain.

*Drive train group*

The drive train group is composed primarily of an integrated belt, pulley and gear system tying together in non-slip relation the main drive motor 107, the print cam 108, the print drum 109 and the paper drive and format control group mechanism 110; it includes various associated speed changing, direction reversing and belt tensioning gears and pulleys, the location and purpose of which will be more fully described where necessary.

The numerous shafts on which the various gears and pulleys are mounted are supported in suitable bearings, such as bearings 111, mounted in the end support 102 extending upwardly from the left-hand side of the printer, as viewed in FIGURES 1 and 2. For example, shafts 115 and 116 of the paper advance mechanism, input shaft 117 and output shaft 118 of the spring clutch mechanism, and shaft 119 on which an intermediate pulley 120 is mounted are supported in the usual manner in the end support 102 by means of the bearings or other usual means shown in FIGURE 4.

Figure 5:
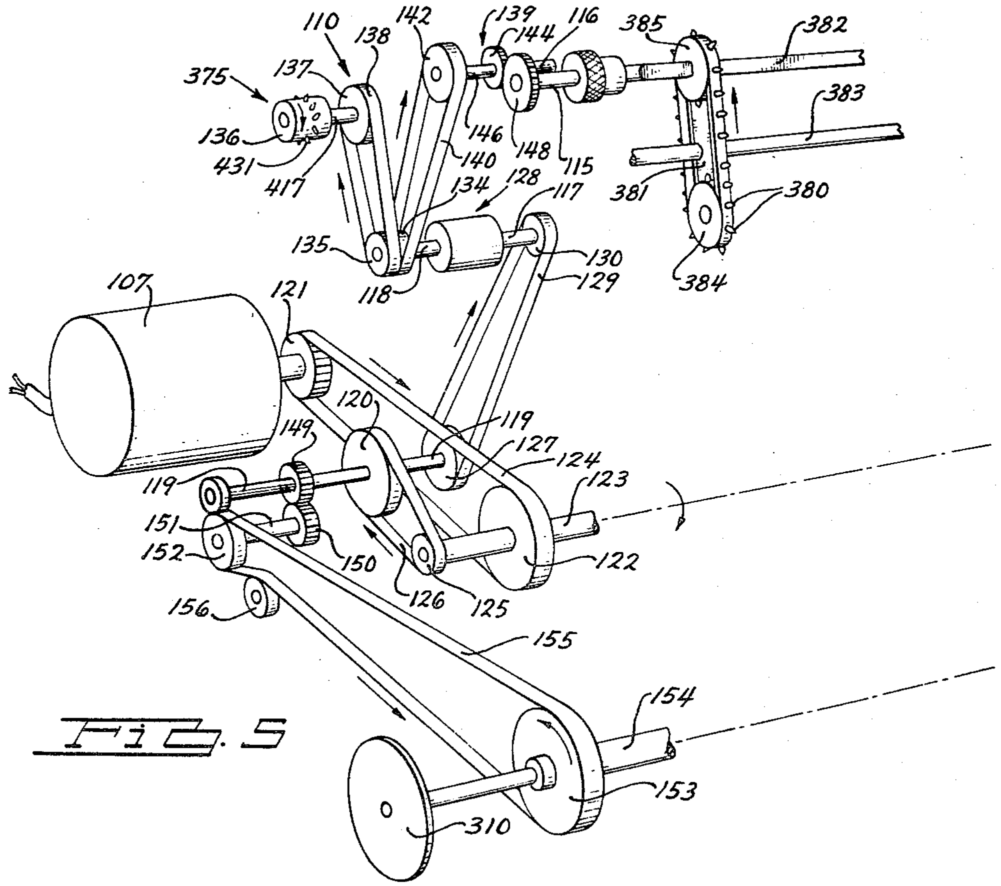
FIGURE 5 is a schematic perspective view illustrating the complete drive mechanism of the printer.

A clear understanding of the drive train group will be had upon examination of the schematic illustration of FIGURE 5. It will be observed that the main motor pulley 121 drives the cam pulley 122 mounted on the cam shaft 123 through the belt 124. It should be stated at the outset that all of the belts and pulleys employed in this drive train group are of the Gilmer type; that is, the pulleys have evenly spaced teeth of uniform length engaging similarly formed notches on the inner surfaces of the belts associated therewith so as to provide a non-slipping uniform velocity drive in each case. A smaller pulley 125 also mounted on the cam shaft 123 drives pulley 120 through the belt 126. A smaller pulley 127 is mounted on the same shaft 119 on which pulley 120 is fixed, and it drives a spring clutch device 128 through the belt 129 and a pulley 130 mounted on the spring clutch input shaft 117. The output shaft 118 of the spring clutch has two additional pulleys 134 and 135 mounted thereon, pulley 135 driving the format control sprocket 136 through pulley 137 and belt 138 and pulley 134 driving the paper drive mechanism 139 through belt 140, pulley 142, gear 144 mounted on the same shaft 146 on which pulley 142 is fixed and a gear 148 connected to the paper drive mechanism. Gear 149 is mounted in the other end of shaft 119 on which pulley 120 is mounted, and this gear drives a meshing gear 150 mounted on the shaft 151. Pulley 152 is also mounted on shaft 151, and it drives pulley 153 mounted on the print drum shaft 154 by means of belt 155 tensioned by the spring-loaded tension pulley 156.

The drive motor 107 is operated, when power is supplied thereto, at a constant predetermined speed, the relatively heavy flywheel 112 mounted on cam shaft 123 serving the usual purpose of preventing fluctuations in rotational velocity. It is thus apparent that the cam 108 and the print drum 109 are driven at some constant speed proportional to the speed of the main drive motor 107, but that the operation of the paper drive and format group mechanisms are controlled by the operation of the spring clutch 128, the construction and operation of which will be fully described below. In other words, the cam 108 and the print drum 109 are driven continuously so long as the main drive motor 107 is operated, and at constant properly related speeds; on the other hand, the format and the paper drive group mechanisms are driven intermittently and for periods of time dependent upon the operation of the spring clutch 128 which, as stated above, is controlled by proper electronics signals generated between the electronics portion of the printer 100 and the computer-buffer combination with which the printer is employed.

*Hammer group*

Referring for a moment to FIGURE 6, which is a cross-sectional view through FIGURE 1 to show the relative positions of the elements of the hammer group, the main drive motor 107 drives the print drum 109 in a counterclockwise direction through the drive train already described above. The paper 157 is advanced, in a manner to be described, a line at a time or more, depending upon the signal input provided by means described below, by the mechanism of the paper drive and format group. It will be noted that the paper is moved between the rotating print drum 109 and the paper guide plate 158 which is formed with an opening 159 through which the print hammer 160 can strike the paper 157 into the raised characters 161 on the drum, the print ribbon 162 traveling in a horizontal direction between the paper and the drum.

The print drum assembly and the ribbon drive mechanism form part of the drum arm group referred to above, and they will be described in greater detail later on in the specification.

The hammer group components are supported in a casting or other member 163 secured to the main frame 101 in any suitable manner, as by bolts passing through slots 164 formed at each end thereof, so that the casting 163 can be adjusted on the main frame 101. This adjustment permits horizontal alignment of the row of print hammers 160 with the characters 161 on the print drum 109.

Figure 7:
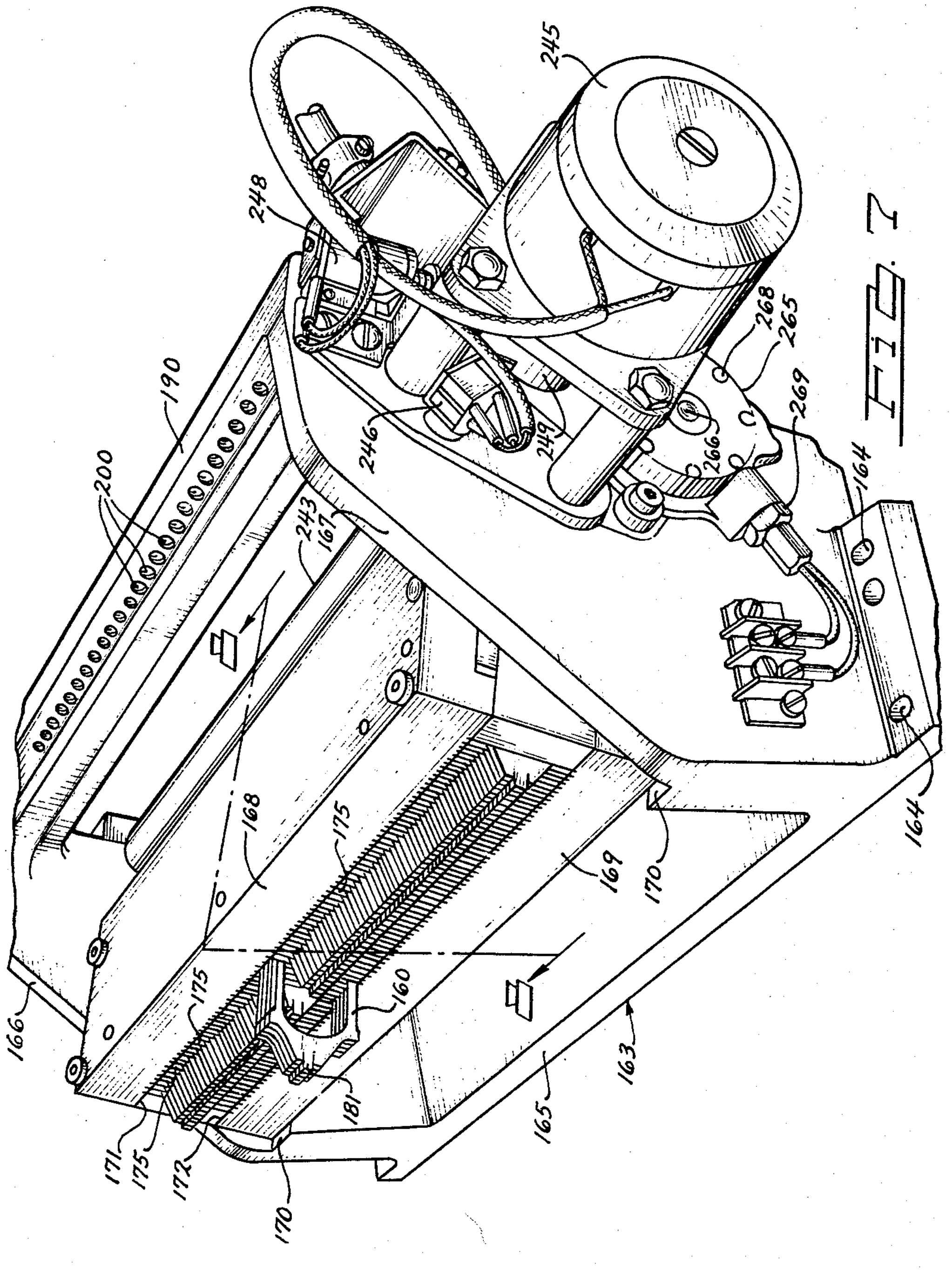
FIGURE 7 is a perspective view of that portion of the printer in which the print hammers and associated mechanism are mounted, the view showing the character-impacting ends of the row of hammers.
Figures 8, 9:
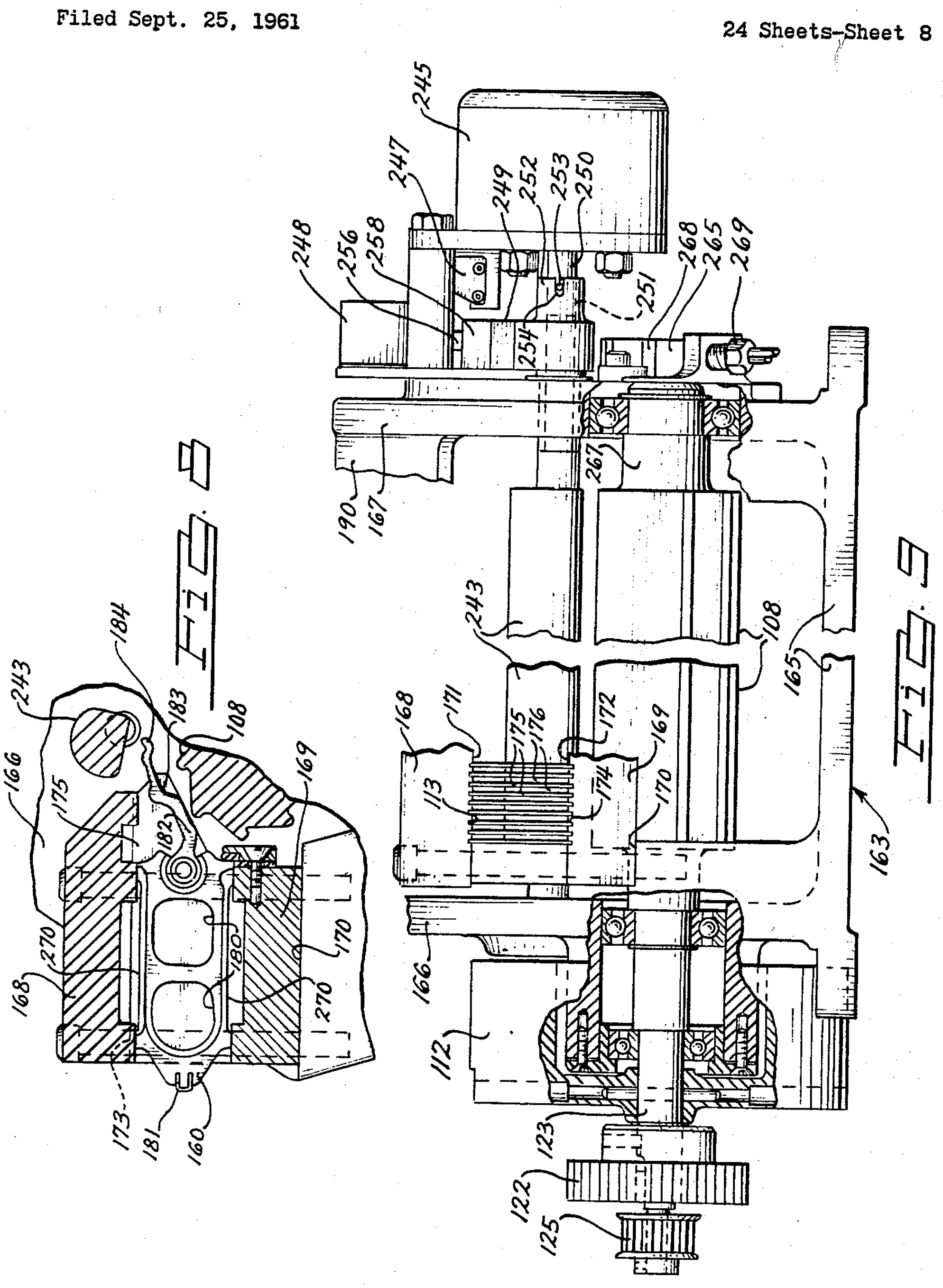
FIGURE 8 is a fragmentary cross-sectional view taken on the plane of line 8—8 of FIGURE 7 and looking in the direction of the arrows.
FIGURE 9 is a fragmentary front elevational view of FIGURE 7, looking from the left-hand side of FIGURE 8 and with the hammers removed.

As best seen in FIGURES 7 and 9, the hammer group support casting 163 includes a base portion 165 and vertical end plate portions 166 and 167 between which are formed or secured in any desired manner the upper and lower print hammer guide members 168 and 169, respectively. In this case, member 169 is fixed on shoulders 170 formed on the vertical sides 166 and 167. The inner surfaces 171 and 172 of the upper and lower guide members 168 and 169 are parallel, and they are formed with vertically aligned slots 173 and 174 respectively. Each pair of vertically aligned slots has a spacer plate 175 inserted therein, the spaces 176 between these spacer plates 175 constituting the passages through which the individual print hammers 160 reciprocate during the printing operation.

Each print hammer 160 comprises a generally rectangular element made of any suitable material, but preferably of some light-weight, self-lubricating and wear resistant plastic material such as nylon or Delrin. These hammer members are preferably formed with openings 180 therein to further reduce the weight thereof. The end of each hammer 160 adjacent the print drum 109 preferably has provided or formed therein a relatively hard character-impacting element 181. The other end of the hammer member 160 has pivotally secured thereto an interposer lever 182, preferably made of the same material and sometimes referred to as a "beaver tail" because it is pivotable vertically in the plane of the hammer 160. The print hammer member and beaver tail assemblies are ideally identical in shape and weight, and each beaver tail 182 has a flat surface 183 to be struck by the cam 108 and a hook-shaped free end 184 that is vertically slotted so as to receive and retain the free end 185 of the relatively long, low rate tenison spring 186.

It is apparent that there are as many hammers 160 as there are characters 161 in a horizontal row of characters on the drum 109.

Figures 13, 14:
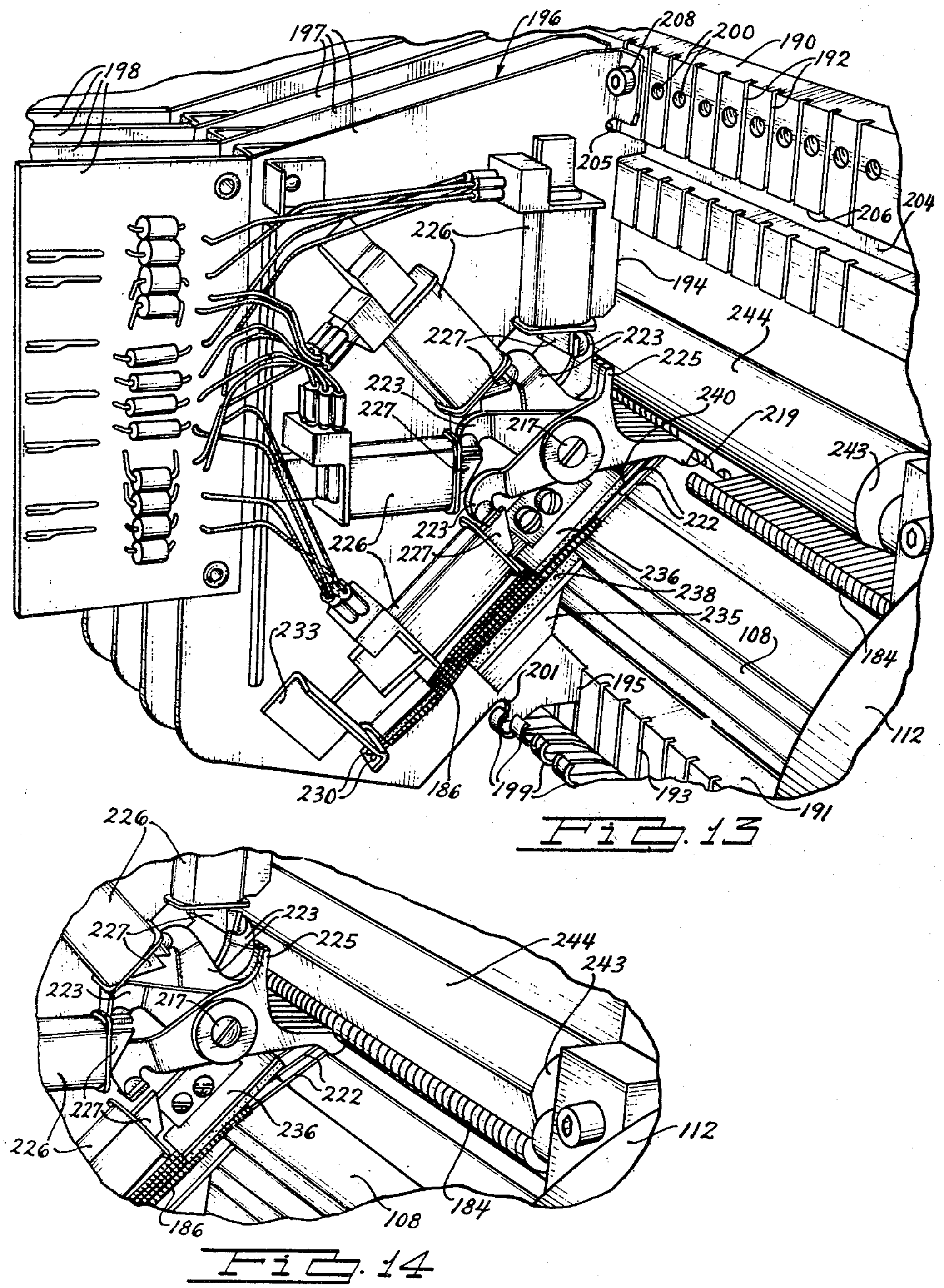
FIGURE 13 is a fragmentary perspective view illustrating a series of hammer modules embodying the invention, with the print hammer mechanism associated with a single module being shown in the non-printing position.
FIGURE 14 is a fragmentary portion of FIGURE 13 showing the same hammer mechanism in a position ready for printing.

The hammer group casting 163 has parallel upper and lower horizontal portions 190 and 191 extending the length thereof and having formed therein vertically-aligned slots 192 and 193, respectively, adapted to receive edges 194 and 195 of the individual hammer module assemblies 196, as best shown in FIGURES 6 and 13.

Each hammer module assembly 196 comprises a base plate 197 on which various elements to be described are mounted and to which is secured a second plate or card 198 containing certain electrical or electronic components associated with the hammer mechanism. The lower member 191 has secured thereto in any suitable manner and below the slots 193 a row of retaining springs 199. The upper member 190 is formed between the slots 192 therein with threaded holes 200. Each base plate 197 is formed with tab portions 201, 202 and 203. On assembly, tab portion 201 is inserted into the hooked end of one of the retaining springs 199, and the base plate 197 is urged downwardly against the spring until the tab portion 203 can be inserted into the horizontal slot 204 formed in the upper member 190 across the slots 192. When the plate is subsequently released, the spring 199 holds the upper edge 205 of the tab 203 against the horizontal upper side 206 of the slot 204 so as to accurately position the base plate. The tab 202 is formed with an opening 207 to receive a bolt 208 cooperating with one of the threaded holes 200 to finally secure the base plate 197 in position. The modules 196 are finally secured in their above assembled condition by means of the channel bar 209 retaining a resilient pad 210 and extending horizontally across the rear of the cards 198, the bar being secured at its ends to the bracket 105 and the similar bracket, already referred to but not shown, at the other end of the frame 101.

Figures 10, 11, 12:
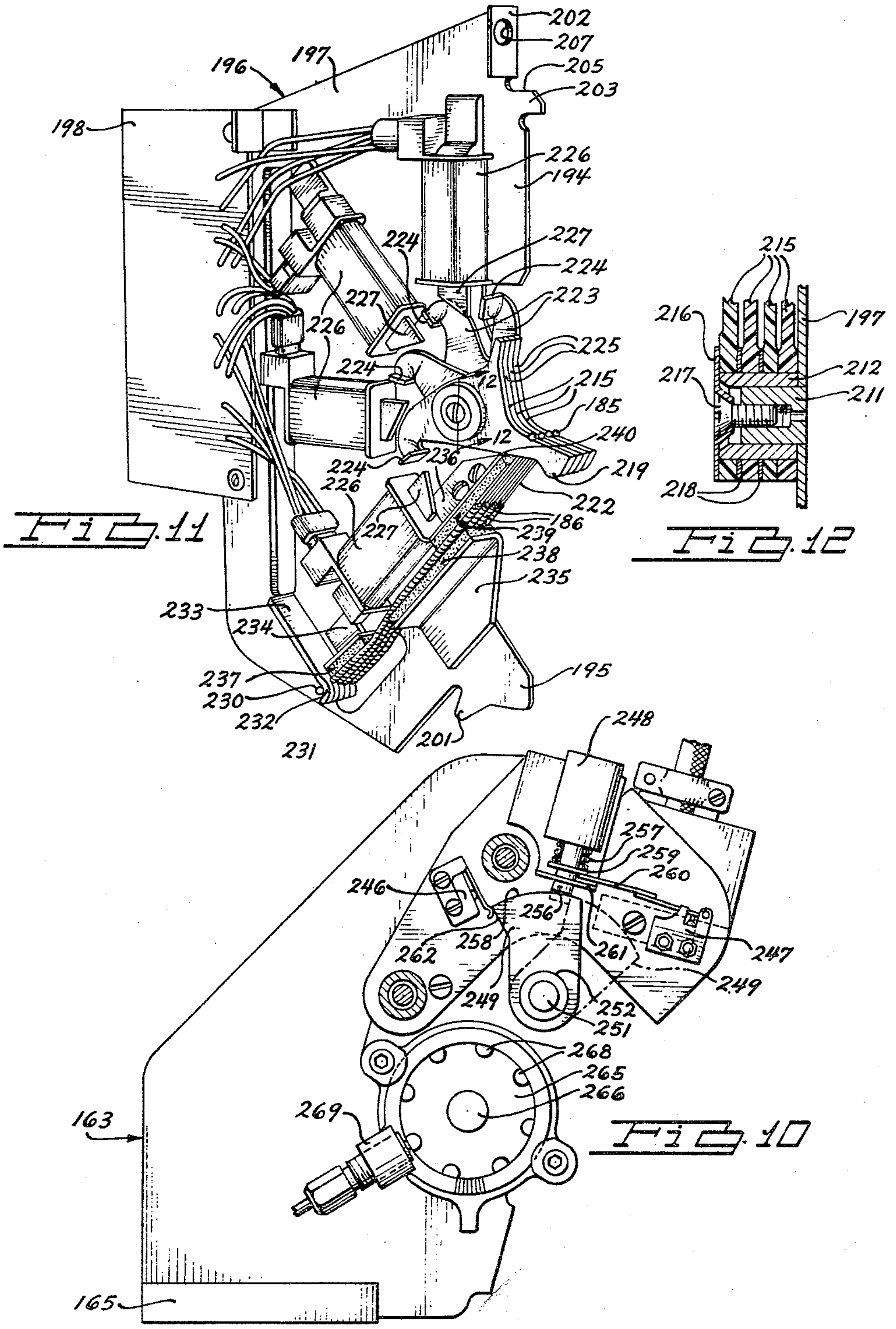
FIGURE 10 is an end elevational view taken from the right side of FIGURE 7, with portions thereof removed.
FIGURE 11 is a perspective view of a single hammer module illustrating in greater detail some of the elements of the print hammer mechanism.
FIGURE 12 is a fragmentary cross-sectional view taken on the plane of line 12—12 of Figure 11 and looking in the direction of the arrows.

Referring now to the construction of the individual hammer modules, each base plate 197 has a pivot pin 211 extending from one side thereof. A suitable plastic or other bushing 212 is mounted on the pin 211 and a group of four actuating or armature levers 215 are pivotally mounted on the bushing, the levers 215 being held in pivotable assembled relation by any suitable retaining means such as the washer 216 and the screw 217 having a threaded portion cooperating with internal threads of the pin 211, as shown in FIGURE 12. Shims 218 may be employed between the actuating levers 215 to align the same laterally with the beaver tails 182 with which they are to cooperate.

The levers 215 are also preferably made of any suitable lightweight, self-lubricating, wear resistant and nonmagnetic material such as some type of plastic, and each lever has a first arm 219 adapted to cooperate with one of the beaver tails 182. Each arm 219 is also vertically slotted so as to receive a straight end portion 222 of one of the springs 186 anchored in the cooperating beaver tail.

Each actuating lever 215 has a second arm 223 to which is secured in any suitable manner a magnetic armature 224, it being noted that the second arms 223 of the four actuating levers 215 assembled on a single module plate 197 extend at different angles so as to be angularly spaced when the slotted spring receiving arms 219 of the levers 215 assembled on the pivot pin 211 are in alignment. However, each lever 215 also has a surface 225, and all of these latter surfaces are aligned when the slotted spring receiving arms 219 are in alignment.

A group of four electro-magnets 226, one for each actuating lever 215, are secured on the plate 197 in an arcuate pattern so that each of the magnetic poles 227 thereof are positioned in the path of travel of an armature 224 of one actuating lever 215.

Each electro-magnet 226 is comprised of two separate windings 228 and 229 (see FIGURE 33). Winding 228, referred to as the holding coil, is continuously energized when the printer 100 is in operation so as to create an electro-magnetic force in the pole piece 227 to attract and hold the associated armatures 224 when the actuating levers 215 are pivoted counterclockwise in FIGURE 6. The second winding 229 of each electromagnet 226 is referred to as the pulse coil; it is energized upon a suitable signal from the electronics portion of the printer and the computer and/or computer-buffer combination with which the printer is used when the print hammer 160 associated with that particular electro-magnet is to be addressed for printing. The effect of energizing this second pulse coil is to cancel out the magnetic field of the holding coil and render the pole piece 227 non-magnetic so as to release the armature 224.

The other ends 230 of the springs 186 that are anchored at one end in the beaver tails 182 are anchored in a similar manner in slots 231 formed in the hook portion 232 of the anchor member 233 secured to the base plate 197. It is thus apparent that the tension springs 186 tend to urge the free ends of the beaver tails 182 and the cooperating slotted arms 219 of levers 215 downwardly toward the rotating cam 108, and at the same time to urge the assembly of the beaver tail 182 and hammer 160 rearwardly away from the print drum 109.

The brackets 234, 235 and 236 having rubber or other resilient pads 237, 238 and 239, respectively, secured thereto are positioned on opposite sides of the four adjacent springs 186 in each module in a manner so as to eliminate a tendency of these springs to oscillate laterally. In addition, the end 240 of bracket 236 serves as a stop for the four actuating levers 215 when any one or all of these levers are pivoted clockwise by the springs 186.

With the above hammer module construction, it is apparent that each print hammer 160 guided between the plates 175 for reciprocating motion toward and away from the print drum 109 has associated therewith a beaver tail 182 pivotable in the plane of the print hammer and an actuating lever 215. The actuating lever 215 is positioned in the same vertical plane as the hammer 160, and it has a first arm 219 in continuous contact with the free end of the beaver tail 182 due to the action of the tension spring 186. This combinaion of a spring-biased lever 215 in continuous contact with a beaver tail 182 pivotally connected to a print hammer 160 is sometimes referred to as an "interposer system." Each such actuating lever has a second arm 223 having an armature 224 which is attracted and held by the pole piece 227 of the two-coil electromagnet 226 associated with the hammer in question, depending upon whether or not the magnetic field created by the holding coil 228 is cancelled by the energization of the impulse coil 229 when it is desired that the hammer involved print a character.

The plate 198 secured to the base plate 197 of each hammer module 196 is a printed circuit board or card on which are suitably secured various electronic components necessary to the operation of the electromagnets 226. The components secured to the plate 198 are connected electrically to the electro-magnets 226 so that the separate holding and impulse coils thereof are energized and deenergized in a manner set forth below in the description of the electronics portion of the printer to permit the proper functioning of the hammer mechanism described herein.

Since each hammer module 196 includes four actuating levers 215 and four associated electromagnets 226, one electro-magnet for each actuating lever, it is apparent that one hammer module assembly 196 cooperates with four adjacent print hammer and beaver tail assemblies. While this has been found to constitute a convenient package from the standpoint of initial assembly and subsequent repair, it should be apparent that some other grouping of electro-magnets and associated actuating levers could be employed.

The electrical operation of any switches and solenoids referred to in this portion of the printer will be described more fully, if necessary, in the description relating to the power supply portion of the printer.

FIGURE 6 and FIGURES 15*a*, *b* and *c*, illustrate a single print hammer and its associated levers, springs and magnets in the various positions that these elements would assume during one print cycle. In FIGURE 6, the hammer 160 has been retracted by the force of the spring 186 and the actuator lever 215 is held in an upward position so that the cam 108 cannot strike the impact surface 183 of the beaver tail 182 due to the armature 224 of the actuator lever being held by the pole piece 227 which is magnetized by the holding coil 228. In this position, the hammer 160 cannot be caused to print.

As already stated above, appropriate signals from the printer 100 and from the computer or other equipment with which the printer is employed address or identify the particular hammers that are to print any particular character, the result being that the second winding or pulse coil 229 of the electromagnet is energized so as to cancel out the effect of the holding coil 228. This occurs comparatively instantaneously, and the spring 186 immediately pulls the beaver tail 182 downwardly so as to place the impact surface 183 thereof into the path of travel of the particular cam lobe 241*a* that is in a position to strike the impact surface. This is shown in FIGURE 15*a* wherein cam lobe 241*a* may be making initial contact with surface 183, it being also noted that the armature 224 is now away from the pole piece 227 and that the surface 242 on the first arm 219 of the actuating lever 215 is also positioned in the path of travel of the next succeeding cam lobe 241*b*.

Figure 15B:
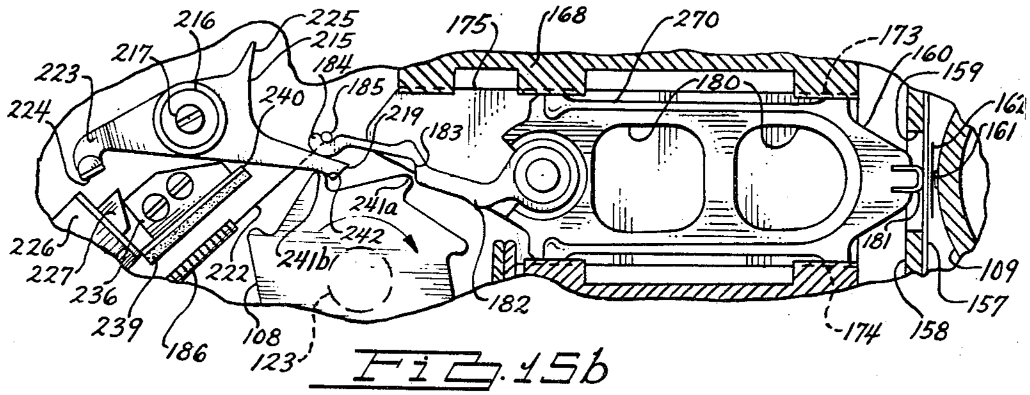

FIGURE 15*b* illustrates the interposer system elements after impact by the cam lobe 241*a*, with the hammer 160 moving forward towards the print drum 109.

Figure 15C:
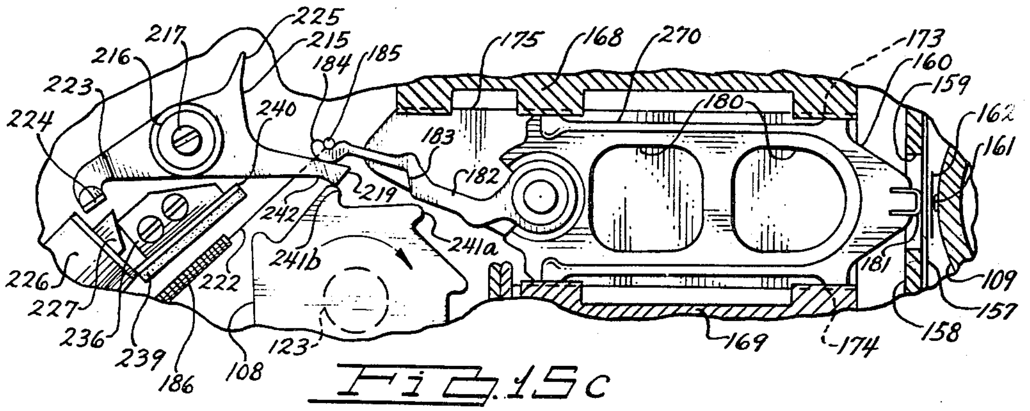

In FIGURE 15*c* the hammer 160 has already struck the character on the print drum and is being retracted away from the drum 109, partly by impact rebound and partly due to a component of force of the spring 186. About this time, the next succeeding cam lobe 241*b* has struck the surface 242 on the first arm 219 of the actuating lever 215 so as to return the actuating lever armature 224 into contact with the pole piece 227 of the electromagnet 226. When the armature contacts the pole piece, the actuating lever will again be retained so as to maintain the beaver tail and hammer in the non-printing position (FIGURE 6), since the holding coil is continuously energized and the impulse coil is now de-energized. The assembly will remain in the FIGURE 6 position until the next time this hammer is addressed for printing by energization of the impulse coil.

As stated before and as will be noted from an examination of FIGURES 11, 13 and 14, the actuating levers 215 mounted on the same module 196 each have a surface 225 positioned such that these surfaces are in alignment when the armatures 224 of all of the actuating levers on a module engage the poles 227 of the electromagnets. This is the position of the actuating lever 215 when the hammer 160 associated with any given lever is in the non-printing position. Since printing and returning the levers 215 to the non-print position are, in effect, part of one hammber cycle, as explained in connection with FIGURES 6 and 15*a*, *b* and *c*, it is desirable and necessary that all of the actuating levers 215 of all of the hammer modules 196 in the printer 100 be in the position shown in FIGURE 6 whenever the printer is shut down, and thus just before the printer is first turned on. This is to prevent a meaningless line of print, when the printer is first turned on, that would otherwise occur in order to prepare the printer to receive the desired print information.

For the above purpose, a so-called bail bar 243 is provided. The bail bar is positioned horizontally and extends across the entire bank of hammer modules 196, and it has a curved surface 244 adapted to at times engage the surface 225 of every actuating lever 215 and thus rotate all of these levers to the position shown in FIGURES 6 and 13. This bail bar is operated by an ordinary (Ledex, size 7S, 45°, righthand, for example) one-way, spring-return rotary solenoid 245, which is attached to drive one end of the bar (see FIGURE 9) and the details of construction of which can be readily obtained from the manufacturer and need not be shown herein. When energized, this solenoid 245 maintains the bail bar in the position shown in FIGURE 13 against the force of a spring within the solenoid tending to rotate the bar counterclockwise to the position shown in FIGURES 6 and 14.

It will be noted that while FIGURES 6 and 13 both show the actuating levers 215 in the non-print position, the bail bar 243 in these figures is in different positions. This is because FIGURE 13 illustrates the position of the bail bar when the rotary solenoid 245 is actuated, as it would be immediately on starting up or shutting down of the printer so as to rotate the actuating levers 215 to a non-print position. FIGURE 6, on the other hand, shows the bail bar 243 in the printing position, as it would be during printer operation when the solenoid is de-energized and the bail bar is rotated from its FIGURE 13 position by the solenoid return spring. In other words, as will be seen in the following description, the bail bar solenoid is not energized constantly, but only at the certain times. Between starting up and shutting down the printer, the actuating levers are returned and held in the non-print position of FIGURE 6 due to the action of the cam lobes 241 striking the actuating levers 215, as explained above in the description of one print cycle of the hammer mechanism.

When the printer power is shut off so that the solenoid 245 is de-energized, the return spring of the solenoid wants to rotate the bail bar to the position of FIGURES 6 and 14. However, this is prevented by a latch system that drops a pin into the path of the bail bar when the printer is turned off.

As explained above, the bail bar solenoid 245 must be energized on shut down of the printer so that the bail bar can move and retain all the hammer actuator levers in the non-print position and thus eliminate meaningless lines of print the next time the power is turned on. In this connection, it is desirable not only to provide means for maintaining the bail bar in a position where the hammers cannot be addressed when the printer power is turned off, but to also provide an interlock system whereby the printer power will not be turned off until the bail bar is in this non-print position. It is also desirable to provide a signal to the printer electronics when the bail bar is returned to the print position after the power is turned on. This is accomplished by the use of the micro-switches 246 and 247, a so-called "latch" solenoid 248, which may be an ordinary linear type solenoid having a spring-loaded pin or movable core, and a cooperating cam member 249 that is fixed to or formed on the end of the bail bar 243 and that is driven by the shaft 250 of the rotary solenoid. Preferably, the cam 249 is a separate member adjustably secured to the portion 251 of the end of the bail bar shaft extending beyond the side plate 167 and having a slotted lateral extension 252 receiving and being driven by the shaft 250 of the rotary solenoid through a pin 253 received in the slot 254, as shown in FIGURE 9.

While the rotary solenoid 245 is energized twice, once on starting and again on shut-down of the printer, the latch solenoid 248 is energized only upon starting of the printer. The reason for the latter, as well as the reason for energizing the rotary solenoid upon starting of the printer, will become apparent as the description proceeds.

In FIGURE 10, the cam 249 fixed to the bail bar shaft and the latch solenoid 248 are shown by solid lines in the relative positions they would assume during printing and just before it is desired to turn the printer power off. The pin or movable core 256 of the latch solenoid is normally urged away from the solenoid body by the compressor spring 257, either until the free end of the pin engages the curved end surface 258 of the cam (solid line position) or until the spring retainer 259 forces the actuating arm 260 of the micro-switch 247 against the stop bracket 261 having an opening through which the pin 256 travels.

With the above construction, the pin 256 of the de-energized latch solenoid 248 is forced downwardly behind the face 262 of the cam (broken line position) so as to both operate the micro-switch 247 and prevent the spring of solenoid 245 from returning the bail bar 243 to the FIGURE 6 position, when rotation of the bail bar by the energized rotary solenoid to the FIGURE 13 position on shut-down of the printer causes the cam 249 to be rotated clockwise in FIGURE 10 until the face 262 of the cam passes the pin 256. Actuation of the micro-switch 247 provides a signal that the bail bar 243 has raised the actuating levers 215 to the non-print position and that the power may now be turned off, in which case the rotary solenoid return spring urges the cam edge against the latch solenoid pin 256. The bail bar is thus retained in this non-printing position at all times when the printer is shut down, and the face 262 of the cam will be out of engagement with the double contact micro-switch 246.

When the printer is next turned on, the rotary solenoid 245 and the latch solenoid 248 are energized simultaneously. This rotates the cam 249 clockwise in FIGURE 10 so as to free the latch solenoid pin 256 and enable the latch solenoid to withdraw the pin. Both the rotary solenoid and the latch solenoid are then de-energized, the former slightly ahead of the latter, and the rotary solenoid return spring rotates the bail bar 243 to the FIGURE 14 position and the cam 249 to the solid line position of FIGURE 10, at which time the latch solenoid pin 256 merely rides on the curved end surface 258 of the cam with the spring retainer 259 releasing the micro-switch actuator 260 and so that the face 262 of the cam actuates the micro-switch 246. Actuation of the micro-switch 246 provides signals that the hammers 160 are ready to be addressed for printing. The next time the printer is shut down, the above sequence of events is repeated.

In summary, when the printer power is first turned on, the bail bar is close to but not quite at its FIGURE 13 position in which it holds the actuating levers so that the armatures actually engage the respective poles of the electromagnets. As soon as the printer is turned on, the bail bar rotary solenoid is energized so as to actually rotate the bail bar to the FIGURE 13 position against the force of its return spring. This causes the armatures to actually engage the electromagnets and be held there due to the operation of the circuitry described elsewhere herein energizing the holding coils of the electromagnets. Subsequent to this, the latch solenoid pin is removed, the bail bar solenoid is de-energized and the spring rotates the bail bar to its FIGURE 14 position. When the printer is again shut down, the bail bar solenoid is only temporarily energized sufficiently to allow the above mentioned pin to drop down and retain the bail bar in the above described intermediate position against the force of the rotary solenoid return spring.

From the above description of FIGURE 6 and FIGURES 15*a*, *b* and *c*, it will be noted that the timing and the geometry of the various elements of the printer, such as the speed of rotation of the print drum 109, the relative geometric design and dimensions of the beaver tails 182, actuating levers 215 and cam lobes 241 and the velocity of the print hammer 160 into and away from the print drum, are very important. As will be explained later in detail, the cam lobes are purposely formed with an involute profile. This involute design eliminates, for all practical purposes, any variation in timing in this mechanical amplifier type of hammer driving mechanism in that it assures a constant impact velocity for all the hammers, regardless of their relative positions just before impact. It also assures that each hammer will be driven in the exact desired direction, without any components of force resulting in friction. The above characteristics are necessary, of course, in order to assure proper registration and uniformity of the character printed.

The above description of the print hammer mechanism illustrates that the actuator lever 215 is always released far enough ahead of time so that it has come to rest and is waiting for impact by the cam. The cam has equally spaced involute contoured lobes and it rotates at a constant speed; thus, the cam and print drum timing intervals are exact. In other words, the hammer beaver tails 182 are struck by lobes 241 of the cam at exactly the same intervals at which horizontal rows of characters 161 on the rotating print drum present themselves to the print hammers 160; this is due to the fact that the cam and drum are driven with a fixed non-slipping ratio of cam lobes to drum characters.

While the mechanical timing as between the cam and the print drum are exact, it is also necessary that the electronics portion of the printer receive in advance signals as to what horizontal row of characters on the print drum is approaching the row of print hammers and that a lobe on the cam is approaching a position to strike the hammers that are next to be addressed. This is so that the computer-buffer and the electronics portion of the printer can generate and transmit the next set of signals necessary to address the proper hammers at the proper position and at the proper time.

The means, a code disk assembly, employed for signaling which row of characters is approaching the print position will be described in greater detail in connection with the description of the drum arm group on which it is mounted.

The means for determining and signaling the position of the cam lobes 241 is shown in FIGURES 7, 9 and 10. A non-magnetic timing disk or wheel 265 is fixed to the reduced outer end 266 of the cam shaft 267 rotatably mounted in and extending through the end plate 167 of the hammer group casting 163. Wheel 265 has soft iron or other elements 268 made of an electromagnetic material mounted in the outer periphery thereof so as to be at least partially exposed, these elements being equal in number and spaced circumferentially in substantially the same position as the cam lobes 241 are formed on the cam. Theoretically, lead time is required; this is factory adjusted by rotation of the wheel 265 on the shaft 266, the adjustment possibly varying slightly with each printer and being essentially permanent.

A magnetic pickup unit 269 of any suitable design, such as the model 3015A magnetic pickup made and sold by Electro-Mation Company, is positioned adjacent the wheel 265. This is a standard commercially available item so that the constructional details need not be disclosed. Since a current is passed through the unit 265, a signal constituting a variation in current is produced whenever one of the magnetic elements 268 passes the magnetic pickup 265. These signals and their function are described in greater detail in the description of the electronics portion of the printer, it being sufficient to state at this time that the signal indicating the position of a cam lobe is produced sufficiently in advance of actual hammer operation to enable the proper hammers to be addressed.

It is apparent that the use of the above described magnetic timing system eliminates the problems, such as dirt and wear, to which optical and commutator type timing systems are susceptible, and that it constitutes a relatively inexpensive and permanent mechanism free of the need of frequent adjustment, cleaning and repair.

Now that the advantage of the constantly rotating cam design has been pointed out, it might be well to also say that the use of an impact cam 108, rather than a push or throw type of cam, is also important to the exactness of the timing. With the impact type of hammer drive, the time of contact of the hammer interposer or beaver tail 182 with the cam is reduced to a time interval on the order of 100 microseconds; it is thus readily seen that variations of time, as percentages of the value, will still be very small time intervals. A throw type of cam would be subject to much greater durations of contact, and thus to greater variations in hammer timing.

The above-mentioned involute used on the cam lobes 241 is also an important factor in the exactness of the timing because it insures that the velocity of the cam, in the direction of printing at the point of contact with the beaver tail, is independent of the position of the beaver tail. The range is large enough to compensate for all tolerances effecting hammer strike position. Because of this feature, all of the hammers start their journey toward the print drum with the same velocity.

In other words, the only significant variation in energy between hammers are due to variations in hammer mass, which may be minimized if all of the hammers 160 and beaver tails 182 are molded in single cavity molds. Variation in the amount of energy taken out by the hammer return spring 186 is small because the hammer is returned mostly by rebound. Frictional drag is low because of the small load of the return spring 186. Also, the top and bottom sliding edges of the hammers 160 are cut away at 270 to reduce sliding friction, particularly if a hammer should warp.

Another important feature achieved by the use of the involute profile cam lobes 241 is that all of the impact energy is directly in line with the desired line of flight of the hammers 160; that is, there are no vectors in any other direction to cause side friction on the hammers (neglecting sliding friction).

A brief discussion of the geometry of the involute feature will now be given so as to clarify the above mentioned advantages. While it is stated in the following discussion that the cam strikes the hammers, it is understood that in the hammer mechanism disclosed the cam actually strikes the surfaces 183 of the beaver tails 182 pivotally connected to the hammers 160. However, the same theory would apply where the beaver tail were omitted and the cam struck the hammer directly.

FIGURE 16 illustrates the geometry of a single cam lobe 241 having an involute profile extending between the two points on its striking surface represented by the open dots and impacting three separate beaver tail surfaces 183 having varying positions with respect to the cam lobe, as represented by the letters X, Y, Z. In other words, the lobe 241 impacts the closest beaver tail surface 183 represented by X at a point C; it strikes the farthest beaver tail surface represented by Y at the point D; it impacts an intermediate beaver tail surface represented by Z at the point E. That is, the difference AY–AX represents the maximum possible variation in the positions of the beaver tail impact surfaces 183 of three addressed hammers with respect to the lobe 241 of the cam that will cause printing. The line AB represents the intended line of flight of the hammers, and it is noted that the impact points, C, D and E represented by solid dots are all positioned on the line AB and within the involute surface of the cam lobe.

An involute of a circle, which is the type of involute used in this case, is defined as a curve generated by a point on a taut string as it is unwound from a base circle, the radius of which is represented by R. In FIGURE 16, the lengths of string AC and AD represent the respective radii of curvature of an involute at points C and D, point A being the tangent point of the string to the base circle. A line normal to the involute surface at either of these points is normal to the line AB, which is coincident with the string, and this line is the line of action of the print hammers 160. It can now be seen, if a hanger is guided along this line AB and the beaver tail associated therewith has an impact surface 183 (X, Y or Z) normal thereto, that the beaver tail will always be struck at the same point on its normal surface and along the line AB, regardless of whether it is positioned at X, Y or Z just before impact. Since the line AB is in the direction of flight of the hammer, no side forces other than friction are imparted. Also, the velocity of the hammers X, Y and Z are always equal along the line AB because they are all on the same line tangent to a rotating circle of the cam, in this case the base circle of the involute.

It can also be proved mathematically that the velocity of impact is constant, disregarding sliding friction which is a negligible factor. In FIGURE 16, it can readily be seen that AC, the length of string unwound, is:

$$AC=R\cdot Q_1$$

where $Q_1$ is in radians.

The length of string AE is:

$$AE=R\cdot(Q_1+dQ)$$

Thus, $AE-AC=dS=R\cdot(Q_1+dQ-Q_1)=R\cdot dQ$, or $$V=\frac{dS}{dt}=R\cdot\frac{dQ}{dt}$$

The above proof shows that the velocity along the line AB is independent of position X, Y and Z of the hammer along the line AB and directly proportional to the cam rotational velocity and the base circle radius, both of which are constant. Thus, the hammers X, Y and Z are always impacted with the same velocity.

It is apparent that the hammer velocity for proper printing must fall within a certain range. Having determined the coefficient of restitution of the hammer and cam materials employed, both the rotational velocity of the cam and the radius of the base circle required for the proper printing velocity can be calculated. The number of cam lobes or involute teeth on the cam can then be determined from the required printing rate in lines per minute.

In summary, use of the involute profile gives a constant hammer impact direction and velocity. Other cam profiles could possibly provide a constant direction, but not a constant velocity. In the printer disclosed herein, the constant impact direction is from the centerline of the beaver tail pivot point to the centerline of the print drum, normal to the plane of the beaver tail impact surface 183.

A similar relationship may exist between the succeeding cam lobe and the actuator levers 215 so as to impart uniform velocity thereto.

*Drum arm group*

It will be apparent that the drum arm group, which is shown in greater detail in FIGURES 17–26, contains the connected print drum 109 and code disk assembly 272 and the print ribbon drive mechanism 271 and that this drum arm group is pivotable upwardly from a horizontal printing position (see FIGURES 1 and 2) to a vertical non-printing position (see FIGURE 3) so as to provide free and easy access to the paper drive mechanism. The latter feature, of course, makes it easier to load and unload the paper 157 on which the printing is to be done.

The drum arm group elements are mounted on a suitably formed, relatively elongated casting or other support member 273 that is pivotably secured to the printer main frame 101 on the horizontally disposed pivot pin 274 so that the casting 273 may be raised to the vertical position. It will be noted from FIGURE 20 that the pivot pin 274 has secured thereto the inner end of a coil spring 275, the outer end 276 of the coil spring being secured to the main support casting 101. The coil spring 275 is secured in a manner so that it assumes a wound-up condition when the drum arm casting 273 is lowered to its printing position; thus, the coil spring 275 supplies a force to assist the printer operator in raising the drum arm casting when it is desired to load or unload paper.

The end of the drum arm casting opposite the pivoted end is formed with a longitudinal cylindrical bore 277 receiving a short shaft 278 mounted in a set of ordinary anti-friction bearings 279, the outer races of which are slidable in the bore 277, an annular spring seat 280 which is also slidable in the bore and an annular cap member 281 which is secured to the end of shaft 278 and formed with a groove 282 so as to terminate in a collar 283. A cylindrical locking member 284, also received in the bore 277 and formed so as to be slidable both within the bore and over cap member 281, has pivotally connected thereto a lever member 285. One end of lever 285 is pivotally fixed to the drum arm casting 273 on pivot 286 so that the lever can be moved outwardly by its upper end 287 from the vertical position shown in FIGURE 21 to an angular position shown in FIGURE 22 through a vertical slot 288 formed in the end of the drum arm casting 273. A helical compression spring 289 is positioned between the spring seat 280 and the annular shoulder 290 formed on the locking member 284. A pin 294 is fixed in the axial bore 295 of the locking member 284 in a manner so as to engage the collar 283 when the lever 285 is moved outwardly. The lever 285 is pivotally fixed intermediate the ends thereof in the slot 296 formed in the end of the locking member 284 on a pivot 297.

From the above construction, it is apparent that the shaft 278 and the dick 298 fixed to shaft 278 and having a conical outer surface 299 are movable longitudinally with respect to casting 273 by movement of the lever 285. In FIGURE 21, shaft 278 and disk 298 are in their innermost position, since the locking member 284 has been moved inwardly by lever 285 to compress the spring 289, which in turn moves the shaft 278 to the left. Moving the lever 285 to the right in FIGURE 21, relieves the spring 289 and eventually causes the shaft 278 to be pulled out to the right due to the engagement of the pin 294 with the collar 283. The lever may be retained in its FIGURE 21 position by any means such as the slidable pin 300.

The pivoted end of the drum arm casting 273 is formed hollow to receive a second longitudinally fixed shaft 301 mounted in a set of suitable bearings 302. The inner end of the shaft 301 has suitably formed thereon or secured thereto another disk 303 substantially identical to disk 298 and also having a conical outer edge 304, except for a locating lug 305 extending therefrom. The portion of the shaft 301 extending beyond the casting 273 has keyed and secured thereto in any suitable manner the drum drive pulley 153.

The extreme outer end of shaft 301 is formed with a further reduced portion so as to provide a shoulder 306. An annular abutment member 307 having an outer face 308 aligned with the shoulder 306 is secured to the shaft 301 by suitable means such as a set screw, the abutment member having a locating pin 309 extending beyond its outer face. The shaft 301 is also fitted with the code disk 310 of a so-called code disk assembly 272, the code disk comprising a disk of transparent material on which concentric rings of alternating opaque areas constituting a code are formed, the code disk having a central annular opening at which the annular mounting members 311 and 312 are secured by any means such as screws. The mounting members 311 and 312 are also formed with aligned central openings to enable the code disk to be mounted on the reduced end portion of the shaft 301, the mounting member 311 being placed in abutment with the shoulder 306 and the outer surface 308 of the abutment member 307 so that the locating pin 309 is received in a locating slot 313 formed in the mounting member 311.

The print drum 109 is a hollow cylinder made of any suitable material and having the rows of characters 161 suitably formed on the outer surface thereof. The inner ends of the drum are formed with conical surfaces 314 that match the conical surfaces 299 and 304 on the disks 298 and 303, respectively. The drum is placed in the printer by retracting the disk 298 in the manner explained above, applying the end of the drum having the groove or notch 315 formed therein over the disk 303 so that the locating lug 305 is received in the notch 315, lowering the other end of the drum and then forcing the lever 285 to the left in FIGURE 21 so that the disk 298 enters and engages the drum under the force of the compressed spring 289. Removal of the drum is accomplished by the opposite procedure. From the above, it is apparent that drums having only alpha, only numeric, alpha and numeric and different style characters may be quickly interchanged in the printer, provided, of course, that a suitable matching code disk 310 is employed with any particular drum.

The positioning lug 305, is of course, employed so as to accurately position the drum 109 with respect to the shaft 301. Likewise, the locating pin 309 accurately positions the code disk 310 with respect to the shaft 301. The positions of the lug 305 and the locating pin 309 are such that the code disk 310 having the rings 316 of alternating opaque areas, when used in conjunction with a photodiode assembly to be explained, is able to identify a particular row of characters 161 on the print drum that is approaching the row of printing hammers 160.

As just explained and as will be more fully explained later, the purpose of the code disk assembly 272 is to produce a signal identifying which row of characters formed on the drum 109 can next be printed; that is, this signal identifies the location of the characters on the drum while the printer is in operation. Since it is desirable to use the printer with different input codes for different drums, the code disk is made interchangeable by the use of a simple, spring loaded, bayonet type quick-release mechanism 317 comprising a pin 318 extending from opposite sides of shaft portion 319 and adapted to be engaged in the annular groove 320 formed in a locking member 321. The locking member 321 is retained in the locked position by means of a compression spring 322 positioned between the locking member and an annular plate member 323 movably fixed within the locking member and having a face engaging the outer abutment member 312. The locking member 321 is removed by slight pressure toward the code disk 310 and turning the same in either direction so that the ends of the pin 318 can pass through suitable openings formed in the flange 324 of the locking member, at which time the spring 322 snaps the locking member 321 outwardly so that it can be removed from the shaft portion 319. The code disk 310 can then be pulled off the shaft. The code disk 310 can be replaced or a new code disk can be assembled and locked on the shaft portion 319 by the reverse operation of the locking member 321.

A photodiode assembly 330 such as that shown in FIGURES 24 and 25 is secured to the drum arm casting 273 in a manner so that the row of cylindrical photodiodes 331 is positioned radially with respect to the code disk 310 adjacent the inner side thereof. The photodiode assembly 330 comprises a lower mounting member 332 having a series of half cylindrical grooves 333 extending across the top face thereof in which the individual photodiodes 331 are laid, a rubber or other resilient pad 334 laid over the photodiodes 331 and a cover member 335 having a recess 336 receiving the pad 334 and secured to the lower member 332 by any means such as the screws 337 so as to compress the pad 334 and thus resiliently hold the photodiodes 331 in position with the light sensitive ends thereof facing the code disk 310. Each photodiode has suitable electrical connections 338 passing through the non-conducting spacer 339 secured to the under side of the lower member 332. The construction and purpose of an individual photodiode is well known in the art and need not be described here, there being one photodiode 331 for each one of the concentric code rings 316 on the code disk 310.

A lamp 340 is mounted on the end of the drum arm casting 273, and a cylindrical lens 341 made of any suitable plastic or other light refracting material is mounted between the lamp 340 and the code disk 310 to refract a line of light impinging on any photodiode 331 that is not blocked by an opaque area on the code disk. Since the print drum and the code disk are properly aligned and locked in place, it is apparent that photodiodes will signal character position, it being understood that each different print drum requires its own properly formed code disk.

From the above description and from the description of the main drive group, it is apparent that the drum 109 and the code disk 310 are driven together whenever the drum arm group is locked in the FIGURE 1 position and power is supplied to the printer. It is important that the drum drive should be rendered inoperative whenever the drum 109 is not in its horizontal position and locked, the operative position of the drum arm group being when the pin 342 extending from the outer end of the drum casting is resting in the wedge block 343 secured to the printer main frame 101 and locked in place by any suitable clamp assembly 344, as shown in FIGURE 2. The clamp 344 may be of any suitable design, such as toggle clamp Model No. 208 sold by the Detroit Stamping Company, and it is apparent from FIGURE 2 that movement of the clamp handle 345 to the vertical position causes the locking bar portion 346 to pivot in the manner to engage the top of the pin 342, thereby retaining it in the wedge of the block 343.

As stated above, it is necessary to prevent operation of the drum 109 unless the drum is in its horizontal position and locked in place. This is accomplished by an interlock system consisting of a switch 347, the contacts of which are closed by the lower surface 348 of the portion of the drum arm casting in which the pin 342 is secured, and another double switch 349, the contacts of which are closed by the lower portion 350 of the handle of the clamp when it is in the vertical position. This interlock system is shown best in FIGURES 2 and 22. Unless both switches 347 and 349 are closed, power cannot be supplied to the main drive motor 107.

The drum arm group also includes a print ribbon drive mechanism 271, details of which are best shown in FIGURES 17–19 and 26. The general layout of the ribbon drive mechanism is best shown in FIGURE 26 which is a perspective view of the ribbon drive mechanism itself removed from the drum arm.

This mechanism includes a ribbon drive motor 341 and an intermediate shaft 352, which is driven continuously by the motor as long as the printer power is turned on through the pulleys 353 and 354 and the belt 355. A clutch coupling device 346 is secured to each end of the intermediate shaft 352, these clutch devices being of any suitable standard design such as the well known Model No. FG 17 clutch coupling sold by the Heyden Division of General Time Corporation. The driven member 357 of each clutch 356 has a shaft 358 connected thereto in alignment with the intermediate shaft 352, and each one of these outer shafts 358 has a ribbon spool 359 fixed thereto. The intermediate and end shafts are journaled in the aligned bosses 360 extending from the drum arm casting 273. The coil springs 361 are employed to provide sufficient drag on the magnetic clutch that is not engaged to prevent looseness in the ribbon spool that is unloading.

The relay 362 is designed, electrically connected and used to actuate either one or the other magnetic clutches 356, depending upon which spool 359 is to be driven. The operation is similar to the operation of a typewriter ribbon spool mechanism in that the empty spool is driven so as to use ribbon from the other spool. Switches 363 and 364 located near the spools 359 at opposite ends of the ribbon drive mechanism are operated alternately by metal eyelets 365 fastened near each end of the ribbon 162. In other words, just before an unwinding ribbon spool becomes empty, the eyelet 365 in the ribbon passes under the plate 366 and depresses the switch actuating arm 367, at which time the relay 362 is properly actuated so as to energize the clutch 356 driving the unwound spool and to de-energize the other clutch. Obviously, when the other spool reaches the unwound stage, its switch will be actuated so as to cause it to be driven.

The ribbon 162 is also maintained in tension by the spring members 368 engaging each spool; these spring members also retain the ribbon on the spools when the drum arm is in the raised position, as in FIGURE 3. The spools 359 are easily removable by any suitable means to enable quick and easy change of ribbon.

In addition to the drum and paper drive mechanisms the drum arm group includes paper tensioning means consisting of the sets of brushes 369 mounted on the shaft 370 extending between the two brackets 371 or other supports extending from the drum arm casting. The shaft 370 on which the brushes are mounted is adjustable by means of a thumb screw 372 and the lever 373 attached to the shaft and having an arcuate slot 374 formed therein. This adjustment enables variation in the degree of the paper tension by providing for lesser or greater pressure of the brushes 369 against the paper which travels upwardly in a direction opposite to the rotation of the print drum 109.

*Paper drive and format group*

It should be clear from the previous discussion that the printer 100 is constructed in a manner to print data one completed line at a time for each revolution of the print drum 109 on paper 157 moving upwardly between the paper guide plate 158 and the print ribbon 162 positioned horizontally adjacent the print drum.

The paper drive and format group constitutes the paper moving mechanism 110 of the printer, and it has already been very briefly described. It has a twofold purpose of moving the paper either one line at a time or several lines at a time, upon command. This group includes two separate subassemblies, a paper tractor drive mechanism 139 that actually drives the paper and a so-called format control assembly 375 that signals the amount that the paper should be advanced. As best seen in FIGURE 5, the two subassemblies 139 and 375 are both driven from the main drive motor 107 through a paper advance spring clutch mechanism 128, the operation of which directly effects the paper movement.

The paper on which printing is to be done can be of any standard width, and it is formed as usual with perforations along the edges thereof so that it can be driven by the teeth 380 on the paper drive tractors 381.

The tractor drive assembly 139 may be of any suitable design such as the Model No. C–95 assembly supplied by the Kidder Press Company. This assembly includes a drive shaft 382, which is suitably mounted in bearings in the two end supports 102 and 103 and a second stationary guide shaft 383 also mounted in these two end supports. The drive shaft is driven through the gear 148 and the other drive train mechanism shown in FIGURE 5.

The individual right and left-hand tractors 381 are mounted so that the chains having the teeth 380 are driven around the drive wheels or sprockets 384 and the idler wheels 385 in the direction shown. The guide shaft 383 extends through the tractor bodies merely to maintain proper alignment of the tractor 381. Spring-loaded, hinged clamping plates 386 are provided on each tractor assembly to hold the paper down after it has been mounted on the tractors.

The other details of construction of this tractor drive mechanism would seem to be obvious, except for the adjustment features. Each tractor 381 has associated therewith any suitable clamp type adjusting device 386 to enable the individual tractors 381 to be adjusted horizontally along the shafts 382 and 383. In the printer shown, the device 386 includes an externally threaded element fitting over shaft 382 and an internally threaded knob which when tightened clamps the externally threaded element on the shaft 382; loosening of the knob permits adjustment along the shaft. Similar clamp type means 387 is also provided to enable simultaneous lateral adjustment of the shafts 382 and 383, on which the tractors had previously been adjusted to accommodate the paper width, so as to place the paper in proper registration with the bank of print hammers 160. This lateral adjustment need only be to the extent of one character width, and it is made possible by mounting the shafts 382 and 383 so as to be shiftable and tying the two together by means of the tie bar 388. The drive shaft 382 is also rotationally adjustable by means 389 to enable shifting of the paper up and down for proper registration. Means 389 is merely a well known type of spring-loaded, serrated connection between drive shaft 382 and the shaft portion 115; that is, the outer knurled knob connected with shaft 382 may be pulled back against its spring load and rotated any amount to reposition shaft 382 with respect to shaft 115.

The above described paper drive mechanism 139 must, of course, be operated only after a line of print has been typed, at which time it is desired to advance the paper some amount. This is accomplished by use of a paper drive spring clutch assembly 128, the details of which will now be described.

Actually, the spring clutch assembly includes the spring clutch 128, a solenoid operated actuating assembly 390 and an anti-backlash assembly 391. The spring clutch 128 comprises an input shaft 117 which is driven continuously, so long as the printer power is on, through the belt 129 and the pulley 130 mounted on the input shaft. The input shaft 117 is mounted in a suitable bearing 391 in one end of the housing 392 that may be either separately formed or formed integral with the vertical support member 102 extending from the main printer frame 101, as shown in FIGURE 4. The housing 392 is formed with a cavity 393 to receive the assembled spring clutch.

As seen in FIGURES 4 and 29, the inner or left-hand end of the input shaft 117 is formed with a portion 394 of larger diameter having a radial flange 395 extending from the outer surface thereof and having an axial bore 396 formed therein.

The output shaft 118 of the spring clutch is also mounted in the vertical support member 102 in axial alignment with the input shaft 117. In FIGURE 4, the output shaft 118 is shown mounted in a suitable bearing 397 received in a separate mounting member 398 provided to enable access into the cavity 393. Pulleys 125 and 134 are secured to the end of the output shaft 118 extending beyond the vertical support 102, pulley 134 driving the paper moving mechanism just described above through the belt 140 and pulley 135 driving the format control mechanism to be described through the belt 138.

The inner end of the output shaft 118 has an intermediate enlarged portion 399, the left-hand end of which is formed with ratchet teeth or lobes 400, the circumferential lengths of which are substantially equivalent to the space required for one line of print; the other end of portion 399 is formed to provide oppositely disposed, axially extending lugs 401 extending over an intermediate reduced portion 402. The extreme inner end of the output shaft 118 has a further reduced portion 403 and a bearing 404 to pilot in the axial bore 396 formed in the input shaft 117 and provide precise alignment of the two shafts. Portions 394 and 402 of the input and output shafts have precise, identical outer diameters, and a helical spring 403 of rectangular cross-section is fitted over these portions. The inner diameter of the spring 403, when free, has an interference fit on the portions 394 and 402 of the two shafts such that rotation of the input shaft 117 when the spring 403 is free causes the spring to wind up tight on the two shafts, in the manner of a self-energizing brake or a Chinese finger puzzle.

A clutch actuating shell or sleeve 404 is positioned over the spring 403 in a manner so that the radially extending toe 405 of the spring is engaged in the slot 406 in the end of the sleeve 404. The axially extending toe 407 at the opposite end of the spring engages the slot 408 formed in the ring 409 which is secured to the portion 402 of output shaft 118 by means such as the set screws 410 and provided as a bearing and guide for the lugs 411 extending from the actuating sleeve 404 and meshing like gear teeth with the similar lugs 401 extending from the output shaft 118. When the output shaft 118 and sleeve 404 are made of metal, the ring 409 may be of a suitable bearing material; on the other hand, the ring 409 may be made of metal, such as steel, where the actuating sleeve 404 is made of some plastic such as nylon or Delrin. The actuating sleeve 404 has ratchet teeth or lobes 412 formed on the outer surface thereof, these lobes being the same in number as the lobes 400 on the output shaft but extending in the opposite direction. The inner diameter of the sleeve 404 is larger than the outer diameter of the spring 403 in its free position so that the spring can be unwound to a larger diameter, in a manner to be explained, so as to prevent its making a mechanical connection between the input shaft and the output shaft and permit the input shaft to rotate free of the output shaft.

The solenoid operated actuating assembly 390 is a solenoid 414 of any suitable design having a movable inner core terminating in a latch 413 that is spring-loaded as usual in a direction so as to urge the latch outwardly to engage the lobes 412 on the actuating shell when the solenoid is not energized.

The anti-backlash assembly 391 comprises a latch 415 loaded by a properly matched spring 416 in a direction so that the latch is always urged against the lobes 400 on the output shaft.

The format control mechanism 375 is mounted on the outside of the vertical side support member 102, and the drive portion thereof constitutes a sprocket drive wheel 136 mounted on a shaft 417 journaled in bearings provided in the format group body member 418 which is secured to the support 102. The portion of the shaft 417 extending beyond the body 418 has the pulley 137 secured thereto, the pulley being driven by the belt 138 which is driven by the pulley 135 connected to the output shaft 118 of the spring clutch 128. In other words, the paper drive mechanism 139 described above and the format control mechanism 375 are driven simultaneously by the spring clutch 128.

A lamp 419 similar to lamp 340 is mounted on the vertical support member 102 through a block 420 and bracket 421 in a position a suitable distance from the format body 418, and a cylindrical lens 422 similar to lens 341 is mounted between the lamp 419 and the format control body 418, the purpose of the lens again being to refract a line of light across the width of the format control body 418.

A photodiode assembly 425 substantially identical in construction and assembly to the photodiode assembly 330 of the code disk assembly is secured in the format body 418 so that the light sensitive ends of the photodiodes 426 are exposed to the line of light refracted by the lens 422 through the slot 427 formed in the spring-loaded paper tape clamping member 428, the slot being positioned so as to expose the row of photodiodes. A punched paper tape loop 429 having a centrally located row of holes 430 receiving the teeth 431 of the sprocket wheel 136 and rows of punched holes 432 on either side of the central row suitably formed to provide proper vertical format signals controlling when the paper advance is to be stopped is driven by the sprocket 136.

From the discussion thus far, it is apparent that the primary function of the paper drive and format group is to start, continue and stop movement of the paper. Paper will start moving after a start paper advance signal, which originates in the buffer and signifies the completion of a line of printing, is applied to the high power and low power paper drive circuits. Once started moving, the paper will continue to move at a high rate of speed until the spring clutch system receives the stop paper advance signal to stop movement of the paper. The signal to stop paper advance is determined by the format control, and it controls whether the paper moving mechanism advances the paper one line or many lines.

The spring clutch system, in addition to moving the paper, has a secondary function of synchronizing the printing of the hammers 160 to ensure that the paper has stopped moving before the hammers print.

The function of the electromechanical components of the spring clutch system is to connect and disconnect the input and output shafts 117 and 118 when start and stop paper advance signals are applied to the system. When the output shaft is connected to the input shaft, which is driven in this case at a constant speed of 750 revolutions per minute by the main motor 107, the output shaft drives the paper moving mechanism to move the paper. By connecting the shafts for the proper time interval, the paper can be advanced any given number of lines.

When only a single line of paper is to be indexed, as is usually the case, the sequence of events is that a stop signal hole on the format tape 429 will be directly over appropriate photodiodes 426 before any paper motion begins. Because of this, an electrical pulse of an exact length and magnitude is sent to the solenoid 414, which in turn pulls the latch 413 out of engagement with the lobes 412 of the actuating sleeve 404. The sleeve will then begin to rotate forward due to the toe 405 of the pre-loaded main drive spring 403 pushing up against it. In moving forward, the spring 403 will grab the continuously rotating input shaft 117. The input shaft will now drive the output shaft 118 through the main drive spring 403. After a one line advance, solenoid 414 will have been de-energized and latch 413 will be driven out by its return spring to engage the next lobe on the sleeve 404. However, the output shaft 118 will continue to rotate forward due to inertia, thus again unwinding or pre-loading the main drive spring 403, and the lugs 401 on the output shaft will immediately impact the lugs 411 on the actuating sleeve, which is now being held at rest by the latch 413. The latch or pin 415 is continuously urged into the anti-backlash lobes 400 of the output shaft by the spring 416; thus, when the output shaft 118 rebounds off the actuating sleeve 404, it will impact the pin 415 and be positioned by it.

When the paper is to be indexed more than one line, a continuous pulse is sent to the solenoid 414; this holds the latch 413 in and away from the actuating sleeve 404, thus allowing the input shaft and the output shaft to continue to turn as one shaft. When the appropriate photodiodes 426 of the format control sense a stop hole signal on the format tape 429, the pulse to the solenoid 414 will be shut off and the spring clutch 128 will be released as before.

In FIGURE 27, only six holes 432 are shown. Actually, this format control system 375 of this printer uses standard width tape which can be prepared by standard equipment and on which there are eight holes 432 and the sprocket holes 430 for nine possible channels, in which case there would be nine photodiodes 426. The channel 430 may be reserved for strobe, if desired, which would leave eight format control channels.

*Miscellaneous constructions*

It is the usual practice to enclose a printer such as that shown in FIGURE 1 within a suitably designed outer cabinet for purposes such as reducing noise and providing the same general outer appearance to all of the pieces of equipment used together in a complete data processing system, particularly where the separate pieces of equipment may be supplied by different manufacturers. Proper and safe operation of the printer requires a blower system to be provided in the cabinet to dissipate heat generated by the printer, especially by the power supply and the electronics portions thereof. Thus, proper ventilation by the blower system requires that the printer elements be arranged in a manner such that air may be circulated freely through the printer when enclosed by the outer cabinet.

In this connection, it will be noted that both the hammer modules 197 and the electronics modules or cards 106 mounted on a so-called motherboard secured to the bracket 105 are arranged in spaced parallel relation so that cooling air may flow freely therebetween and inside the covers 433, 434 and 435, cover 434 being hinged at 436 so as to give access to the print drum.

*Electronic portion*

The electronic portion 500 of the printer includes a hammer control system 502, a hammer gate system 504 and a paper motion spring clutch control system 506. The hammer control system 502 illustrated in FIGURE 33 is provided to synchronize the operation of the electronic portion of the printer with the mechanical portion thereof and to sequence the operation of the electronic portion of the printer. The hammer gate system 504 illustrated in FIGURE 34 is provided to prepare the selected printer hammers for actuation in accordance with signals fed to the printer by the computer 508. The paper motion spring clutch control system 506 illustrated in FIGURE 35 is provided to control the advance of paper through the printer in accordance with a predetermined format and to inhibit the input of information to be printed to the printer during paper advance.

The electronic portion 500 of the printer including the hammer control system 502, hammer gate system 504 and paper motion spring clutch control system 506 shown in block diagram in FIGURE 32 will be considered in detail after briefly considering the relation thereof to the computer 508 shown in block diagram in FIGURE 30 and the buffer 510 illustrated in block diagram in FIGURE 31.

As previously indicated the computer 508 provides both information and function input signals to the printer. The buffer 510 is provided between the computer 508 and the electronic portion 500 of the printer to permit use of the printer with the particular computer.

The computer 508 is conventional and includes a computer input-output buffer register 512, the memory system 550, instruction register 552, control system 554 and an arithmetic register 556 and suitable connections therebetween, as shown diagrammatically in the computer block diagram of FIGURE 30. The computer input and output buffer register 512 includes the computer printer select output conductors 514 and 516, the seven computer input conductors 518–524, the printer input request conductor 536, computer information ready conductor 538 and computer function ready conductor 540 connected thereto.

Since the computer 508 is conventional and forms no part of the present printer invention, it will not be considered in greater structural detail. However, the operation of the computer 508 will be considered briefly to indicate the connection of the printer of the invention thereto, through the buffer 510 and the related functioning thereof.

In operation the computer 508 may be connected through the computer input-output buffer register 512 to a number of different units, such as the printer of the invention, which units operate to program information to the computer or to receive computer outputs in the manner of the printer of the invention either directly or through a buffer, such as 510. Therefore, a signal is produced on the conductors 514 and 516 by the computer when the printer is selected for use with the computer.

Before the printer is selected, however, information which it is desired to print with the printer and printer function information are first programmed into the computer 508 over the computer input conductors 518–524 from a computer input unit, such as a magnetic tape reader (not shown). The computer 508 stores the input information it receives over conductors 518–524 in the memory system 550.

Subsequently the computer control system 554 under instructions from the instruction register 552 either on request from the printer over conductor 536 or independently due to programming operates on the stored input information in the arithmetic register 556 and feeds desired information and function signals to the printer through the buffer 510 from the computer input-output buffer register 512 over computer output conductors 542–548, computer information ready conductor 538 and computer function ready conductor 540.

The buffer 510, as previously indicated, performs the function of impedance matching and amplifying of signals passed directly between the printer and the computer 508. Additionally the buffer gates selected signals between computer 508 and the printer to insure their possible presence only during periods when the printer has been selected for operation with the computer. The buffer also provides a strobe signal to inhibit operation of the printer after information signals have been fed thereto until the information signals are stable. Further the buffer 510 functions to prevent resetting of the printer input flip-flops before the computer information is stabilized thereon and has been used.

Thus the buffer 510 includes the printer input request line impedance matching pad and amplifier 558 positioned between the printer input request conductor 560 from the printer read out enable circuit 668 and the printer input request conductor 536 to the computer 508. Similarly, the computer output lines impedance matching pads, amplifiers and inhibit gates 562 are provided in the buffer between the computer output conductors 542–548 and the printer input conductors 564–570, and the printer code disk character generator output circuit, impedance matching pads, amplifiers and inhibit gates are provided with the buffer 510 between the output conductors 586–592 from the print drum character generator photodiode system 272 of the printer and the input conductors 518–524 of the computer 508.

Gating of the computer output to the printer over computer output conductors 542–548, the printer paper advance gate system 596, the printer input flip-flop reset generator 598 and the print drum character generator photodiode system output over conductors 586–592 is accomplished through the printer select gate circuit 600 in conjunction with the computer printer select line amplifiers and impedance matching pads 602 which receive signals from the computer 508 over the conductors 514 and 516 which determine selection of the printer for use with the computer.

Computer information ready signals from the computer 508 on the output conductor 538 are fed through the computer information output synchronizing circuit 604, containing pulse forming, amplifying and impedance matching portions, to the print strobe generator 606 over conductor 608 which also includes pulse forming circuits and delay net-words so that the signal delivered to the computer input decoding system 610 of the line printer over the conductor 612 is of the proper magnitude and shape. The signal provided on conductor 612 permits use of the signal inputs to the computer input decoding system 610 over conductors 564–570 only after the signal inputs thereto are stable.

The printer paper advance gate system 596 as previously indicated is provided with a gate signal from printer select gate system 600 over conductor 614. The printer paper advance gate system 596 is further provided with a paper advance signal from the computer 508 over conductor 564 and conductor 616. When the gate signal and paper advance signal are present on conductors 614 and 616 a paper advance command signal on output conductor 618 of the buffer 610 is provided from the printer paper advance gate system 596 on receipt of a computer function ready signal from the computer 508 on conductor 620 from the computer function output synchronizing circuit 622 which includes amplifying and impedance matching portions.

The printer input flip-flop reset generator 598 provides a reset signal on conductor 624 for the printer input flip-flops of the computer input decoding system 610 after each piece of information from the computer, whether it be computer function as a paper advance command or information to be printed, has been utilized by the line printer. A reset signal is provided on conductor 624 when a signal from the computer information output synchronizing circuit 604 over conductor 636 or a signal from the computer function output synchronizing circuit 622 over conductor 638 is present on the reception of a gate signal from the printer select gate circuit 600 over conductor 640. The reset signals are provided on the trailing edge of the signals from the computer information output synchronizing circuit 604 and the computer function output synchronizing circuit 622 so that the signals on the printer input flip-flops are stabilized and used before the flip-flops are reset.

The buffer 510 also forms no part of the present invention and will not therefore be considered in further detail. The buffer 510 like the computer 508 has been considered only to provide information as to the use made of the signals on the conductors 560 and 586–592 from the line printer and information as to the origin of signals on input conductors 564–570, 612, 624 and 618 to the line printer.

As shown in FIGURE 32 the hammer control system 502 includes the magnetic pick up unit 269, printer control timer 644, the type command generator and amplifier 646, and reset command generator and amplifier 648. The print control timer 644 in conjunction with the magnetic pick up 269 sequences the operation of the printer including the timing of read out enable signals and printer type and reset commands.

The hammer gate system 504 includes the computer input decoding system 610 and separate hammer gating circuits 656, best shown in FIGURE 34 for each of the 120 print hammers. In operation the hammer gate system receives information or function signals, and strobe and reset signals from the computer 508 through buffer 510. The hammer gate system decodes the information or function signals to determine which printer hammers are to be actuated or which function is to be performed, prepares the hammer gating circuits associated with the indicated printer hammers for firing on reception of a print command and after a print command resets the input decoding system 610 to receive additional information from the computer 508.

The paper motion spring clutch control system 506 comprises the start paper advance generator 658 including a start paper advance delay one-shot multivibrator 799 and a high power circuit 792 shown in FIGURE 35, paper skip channel select circuit 660, vertical format control photodiode system 375, paper vertical format control circuit 664 including a low power circuit 794 also shown in FIGURE 35, paper motion spring clutch assembly 128 and read out enable circuit 668. In operation, a signal is fed from the start paper advance generator 658 to the paper motion spring clutch assembly to energize the clutch and initiate paper advance motion. Signals from the computer input decoding system 610 and the vertical format control photodiode system 375 are then compared in the paper skip channel select circuit 660 to provide a control signal for the paper vertical format control circuit 664 to de-energize the paper motion spring clutch assembly 128 at the proper time to skip a predetermined number of lines during paper advance. The signals from the start paper advance generator 658 and the paper vertical format control circuit 664 are also used to actuate the read out enable circuit 668 to prevent the printer from requesting input information from the computer during paper advance.

*Hammer control system*

More specifically, the magnetic pick up unit 269 of the hammer control system 502 shown in FIGURE 33 is positioned adjacent the timing disk 265 which as previously indicated is mounted on the cam shaft 267, for rotation therewith. Magnetic pick up probes are known and consist of an electric coil 702 surrounding a magnetic core 704. The reluctance of the magnetic circuit of the magnetic core is varied each time a magnetic member in the periphery of the timing disk passes the core 704 to provide a pulse of electrical energy in the coil 702.

The speed of the timing disk is such that every 6.25 milliseconds an electric impulse is generated in coil 702 which is fed to the delay multivibrator 706. Multivibrator 706 provides an output from the true (T) side thereof to the prime (P) side of the type command control flip-flop 708 and to the reset power amplifier 710 through inverter 712 for .5 a millisecond. Zero power output from the tube side of the type command control flip-flop 708 and from reset power amplifier 710 is provided at this time so that power is removed from the collector of all thyristors 650 previously turned on due to signals from the computer input decoding system 610. All thyristors 650 are thus turned off or rendered non-conducting.

At the end of the .5 millisecond reset signal the one-shot multivibrator 706 is triggered by a signal on conductor 716 from the .5 millisecond integral delay 718 to the prime side thereof to provide an output signal from the prime side thereof on the conductor 720 to the true side of the read out enable one-shot multivibrator 722. During the next 2 milliseconds the read out enable one-shot multivibrator 722 produces a printer input request signal on the conductor 560 to indicate to the computer 508 that the printer desires information during this 2 milliseconds.

As previously indicated during this 2 milliseconds the computer interrogates an entire bin of its memory system to find all characters in a complete line of 120 characters which the printer indicates to the computer 508 that it is capable of printing at this time. The particular character to be printed during a complete 6.25 millisecond cycle will of course depend on the position of the printer print drum 109.

Also, during this 2 milliseconds the hammer gate system 504 is operable to provide turn on signals for the thyristors 650 associated with the pulse coils 229 at the hammer positions, of the possible 120 positions on a printed line, indicated by the computer as being the addresses of characters the printer is capable of printing, to prepare the particular thyristors 650 for heavy conduction through the pulse coils 229 in response to a type command signal.

After the two millisecond portion of a 6.25 millisecond cycle of the printer, the read out enable one-shot multivibrator 722 is pulsed on the prime side thereof by a signal on conductor 736 to turn off the read out enable signal to the computer over the conductor 560 and to pulse the type command control flip-flop 708 on the true side thereof over the conductor 738. An output from the type command power amplifier 714 over the conductor 740 is thus provided causing heavy current conduction through the pulse coils 229 of all transistors 650 which were previously turned on during the 2-millisecond input request time.

As previously indicated the coils 229 when energized counteract the magnetic effect of the coils 228 one of which is associated with each of the coils 229 which coils 228 are energized by a constant voltage over conductor 744. Thus the beaver tails of the printer hammers associated with the thyristors 650 which have previously been turned on are permitted to drop into the path of the cam whereby printing of all similar characters at predetermined addresses on a line is accomplished by the printer.

The energizing of the coils 229 and the printing of the characters at the indicated addresses is accomplished during the remaining 3.75 milliseconds of a 6.25 millisecond printer cycle. Thus as the magnetic pick up unit 269 senses the next magnetic element in the timing disk 265 corresponding to the next lobe of the cam a second pulse is applied to the delay reset bus control one-shot multivibrator 706 to again produce a .5 millisecond reset signal and the cycle is repeated to print the next character on the print drum 109.

*Hammer gate system*

The hammer gate system 504 illustrated best in FIGURE 34 comprises seven printer input flip-flops 746–752 and a strobe signal trigger, or print command circuit 754. Eight four input AND gates, only two of which, 756 and 758, are shown, are connected to the strobe trigger circuit 754 and to the flip-flops 746–748. Similarly, fifteen four input OR gates, only two of which 760 and 762, are shown, are connected to the flip-flops 749–752.

The AND and OR gates combined in a double level gating system illustrated diagrammatically in FIGURE 34 define 120 unique conditions representing each of the 120 character addresses or positions on a line of the printer. The output from a different pair of AND and OR gates, for example AND gate 756 and OR gate 760 as shown are connected to the base circuit of each of the 120 thyristors 650 provided in conjunction with hammers 1–120 to permit turning on of the thyristors individually at desired times as previously indicated.

More specifically the seven flip-flops 746-752 receive signals from the computer 508 over buffer output lines 564–570 on their true side. The input to the prime side of the input flip-flops 746–752 is connected to the printer input flip-flop reset generator 598 over conductor 618 from the buffer 510.

Thus in operation during the 2 millisecond period when a printer read out enable signal is sent to the computer 508 from the print control timer 644, coded signals from the computer representing all the addresses of a particular character on a single line to be printed, which the line printer is capable of printing during the particular 6.25 millisecond cycle of operation are serially fed to the printer input flip-flops 746–752. A single set of signals arrives at the printer input flip-flops on investigation of each position in a single bin of the memory system of the computer 508, as prevously indicated.

In between the separate sets of signals received from the computer the printer input flip-flops are reset by means of a reset signal fed to the prime side thereof over line 618 from the buffer 510. As previously indicated the strobe input signal from printer strobe generator 606 to the print command circuit 754 over conductor 764 is fed to the line printer after each set of input signals are fed thereto over conductors 564–570 and after the input flip-flops 746–752 have become stable.

Each of the eight AND gates have four inputs thereto, as shown in FIGURE 34. Three of the inputs to the eight AND gates are from the printer input flip-flops 746–748. The other input signal to each of the eight AND gates is from the print command circuit 754. The printer logic is such that when the AND gates receive a signal from each of the four inputs thereto simultaneously the output of the AND gate is a positive ten volts. When any of the inputs to the AND gates is not present the output therefrom is zero volts.

Each of the OR gates similarly has four input signals thereto. The input signals to the OR gates are provided by the printer input flip-flops 749–752. Computer logic is such that when any of the inputs to an OR gate is present the output therefrom is a positive ten volts. When there is no input signal on any of the input lines to an OR gate the output signal therefrom is zero volts.

Thus it can be seen that by connecting each of the eight AND gates to a thyristor input conductor 766 of 15 of the 120 thyristors 650 and by connecting the output of each of the OR gates to the thyristor input conductor 768 of 8 of the 120 thyristors 650 that 120 unique signals present at the printer input flip-flops 746–752 will provide an input to separate ones of the 120 thyristors 650 of ten volts over the input conductors 766 and zero volts over the input conductors 768 which is a necessary condition for turning on the thyristors 650 during the 2 milliseconds in each 6.25 millisecond cycle of the printer during which printer input request or read out enable signals are sent to the computer 508.

Each thyristor 650 is coupled to the outputs of the separate gates such as AND gate 756 and OR gate 760 as indicated in FIGURE 34 through a resistor 770 and capacitor 772 which operate in conjunction with the diode 774 and resistor 786 to provide a turn-on signal at the base of the thyristors 650.

Thus considering the operation of a particular thyristor 650, when the signal input to the printer input flip-flops 746–752 are such that a signal is provided on all four conductors to the AND gate 756 and no signals are present on the conductors to the OR gate 760 the capacitor 772 will be charged through resistor 770 due to the ten volt potential difference thereacross. The strobe signal applied through the print command circuit 754 is then removed from the AND gate 756 after the input flip-flops 746–752 are in a stable state. The voltage at AND gate 756 will therefore drop to zero volts and therefore the voltage at the thyristor goes negative causing the capacitor 772 to discharge through the diode 774 and thyristor 650 sufficient to turn on the thyristor so that during the previously indicated subsequent 3.75 millisecond printer type command the thyristor 650 will conduct heavily through the pulse coil 229 associated therewith to cause printing of the character at the particular hammer address indicated by the signal on printer input flip-flops 746–752.

The thyristor switching circuit as explained above has the advantage over a normal two transistor flip-flop of requiring less circuit components. Further the turn-on time requirements of the pulse coil energizing circuit and the turn-on current are relatively critical in the printer and the thyristor switching circuit explained above meets these requirements.

Thus, in the printer the minimum time between character sensing as governed by the logic speed of the driving computer will be 7 microseconds while the maximum switch time of the thyristor is .15 microseconds. This time differential between time available and time used in thyristor turn-on permits the use of a capacitor coupled thyristor input as described above wherein the input capacitor 772 is slowly charged during the 2 millisecond hammer selection portion of the 6.25 millisecond printer cycle and rapidly discharged at the end of the cycle if the thyristor associated therewith is turned on.

Further, with the thyristor hammer gate circuit, capacitive thyristor input and the double level gating described above, the power requirements of the printer of the invention are kept to a minimum so that maximum drive current required from any OR gate is the current necessary to charge eight one hundred and thirty picofarad twenty kilo-ohm networks in 6 microseconds and the maximum current required from any AND gate is the sum of the current necessary to turn on one thyristor and the discharge current from fourteen thyristor resistance capacitance input networks. The net result is a system of 120 medium current (450 milli-amperes) pulse coils which may be actuated through a low level (25 milli-amperes) gating system by high speed (one megacycle) low level (5 milli-amperes) inputs.

*Paper motion spring clutch control system*

The paper motion spring clutch control system 506, as best shown in FIGURE 35, is provided to advance paper through the printer in response to paper advance signals from the buffer 510 over conductor 618. The number of lines skipped during paper advance by the printer is controlled by the vertical format control photodiode system 375 previously considered, in conjunction with the computer 508. It will be understood that although the number of lines skipped is, in the present discussion, determined jointly by the vertical format control photodiode system 375 and the computer 508, complete control of the vertical format of the printer can be programmed into the printer.

The paper motion spring clutch control system 506 as previously indicated comprises a high power circuit 792 which initiates actuation of the clutch device 128, and a low power circuit 794 which sustains actuation of the clutch. A printer input request inhibit circuit 686, a stop paper advance circuit 798 and a start paper advance delay one-shot multivibrator 799 are also included in the system 506.

In the stop paper advance circuit 798 signals are received by the paper skip channel select circuit 660 over conductors 688–695 from the vertical format control photodiode system 375 and from the computer input decoding system 610 over conductors 681–688. On a preselected combination of the received signals the paper skip channel select circuit 660 provides an output signal on conductor 790 to cause disengagement of the clutch 128 as will later become obvious.

The high power separate clutch actuating circuit 792 includes the start paper advance one-shot multivibrator 800 and the high power paper drive amplifier 802 for energizing the power transistor 804 to cause a high current to be conducted through the paper motion spring clutch solenoid 414. The low power clutch actuating circuit 794 includes the paper drive format control flip-flop 808 and the low power paper drive amplifier 810 for energizing the power transistor 812 to cause current to be conducted through resistor 814 and the paper motion clutch solenoid 414 after transistor 804 is turned off. The printer input request inhibit circuit 686 includes the OR gate 816 and the printer input request inhibit one-shot multivibrator 818. It will be noted that the multivibrators 799, 800 and 818 include time delay circuits 820, 822, and 824, respectively, integrally associated therewith.

In operation the paper motion spring clutch control system 506 receives a start paper advance input signal from computer 508 over the conductor 618 from the buffer 510 after a line has been printed. The true side of the start paper advance delay multivibrator 799 is triggered by the signal from computer 508 and provides an output signal on conductor 827 to trigger the true side of multivibrator 808. Multivibrator 800 is triggered on the true side by a signal from the true side of multivibrator 799 after a time delay of for example 5 milliseconds which is sufficient to permit the mechanical portions of the printer to reach a static condition and prevent tearing of the printer paper. The time delay is diagrammatically indicated as delay 801.

In the high power circuit 792 for actuating the clutch solenoid 414 the output of the multivibrator 799 on conductor 826 is fed to the true side of the start paper advance multivibrator 800 to produce an output on conductor 834 which when amplified through the high power paper drive amplifier 802 will cause high conduction of the power transistor 804 to cause a high current to pass through the paper motion spring clutch solenoid 414. The input to the amplifier 802 over conductor 834 is maintained for a period determined by the delay 822 which is an integral part of multivibrator 800 after which it is stopped due to an input to the prime side of multivibrator 800.

Thus the major function of the high power clutch actuating circuit 792 is to provide a high current impulse through the paper motion spring clutch solenoid 414 for a relatively short period after the reception of a start paper advance command fed thereto through delay 801. This high current signal through solenoid 414 overdrives the solenoid 414 for a very short time whereby the initial engagement of the spring clutch is extremely rapid to facilitate the starting of the paper advance rapidly. The high power signal through solenoid 414 is sufficient to advance the printer paper no more than one vertical space.

High power is not required to maintain the spring clutch 128 engaged during multiple space skipping. Therefore, if multiple space paper advance is indicated by the signal on conductor 790 from the paper skip channel select circuit 660, the solenoid 414 is energized by current passed through transistor 812 in the low power actuating circuit 794 after transistor 804 is turned off due to the signal received at the transistor 812 through the amplifier 810 from flip-flop 808 which produces an output on conductor 830 in response to a signal from the true side of multivibrator 799.

The spring clutch will be energized through transistor 812 after transistor 804 is turned off until a stop paper advance signal is sent to the low power clutch actuating circuit 794 over the conductor 790 to the prime side of the flip-flop 808. At this time the transistor 812 is caused to stop conducting and the clutch becomes disengaged to stop paper advance.

The printer input request inhibit circuit 686 as previously indicated includes the OR gate 816 which receives signals over conductor 825 from the multivibrator 799, from conductor 834 in the high power circuit 792 and from conductor 830 in the low power circuit 794. Thus a signal output is provided on conductor 848 from the OR gate 816 at the time the paper advance signal is received over conductor 618.

Conductor 848 supplies a signal input to the true side of the printer input request inhibit one-shot multivibrator 818 whereby a signal is provided on conductor 850 which is operable to prevent a read out enable signal from the printer from being sent to the computer 508 during the period of paper advance. Further, the inhibit signal on conductor 850 is maintained for a period determined by the delay 824 after the output on conductor 848 indicates stopping of paper advance to permit sufficient time for the paper drive mechanism and paper to come to a complete stop. Time delay 824 is integral with the multivibrator 818.

Thus it can be seen that with the paper motion spring clutch control system 506 the line printer paper may be advanced a predetermined number of spaces with a minimum of required power due to the fact that the heavy current necessary to actuate the spring clutch quickly is not needed or used to maintain the spring clutch actuated. Further an inhibit signal is provided to prevent printing by the line printer during paper advance and for a predetermined time before and after actual paper advance which will allow the mechanical components and printer paper to come to a static condition regardless of the number of spaces skipped.

*Power supply portion*

The printer power supply illustrated in FIGURES 36A and 36B operates from a line voltage of 95–125 volts, 60 c.p.s., and requires 7 amperes. All electrically operated components of the printer receive their power from the power supply. Five regulated voltages are generated: +10, +20, −20, and −40 volts, direct current and 11 volts alternating current. An unregulated voltage, nominally −20 volts, direct current, is also generated for use in energizing the hammer magnet hold coils and paper advance spring clutch solenoid 806.

The power supply includes the control circuit 852 and the separate circuits 854, 856, 858 and 860 including constant voltage transformers for producing the indicated regulated and unregulated voltages. A voltage sensing circuit 862, and hammer cycle and unregulated voltage check circuits 864 and 866 respectively illustrated in FIGURES 37, 38 and 39 respectively are also included in the power supply.

Additionally the power supply includes means for generating a printer ready signal and a clear signal. The printer ready signal is fed to the computer to indicate to the computer that the printer is ready for operation. The clear signal is fed to printer elements which require a specific state of operation before the printer will function correctly to insure such state of operation before the printer is cycled.

The control circuit 852, the power supply circuits 854, 856, 858 and 860, voltage sensing circuit 862, and hammer cycle and unregulated voltage check circuits 864 and 866 are so related as to prevent extensive damage to the printer should component break down occur during printer continuous run procedure and to divide the load on the power circuits during printer turn-on procedure. In this latter connection the power supply is sequenced to first provide energy to prepare the hammers for operation as considered in connection with the bail bar, subsequently energize the power supplies and then start the printer drive motor.

*Control circuit*

Referring to FIGURE 36A the control circuit 852 will be considered in conjunction with the turn-on procedure of the printer.

Voltage is applied to relay 853 when the power-in switch 246 is held closed, provided drum-arm-down interlock switch 347 and drum-arm-clamped interlock switch 349 are both closed. Latch position switch 247 is open at this time since the bail bar is in the non-print position and the latch 256 is down as shown in FIGURE 40A. Closure of relay contacts 853A applied voltage to latch solenoid 176 through the power-on switch, to bail-bar solenoid 173 through the normally closed contacts 871A of relay 871 shown in FIGURE 36B, and to transformers 873 and 875.

As previously indicated, application of voltage to the bail-bar solenoid 173 rotates the bail-bar so that it presses the armatures 227 of the spring biased levers 215 of the interposer systems against the pole piece 227 of the electromagnets 225 associated therewith. At the same time the sidewise force which the bail-bar had been exerting on the latch 256 is removed. The latch 256 is thus lifted by its solenoid 176 to free the bail bar for rotation to the print position upon the removal of voltage from its solenoid 173.

When all regulated voltages are present, the Voltage Sensing Circuit illustrated in FIGURE 37 permits operation of relay 895 illustrated in FIGURE 36B connected thereto by conductor 874. Operation of relay 895 closes the relay contacts 895A, 895B, 895C and 895D to distribute the regulated direct current +20, +10, −20 and −40 volt voltages respectively over conductors 907, 885, 909 and 915 respectively. When the unregulated direct current voltage applied to the printer holding coils reaches a level which will hold the spring biased levers 215 in the non-print position, and provided no print commands are being received over print command bus 740 as determined by the Hammer Cycle Check circuit 864 illustrated in FIGURE 38, the Unregulated Voltage Check circuit 866 illustrated in FIGURE 39 permits energization of relay 871 shown in FIGURE 36B over conductor 913.

Energization of relay 871 closes relay contacts 871*b* and starts the main drive motor 877, ribbon motor 879 and printer blower motor 883. Operation of relay 871 also opens relay contacts 871*a* to remove voltage from the bail-bar solenoid 173 so that the bail-bar 243 under spring urging rotates past the latch 256 to the print position. The power-on switch 246 may now be released, since the latch 256 can no longer restrain the bail-bar 243, the lifted position of the latch armature operates latch position switch 247 to bypass switches 246, 347 and 349 and maintain current through relay 853.

When the bail-bar reaches the print position, it operates printer-ready switch 246. The output conductor 868 is connected to ground through the printer-ready switch 246 to complete an electric circuit therethrough and conveys a "printer ready" signal to operate an indicator light on the computer 508. The other output conductor 870 applies voltage to time-delay relay 887. The time delay relay is energized after a delay which allows the main-drive motor 877 to reach full speed before removing the clear signal which has been sent to the printer electronic elements requiring a specific operating state before printer cycling is started. Removal of the clear signal permits normal cycling of the reset and print pulses and thereby subjects these pulses to subsequent check by the Hammer Cycle Check circuit 864. The removal of the clear signal also allows data input to the printer by permitting "read out enable" signal over conductor 560 from the electronic portion 500 of the printer to the computer 508 to become true, which controls when the computer can feed information to the printer.

Printer shut-down may be initiated in one of three ways, closure of power-off switch 889, closure of drum-arm-clamped interlock switch 349 or removal of voltage from relay 871 to energize bail-bar solenoid 173. Voltage is removed from relay 871 upon the occurrence of low hammer holding coil voltage or improper hammer cycling, as detected by the Unregulated Voltage Check circuit 866 or Hammer Cycle Check circuit 864.

The application of voltage to bail-bar solenoid 173 causes the bail-bar to rotate to the non-print position as shown in FIGURE 40A. Upon leaving the print position, the bail-bar cam 249 opens printer-ready switch 246. The conductor 868 consequently conveys the status "printer not ready" to the indicator on computer 508. The other conductor 870 associated with the printer-ready switch 246 removes voltage from the time delay relay 887 and applies a clear signal to the printer flip-flops. When the bail-bar reaches the non-print position, the latch 256, under spring urging, drops down to restrain the bail-bar when voltage is removed from the bail-bar solenoid 173. Latch position switch 247 is opened when the latch armature is fully down, removing voltage from relay 853, thus removing power from the printer.

*Voltage producing and sensing circuits*

With regard to the regulated voltage producing circuits 854, 856 and 858, the output of constant-voltage transformer 875 applies 118 volts to the input of regulated-voltage transformer 897 and photodiode-lamp transformer 899. Transformer 899 applies 11 volts to the photodiode lamps. Rheostats 935 are placed between the full-wave rectifiers 937 and filter capacitor 939 of each voltage producing circuit 854, 856 and 858 for the purpose of adjusting the magnitude of the output voltage, as required.

Unregulated voltage transformer 873 of circuit 860 charges capacitor 942 to a nominal −20 volts. With variations in line voltage and loading, the voltage may range between −16 volts and −25 volts. The unregulated voltage is used to drive the pulse and holding coils 229 and 228 and the paper-advance solenoid. The steady voltage applied to the holding coils 228 is reduced by the drop across the rheostat 893, and ranges between −12 volts and −19.5 volts. Steady holding coil current ranges between 4 amperes and 5.5 amperes.

The Voltage Sensing Circuit of FIGURE 37 energizes relay 895 by grounding the relay through conductor 874 when all regulated voltages are present. Contacts 895*a*, 895*b*, 895*c* and 895*d* are closed on energization of relay 895 to distribute the regulated direct current voltages.

Operation of relay 895 requires the presence of ground on the conductor 874 and −20 volts direct current on conductor 872, which checks the −20 volt voltage. Ground is obtained when transistor 886 is turned on, which requires that transistor 888 be turned off and −40 volts be applied to resistor 890 through conductor 879, which checks the −40 volts. Transistor 888 will be turned off if it does not receive base drive through either of the input diodes 894 or 896. Diode 894 connects to a voltage divider including resistors 898 and 900 and turns on transistor 888 if +20 volts is not present on conductor 905, which checks this voltage. Diode 896 will conduct current to turn on transistor 888 unless transistor 902 is turned on. Transistor 902 is turned on if the +10 volts on conductor 907 exceeds the voltage between resistors 901 and 903 and causes resistor 904 to carry enough current to cause the collector of transistor 902 to become positive, which checks the +10 volts.

Thus it will be apparent that if any of the regulated voltages are not present or are not of proper magnitude that relay 895 will not be energized. Consequently the regulated voltages will not be applied to the printer and the printer will not operate unless the voltages are all present at the proper magnitude.

*Hammer cycle and unregulated voltage check circuit*

The Hammer Cycle Check circuit 864 of FIGURE 38 will shut down the printer if hammers are being improperly cycled due to a constant print command on any of the plurality of parallel printer type command busses 740, or a constant printer information request or read out enable signal on conductor 560 or if no reset signal is produced on reset bus 739 which conditions could seriously damage the printer if printer power were supplied while they continued to exist.

The printer is shut down under these conditions by generating, from the Hammer Cycle Check circuit 864, a voltage which causes the Unregulated Voltage Check circuit 866 to remove voltage from relay 871 connected to the Voltage Check circuit 866 over conductor 913. The Unregulated Voltage Check circuit 866 responds to a voltage of predetermined magnitude which voltage is determined by the magnitude of the unregulated voltage or the output of the Hammer Cycle Check circuit. The unregulated voltage is fed to the Hammer Cycle Check circuit over the conductor 917 and is gated at diode 914. The signal of the hammer cycle check circuit is gated at diode 912. The signal from the gate diodes 912 and 914 are fed over conductor 911 to circuit 866.

The Hammer Cycle Check circuit will generate a voltage which when gated at diode 912 will shut down the printer if transistor 916 is turned off. Transistor 916 is turned on due to the current through resistor 920 which is regulated by the capacitor 918. Unless capacitor 918 is periodically discharged by conduction of transistor 922, it will become fully charged and transistor 916 will turn off. Capacitor 918 will be normally discharged during each reset time due to the reset signal fed to the Hammer Cycle Check circuit over conductor 739. The time constant of resistor 920 and capacitor 918 is made long enough so that transistor 916 will remain steadily on if capacitor 918 is discharged during each reset time.

The condition for turning on transistor 922 is that all inputs to the gate at its base be at ground. Logically, all inputs from the print command conductors 740 must be false, the reset signal over conductor 739 must be true, and to put the input to diode 924 at ground the strobe signal on conductor 755 must be false. A false strobe signal corresponds to ground and will turn on transistor 926, placing its collector at ground. A true strobe signal corresponds to +10 volts and will turn off transistor 926, clamping its collector to −20 volts.

The Unregulated Voltage Check circuit 910 will shut down the printer if the unregulated voltage falls too low. The printer is shut down by removing voltage from relay 871 in FIGURE 36B.

The unregulated voltage, which is nominally −20 volts, is gated with the output of the Hammer Cycle Check circuit 864, at diodes 912 and 914. Resistor 930 provides a path to low voltage if the unregulated voltage is not connected to circuit 864 over conductor 917.

Voltage is removed from relay 871 by turning off transistor 932. Upon turning off, the collector voltage of transistor 932 is coupled through resistor 934 to cause "read out enable" to immediately become false. Transistor 932 is turned off by conduction of transistor 936.

Transistors 936 and 938 form a Schmitt trigger. Transistor 938 turns off and transistor 936 turns on, when the voltage input to resistor 940 falls (in the absolute sense) to −16 volts. The state of the Schmitt trigger is reversed when the voltage rises (again, in the absolute sense) to −18 volts.

Thus it will be readily apparent that the Hammer Cycle and Unregulated Voltage Check circuits function in combination to shut down the printer automatically if the printer cycle is not correct due to a constant print command on busses 740, a constant strobe signal or print command on conductor 755 or no reset signal on codnuctor 739 or to shut down the printer if the unregulated voltage falls to a level below that required to maintain the levers 215 in a non-print position. The Hammer Cycle and Unregulated Voltage Check circuits also are seen to stop read out of computer information under the same cycle and unregulated voltage conditions. Therefore both serious damage to the printer and loss of information from the computer are prevented by the Hammer Cycle and Unregulated Voltage Check circuit by combination which would otherwise occur on improper printer cycling or voltage level occurring.

What we claim as our invention is:

1. In a printer for printing on paper, said printer having paper advance means which include a clutch mechanism and an electrical actuating coil with said clutch mechanism; the improvement comprising an electronic control circuit including a relatively high power circuit connected to the coil of said paper advance means for initially energizing the coil on receiving a paper advance signal, a relatively low power circuit also connected to said coil in parallel with said high power circuit, and the high power circuit initially energized on the control circuit receiving a paper advance signal, and the low power circuit maintaining the coil energized until a stop paper advance signal is received thereby, and a stop paper advance circuit means to provide said stop paper advance signal, said circuit means connected in series with the low power circuit for providing said stop paper advance signal which is operable to deenergize said coil.

2. Structure as claimed in claim 1 and further including a power supply, wherein the high power circuit includes a grounded emitter first transistor connected in series with the coil between the power supply and ground, an amplifier, and a one-shot multivibrator connected to the transistor base through the amplifier operable to cause conduction of the transistor through the coil for a predetermined time on receiving a paper advance signal.

3. Structure as claimed in claim 2 wherein the low power circuit includes a resistor, a grounded emitter second transistor having a collector connected to the collector of the first transistor through the resistor, a second amplifier, and a flip-flop connected to the base of the second transistor through the second amplifier operable to cause conduction of the second transistor through the coil after said predetermined time until the stop paper advance signal is received by the flip-flop.

4. Structure as claimed in claim 3 wherein said stop paper advance circuit means comprises a vertical format control photoelectric system, and a paper skip channel select circuit for receiving signals from the vertical format control system and a signal defining the distance that the paper is to be advanced, means for comparing the received signals and for feeding a resulting stop paper advance signal to said flip-flop on matching of the signals received thereby to stop conduction of the second transistor and thereby deenergize said coil.

5. In a printer for printing on paper, said printer having paper advance means which include a clutch mechanism and an electrical actuating coil connected with said clutch mechanism; the improvement comprising an electronic control circuit including a relatively high power circuit connected to the coil of said paper advance means for initially energizing the coil on receiving a paper advance signal, a relatively low power circuit also connected to said coil for maintaining the coil energized until a stop paper advance signal is received thereby, means including a stop paper advance circuit connected to the low power circuit for providing said stop paper advance signal, said stop signal being operable to deenergize said coil, and means operable in conjunction with the high power circuit for preventing energizing of the actuating coil for a predetermined time after a paper advance signal is received by said high power circuit.

6. Structure as claimed in claim 5 wherein the last mentioned means comprises a start paper advance one-shot multivibrator, and a time delay in series with and connected between the start paper advance one-shot multivibrator and the high power circuit.

7. In a printer for printing on paper, said printer having paper advance means which include a clutch mechanism and an electrical actuating coil connected with said clutch mechanism; the improvement comprising an electronic control circuit including a relatively high power circuit connected to the coil of said paper advance means for initially energizing the coil on receiving a paper advance signal, a relatively low power circuit also connected to said coil for maintaining the coil energized until a stop paper advance signal is received thereby, a stop paper advance circuit means connected to the low power circuit for providing a stop paper advance signal operable to deenergize said coil, delay means connected to said high power circuit for preventing energizing of the actuating coil for a predetermined time after a paper advance signal is received, and a printer input request signal inhibit circuit connected to said high and low power circuits for inhibiting a printer input request signal on reception of a start paper advance signal and for a predetermined time after the coil is deenergized.

8. In a printer for printing on paper, said printer having a paper advance means which include a clutch mechanism and an electrical actuating coil connected with said clutch mechanism; the improvement comprising an electronic control circuit including a start paper advance one shot multivibrator for receiving a start paper advance signal and providing another signal in response thereto, a power supply, a relatively high power circuit connected to the coil for initially energizing the coil on receipt of a signal from the start paper advance multivibrator, said high power circuit including a grounded emitter transistor connected in series with the actuating coil and power supply, an amplifier and a one shot multivibrator connected to the transistor base through the amplifier and to the paper advance multivibrator to receive the signal from the paper advance multivibrator, a relatively low power circuit also connected to said coil in parallel with the high power circuit for maintaining the coil energized until a stop paper advance signal is received thereby, said low power circuit comprising a resistor, a second grounded emitter transistor having a collector connected to the collector of the first transistor through the resistor, a second amplifier and a flip-flop connected to the base of the second transistor through the second amplifier to receive the signal from the paper advance multivibrator, and a stop paper advance circuit connected to the flip-flop of the low power circuit for providing a stop paper advance signal operable to deenergize said second transistor, said stop paper advance circuit comprising a paper skip channel select circuit directly connected to the flip-flop in the low power circuit, and a vertical format control photo-diode system and a computer input decoding system in parallel which are in series with the paper skip channel select circuit.

9. Structure as set forth in claim 8 wherein a time delay device is provided between the paper advance multivibrator and the high power circuit whereby the coil is not energized for a predetermined time after a paper advance signal is received by the control circuit.

10. Structure as set forth in claim 8 and further including a printer input request inhibit circuit for providing a control voltage from the control circuit on reception of a paper advance signal thereby during energization of the coil, said inhibit circuit including an OR circuit having inputs thereto from said paper advance multivibrator and from the multivibrator in the high power circuit and from the flip-flop in the low power circuit, and a one shot multivibrator connected to the output of the OR circuit.

11. Structure as set forth in claim 10 and further including a predetermined time delay device operably associated with the multivibrator of the printer input request inhibit circuit whereby a printer input request inhibit signal is provided therefrom a predetermined time after the termination of all signal inputs to the OR circuit.

References Cited by the Examiner

UNITED STATES PATENTS

| | | | |
|---|---|---|---|
| 2,257,361 | 9/41 | Yorkey | 317—123.1 |
| 2,685,665 | 8/54 | Price | 317—149 |
| 2,884,852 | 5/59 | Saltz | 101—93 |
| 2,896,130 | 7/59 | Tompkins | 317—123 X |
| 2,981,296 | 4/61 | Paul et al. | 317—148.5 X |

WILLIAM B. PENN, *Primary Examiner.*

ROBERT A. LEIGHEY, *Examiner.*